United States Patent
Kim et al.

(10) Patent No.: US 12,284,273 B2
(45) Date of Patent: Apr. 22, 2025

(54) METHOD AND APPARATUS FOR CORRECTING POLARIZATION DISTORTION OF FARADAY ROTATING MIRROR IN PLUG-AND-PLAY QUANTUM KEY DISTRIBUTION SYSTEM

(71) Applicant: LG Electronics Inc., Seoul (KR)

(72) Inventors: JaYeong Kim, Seoul (KR); Hojae Lee, Seoul (KR); Byungkyu Ahn, Seoul (KR); Byounghoon Kim, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 18/044,865

(22) PCT Filed: Sep. 11, 2020

(86) PCT No.: PCT/KR2020/012335
§ 371 (c)(1),
(2) Date: Mar. 10, 2023

(87) PCT Pub. No.: WO2022/054992
PCT Pub. Date: Mar. 17, 2022

(65) Prior Publication Data
US 2023/0396422 A1 Dec. 7, 2023

(51) Int. Cl.
*H04L 9/08* (2006.01)
*G02B 27/28* (2006.01)
*H04B 10/70* (2013.01)

(52) U.S. Cl.
CPC ............ *H04L 9/0852* (2013.01); *G02B 27/28* (2013.01); *H04B 10/70* (2013.01)

(58) Field of Classification Search
CPC ... H04L 9/0852; H04L 67/10; H04L 63/1475; H04L 67/12; H04L 67/535; G02B 27/28;
(Continued)

(56) References Cited

U.S. PATENT DOCUMENTS 6,778,720 B1 * 8/2004 Cekorich ............ G01D 5/35383
356/463
12,126,387 B2 * 10/2024 Kim ...................... H04L 9/0852
(Continued)

FOREIGN PATENT DOCUMENTS

CN 106603161 A * 4/2017
CN 108923919 A * 11/2018 ........... H04L 9/0852

OTHER PUBLICATIONS

Bethune, D.S., Navarro, M. and Risk, W.P., 2002. Enhanced autocompensating quantum cryptography system. Applied Optics, 41(9), pp. 1640-1648. (Year: 2002).*
(Continued)

*Primary Examiner* — Michael R Vaughan
(74) *Attorney, Agent, or Firm* — Fish & Richardson P.C.

(57) ABSTRACT

Provided is a method and device for correcting an error in a communication system, the method including: transmitting, to another device, data encrypted based on key information. The key information is obtained by: incident a detection pulse on a variable Faraday rotating mirror and a reference pulse on a first mirror, respectively, wherein the detection pulse and the reference pulse are pulses branched from a test pulse; generating a first current in a balanced photodetector (BPD) based on a first component obtained as the detection pulse is reflected from the variable Faraday rotating mirror and a second component obtained as the reference pulse is reflected from the first mirror; converting the first current into a second current; incident the second current on the variable Faraday rotating mirror; and correcting the error in the variable Faraday rotating mirror based on the incident second current.

11 Claims, 52 Drawing Sheets

(58) Field of Classification Search
CPC .. H04B 10/70; H04B 10/2572; H04B 10/077; H04B 10/2507; H04W 12/0431; H04W 4/46; H04W 12/08; G02F 1/09
See application file for complete search history.

(56) References Cited

U.S. PATENT DOCUMENTS

| | | | |
|---|---|---|---|
| 2006/0023885 A1* | 2/2006 | Trifonov | H04B 10/70 380/256 |
| 2006/0239460 A1* | 10/2006 | Young | H04L 9/0852 380/256 |
| 2015/0341974 A1 | 11/2015 | Wu et al. | |
| 2020/0204362 A1 | 6/2020 | Li et al. | |
| 2021/0088559 A1* | 3/2021 | Bengoechea De La Llera | G02B 27/106 |
| 2024/0007278 A1* | 1/2024 | Kim | H04B 10/70 |

OTHER PUBLICATIONS

D. S. Bethune and W. P. Risk, "An autocompensating fiber-optic quantum cryptography system based on polarization splitting of light," in IEEE Journal of Quantum Electronics, vol. 36, No. 3, pp. 340-347, Mar. 2000 (Year: 2000).*

Ac'in et al., "Coherent pulse implementations of quantum cryptography protocols resistant to photon number splitting attacks," arXiv:quant-ph/0302037v1, Feb. 2003, 17 pages.

Johansson et al., "Optical frequency comb Faraday rotation spectroscopy," Applied Physics B, 2018, 124:79.

Wei et al., "Analysis of Faraday Mirror in Auto-Compensating Quantum Key Distribution," Chin. Phys. Lett. 2015, 32(5):080303-1-080303-5.

* cited by examiner

FIG. 22
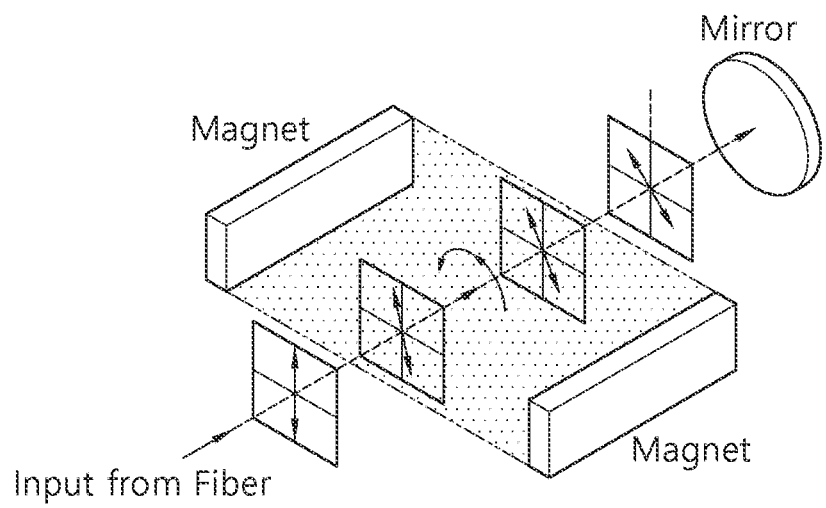
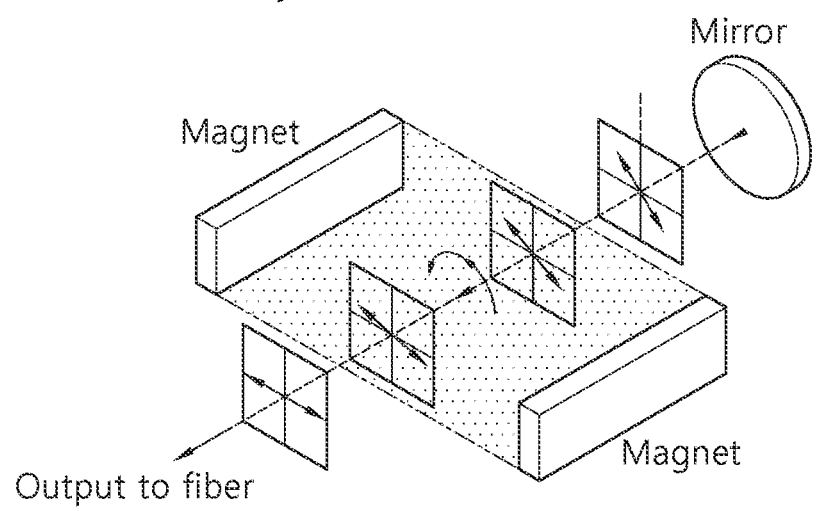

METHOD AND APPARATUS FOR CORRECTING POLARIZATION DISTORTION OF FARADAY ROTATING MIRROR IN PLUG-AND-PLAY QUANTUM KEY DISTRIBUTION SYSTEM

CROSS-REFERENCE TO RELATED APPLICATIONS

This application is a National Stage application under 35 U.S.C. § 371 of International Application No. PCT/KR2020/012335, filed on Sep. 11, 2020. The disclosure of the prior application is incorporated by reference in its entirety.

TECHNICAL FIELD

The present disclosure relates to quantum communication systems.

BACKGROUND

Due to the advent of quantum computers, it has become possible to hack existing cryptographic systems based on mathematical complexity (e.g., RSA, AES, etc.). To prevent hacking, quantum cryptographic communication is proposed.

Herein, a method and system for measuring and correcting errors in a Faraday rotating mirror so that a commercially available Faraday rotating mirror can operate in or near an ideal state is provided.

SUMMARY

According to one embodiment of the present disclosure, a method and apparatus characterized in that the key information is obtained based on: incident a detection pulse on a variable Faraday rotating mirror and a reference pulse on a first mirror, respectively, wherein the detection pulse and the reference pulse are pulses branched from a test pulse, generating a first current in a balanced photodetector (BPD) based on a first component being a component obtained as the detection pulse is reflected from the variable Faraday rotating mirror and a second component that is a component obtained as the reference pulse is reflected from the first mirror, converting the first current into a second current, incident the second current on the variable Faraday rotating mirror, and correcting the error of the variable Faraday rotating mirror based on the incident second current.

According to the present disclosure, an imperfect Faraday rotating mirror can be corrected to behave as an ideal Faraday rotating mirror, thereby eliminating the security hole caused by the imperfection of the Faraday rotating mirror, thereby defending against PFM attacks and ensuring that the PnP quantum key distribution system maintains the ideal security of the BB84 protocol.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 22 schematically illustrates of an example of polarization rotation of light by a Faraday rotating mirror.

FIG. 49 illustrates an example of a vehicle applied to the present disclosure. The vehicle may be implemented as a transport means, an aerial vehicle, a ship, and so on.

DETAILED DESCRIPTION

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

Technical features that are individually described in one drawing in this specification may be implemented individually or simultaneously.

Hereinafter, new radio access technology (new RAT, NR) will be described.

As more and more communication devices require greater communication capacity, a need for improved mobile broadband communication compared to conventional radio access technology (RAT) has emerged. In addition, massive machine type communications (MTC), which provides various services anytime and anywhere by connecting multiple devices and objects, is also one of the major issues to be considered in next-generation communication. In addition, communication system design considering reliability and latency-sensitive services/terminals is being discussed. The introduction of next-generation wireless access technologies in consideration of such expanded mobile broadband communication, massive MTC, URLLC (Ultra-Reliable and Low Latency Communication) is being discussed, in this specification, for convenience, the corresponding technology is referred to as new RAT or NR.

Figure 1:
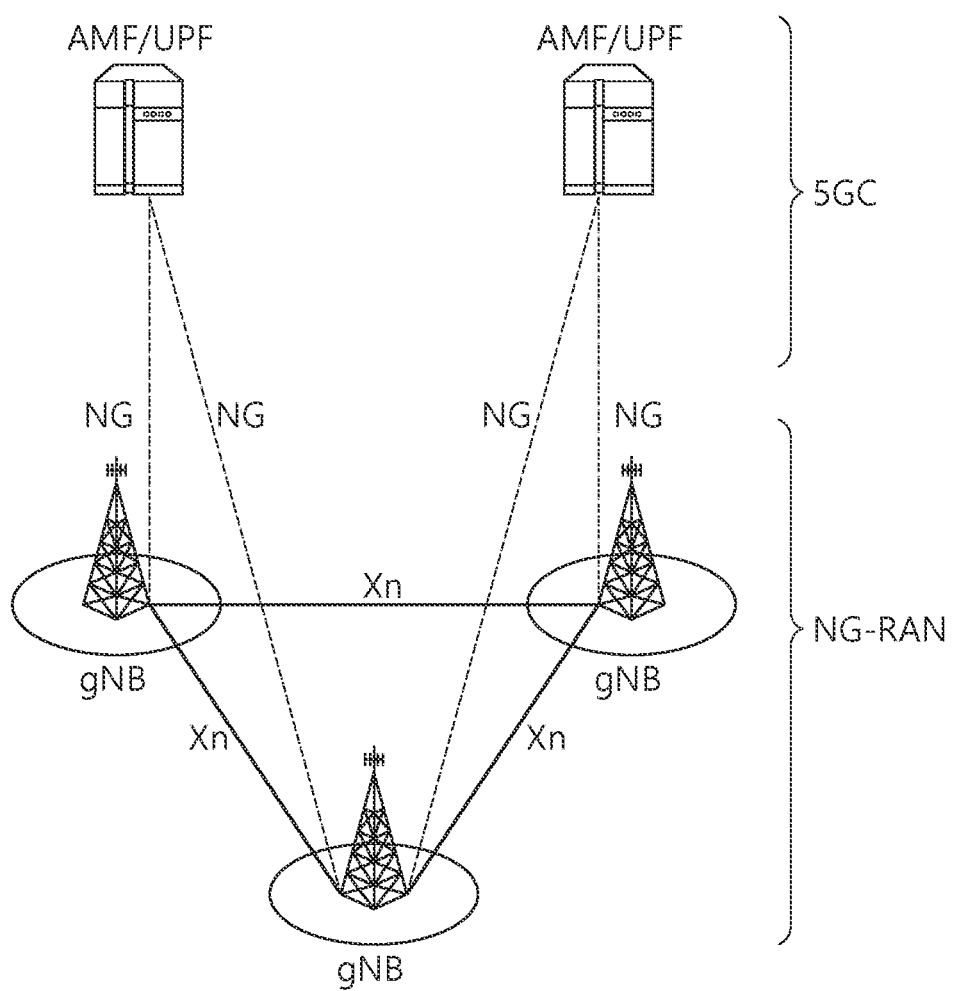
FIG. 1 illustrates a system structure of a New Generation Radio Access Network (NG-RAN) to which NR is applied.

FIG. 1 illustrates a system structure of a New Generation Radio Access Network (NG-RAN) to which NR is applied.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 2:
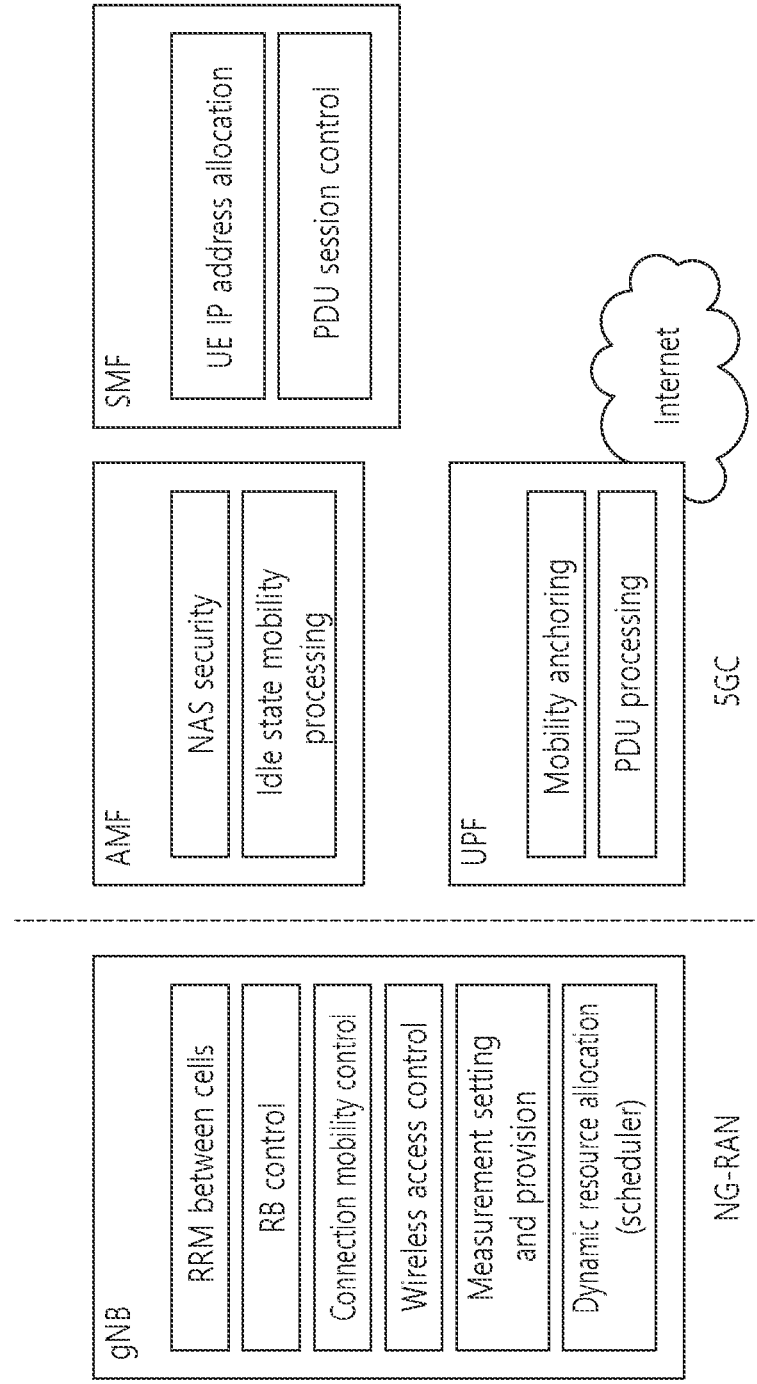
FIG. 2 illustrates the functional split between NG-RAN and 5GC.

FIG. 2 illustrates the functional split between NG-RAN and 5GC.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non-Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 3:
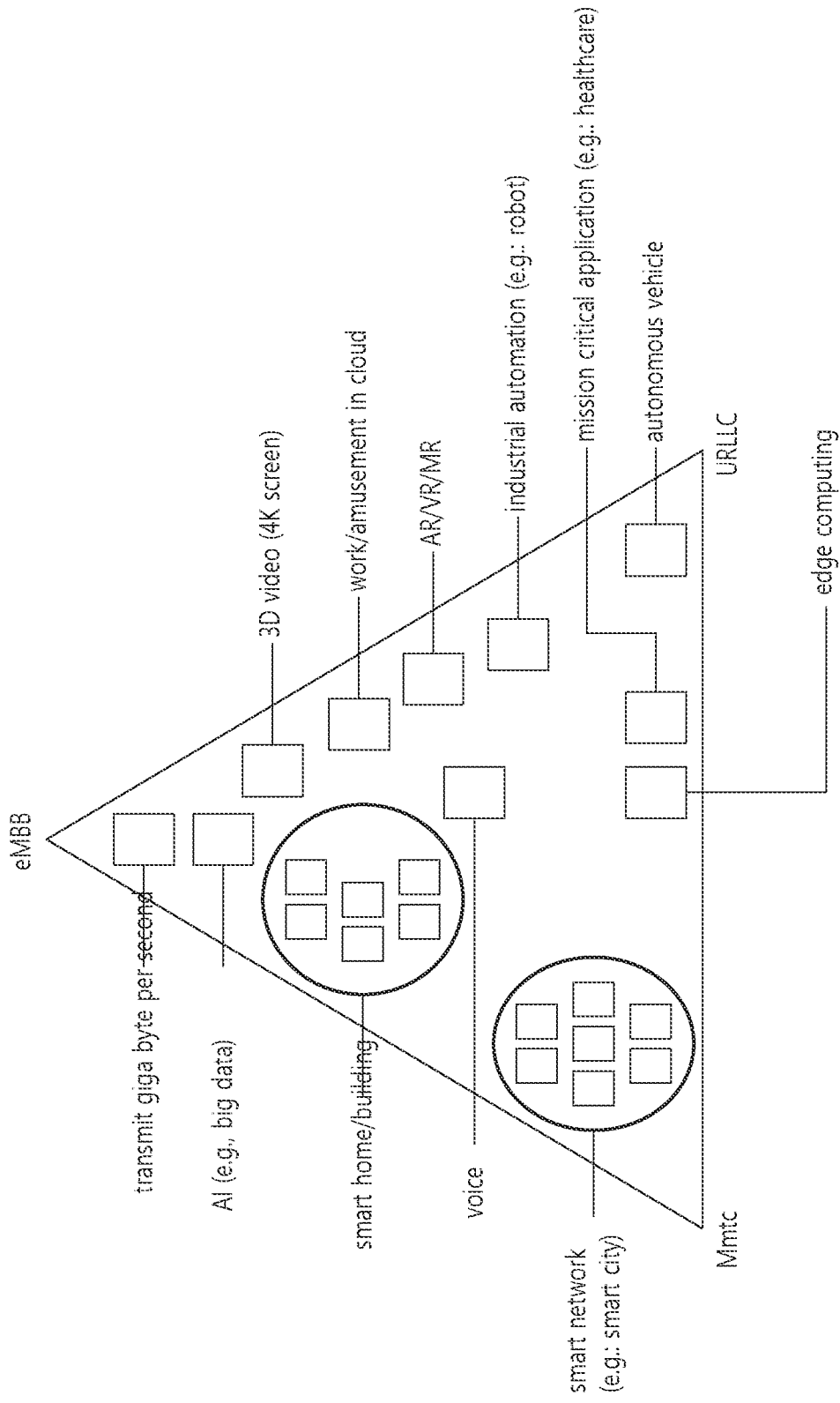
FIG. 3 shows examples of 5G usage scenarios to which the technical features of the present specification can be applied.

FIG. 3 shows examples of 5G usage scenarios to which the technical features of the present specification can be applied. The 5G usage scenarios shown in FIG. 3 are only exemplary, and the technical features of the present specification can be applied to other 5G usage scenarios which are not shown in FIG. 3.

Referring to FIG. 3, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$_2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 3 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, examples of next-generation communication (e.g., 6G) that can be applied to the embodiments of the present specification will be described.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 4:
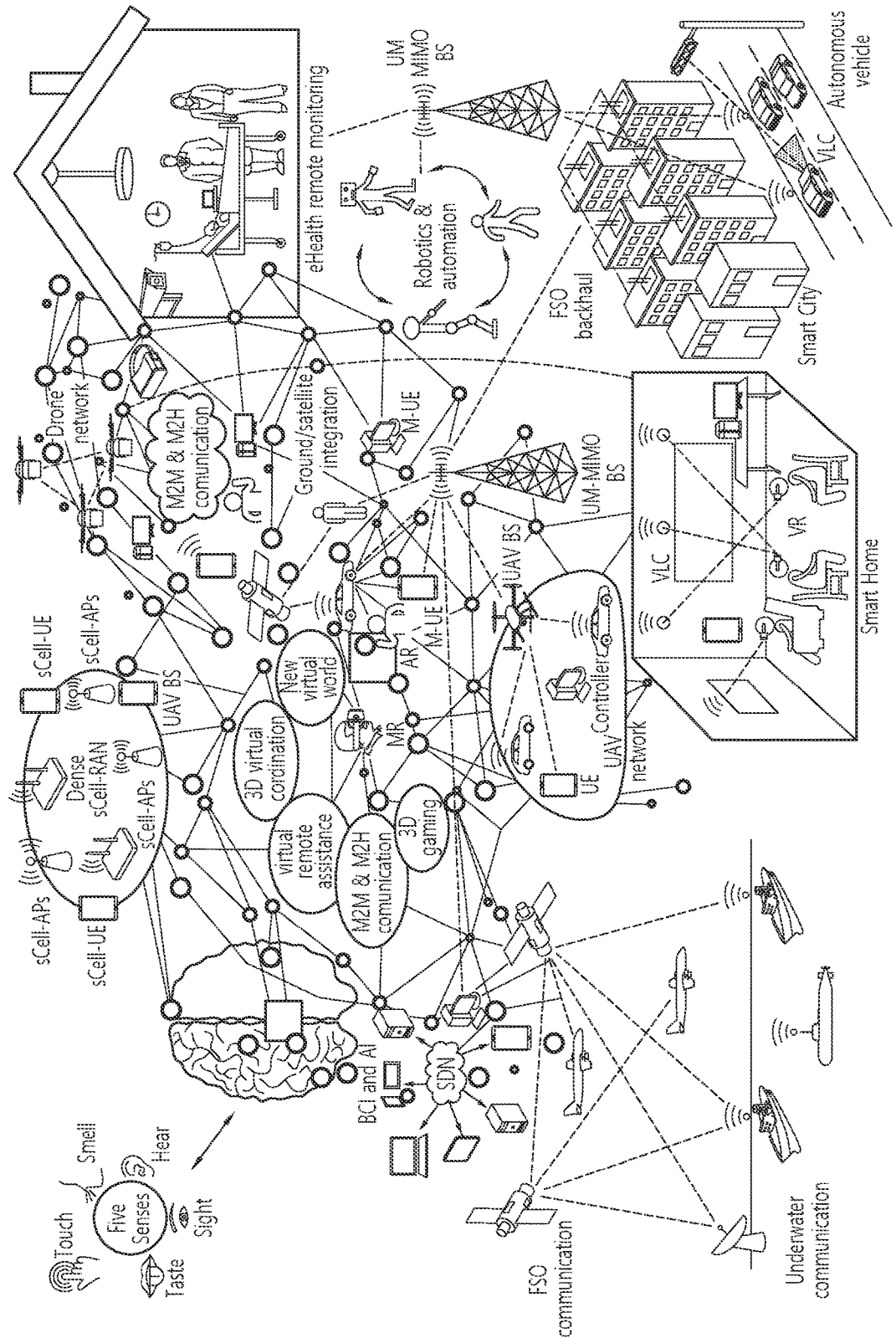
FIG. 4 is a diagram showing an example of a communication structure that can be provided in a 6G system.

FIG. 4 is a diagram showing an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 5:
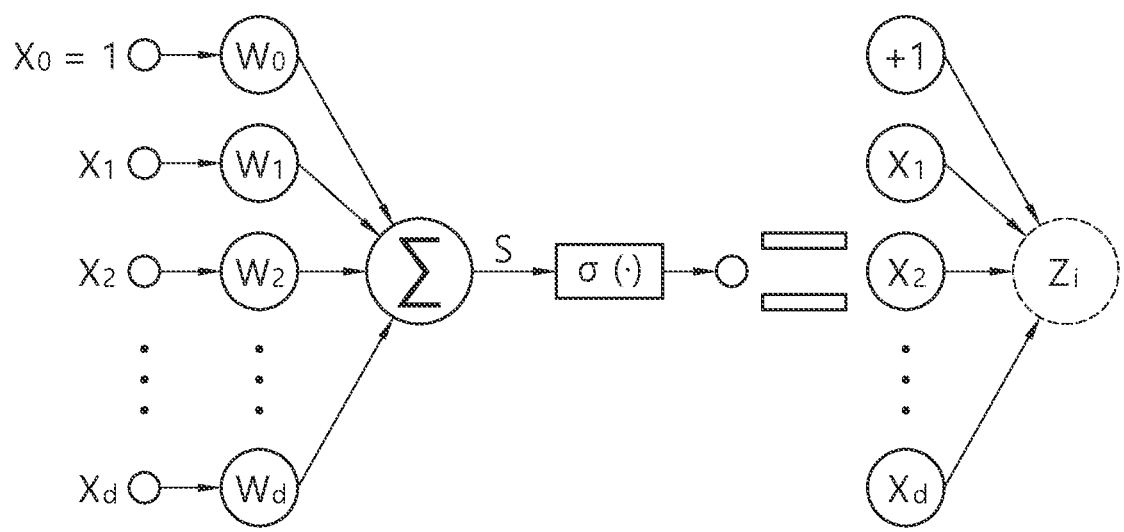
FIG. 5 schematically illustrates an example of a perceptron structure.

FIG. 5 schematically illustrates an example of a perceptron structure.

Referring to FIG. 5, if the input vector $x=(x1, x2 \ldots, xd)$ is input, each component is multiplied by the weight (W1, W2 ..., Wd), after summing up all the results, applying the activation function $\sigma(\cdot)$, the entire process above is called a perceptron. The huge artificial neural network structure may extend the simplified perceptron structure shown in FIG. 5 and apply input vectors to different multi-dimensional perceptrons. For convenience of description, an input value or an output value is referred to as a node.

Meanwhile, the perceptron structure shown in FIG. 5 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 6.

Figure 6:
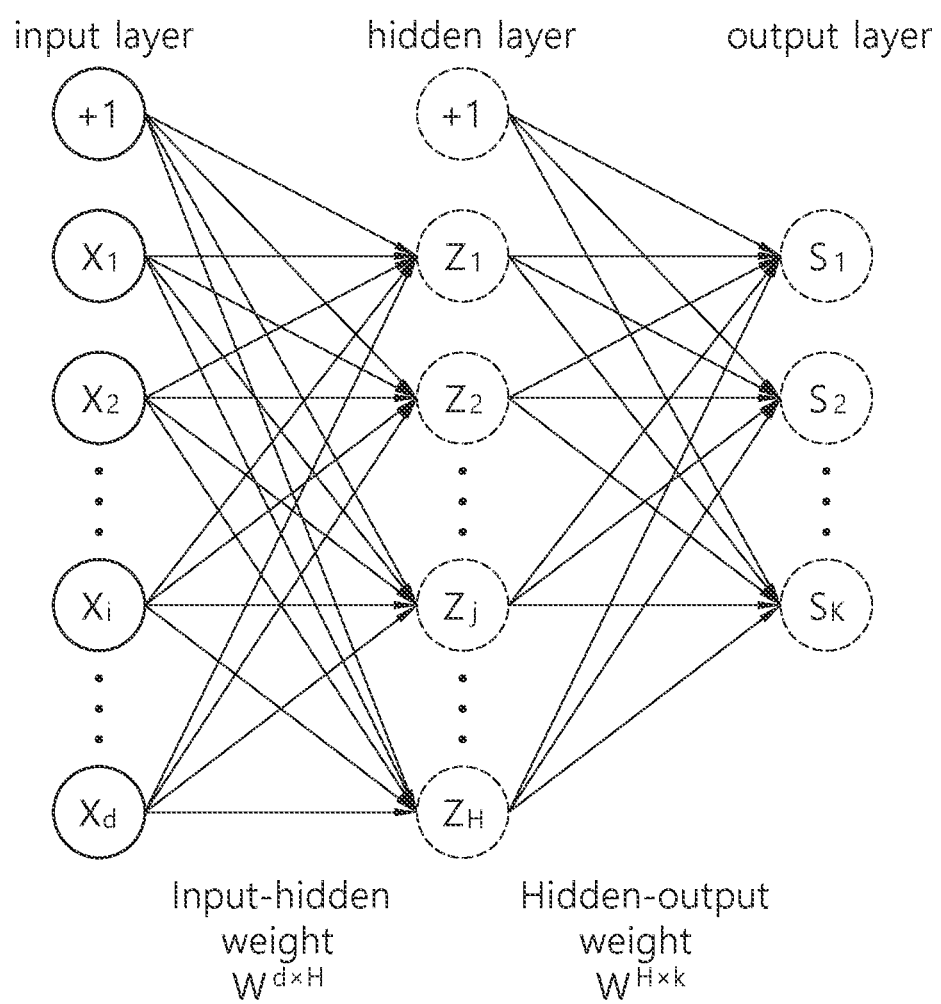
FIG. 6 schematically illustrates an example of a multi-layer perceptron structure.

FIG. 6 schematically illustrates an example of a multi-layer perceptron structure.

The layer where the input vector is located is called the input layer, the layer where the final output value is located is called the output layer, and all the layers located between the input layer and the output layer are called hidden layers. In the example of FIG. 6, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 7:
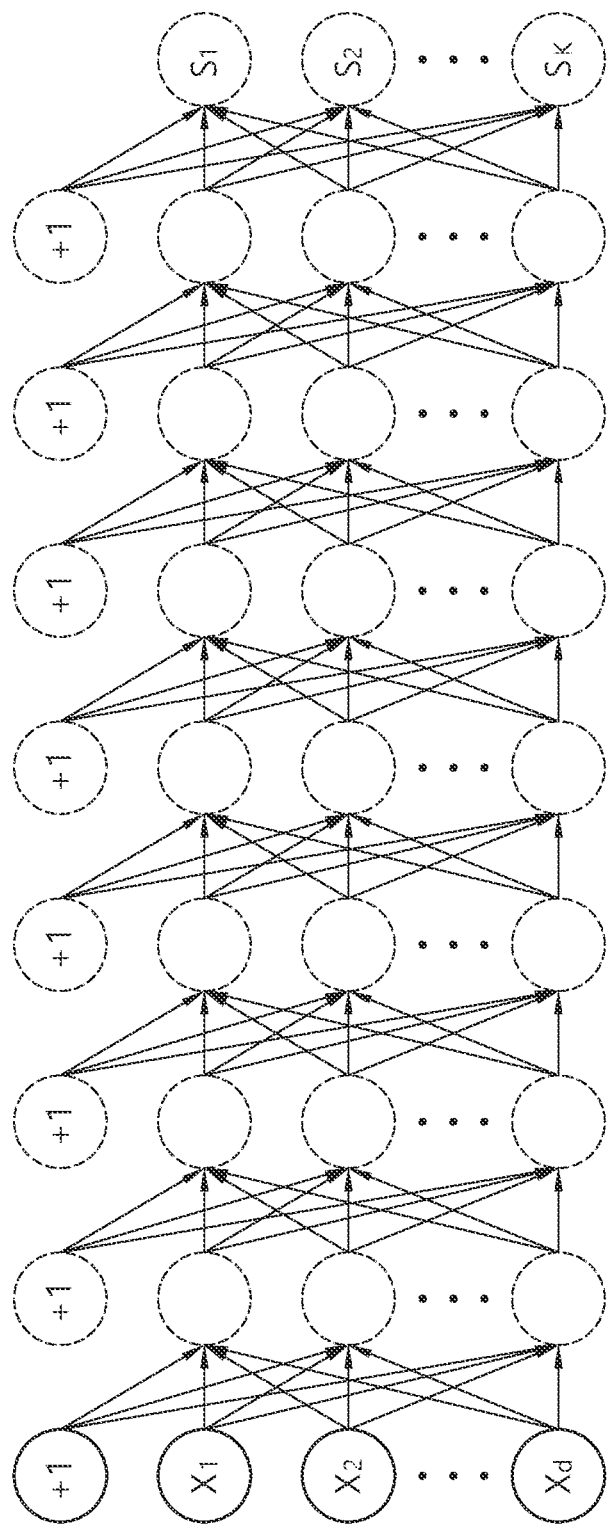
FIG. 7 schematically illustrates a deep neural network example.

FIG. 7 schematically illustrates a deep neural network example.

The deep neural network shown in FIG. 7 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 8:
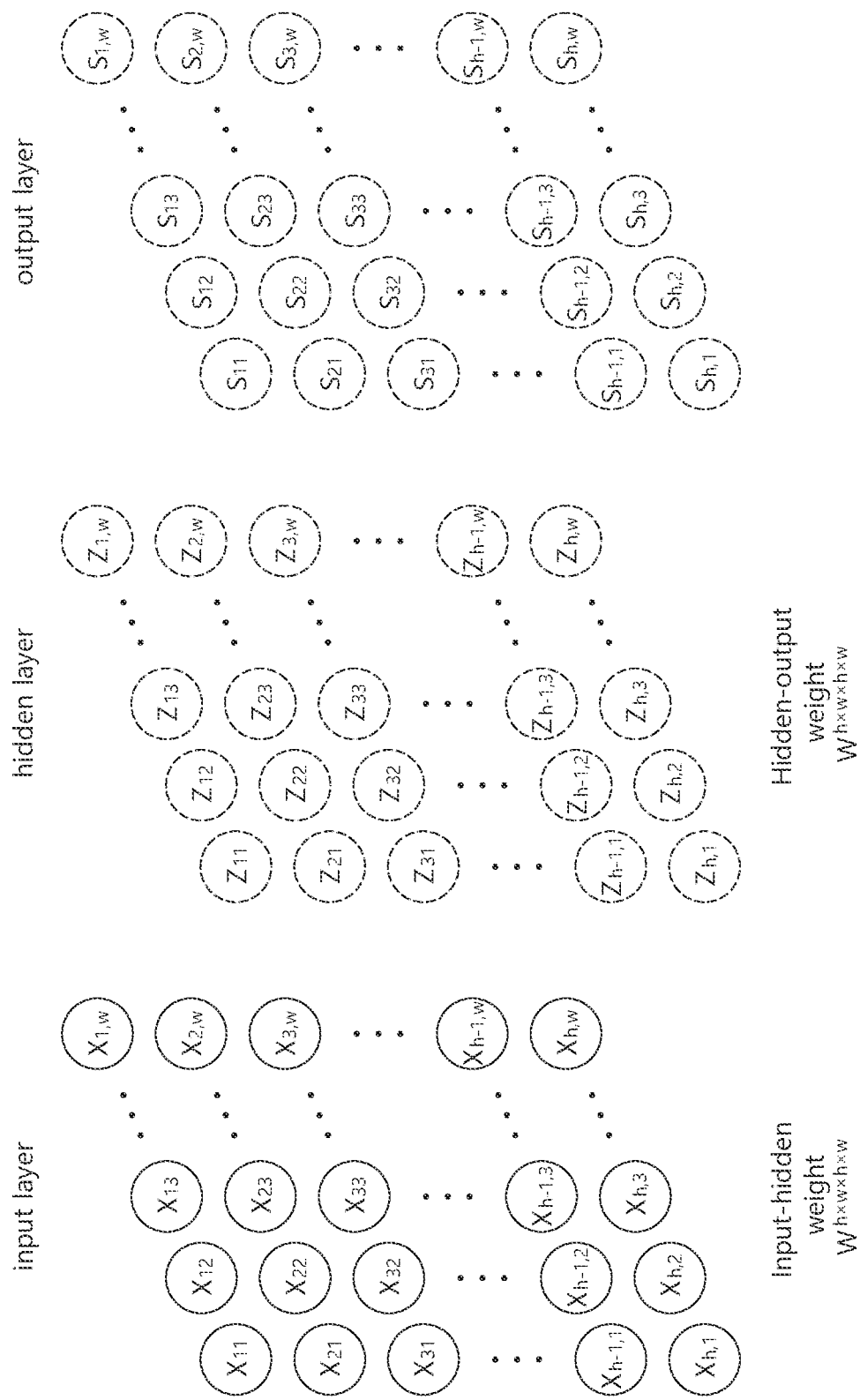
FIG. 8 schematically illustrates an example of a convolutional neural network.

FIG. 8 schematically illustrates an example of a convolutional neural network.

In DNN, nodes located inside one layer are arranged in a one-dimensional vertical direction. However, in FIG. 8, it can be assumed that the nodes are two-dimensionally arranged with w nodes horizontally and h nodes vertically (convolutional neural network structure of FIG. 8). In this case, since a weight is added for each connection in the connection process from one input node to the hidden layer, a total of h×w weights must be considered. Since there are h×w nodes in the input layer, a total of h2w2 weights are required between two adjacent layers.

Figure 9:
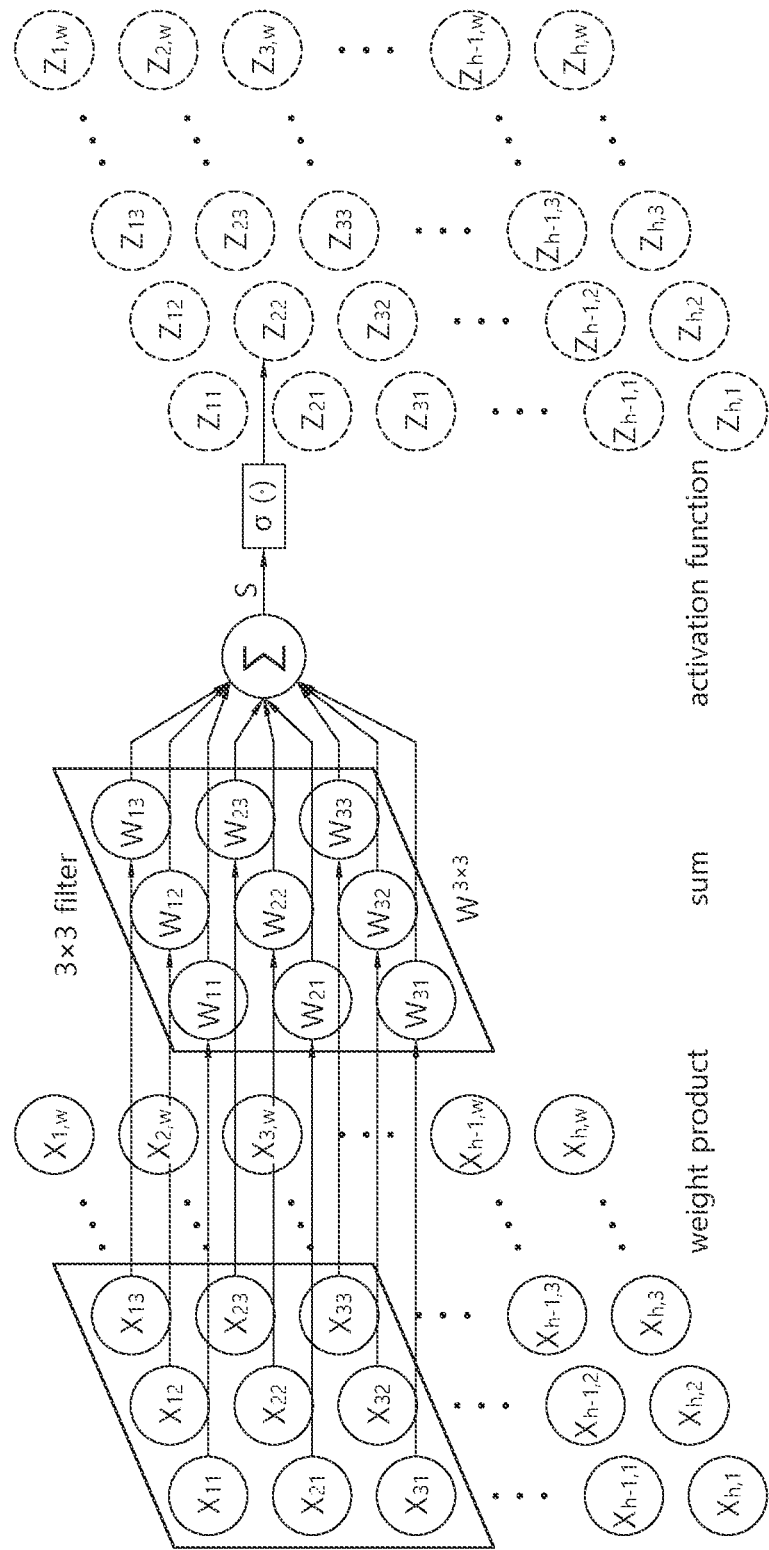
FIG. 9 schematically illustrates an example of a filter operation in a convolutional neural network.

The convolutional neural network of FIG. 8 has a problem that the number of weights increases exponentially according to the number of connections, so instead of considering all mode connections between adjacent layers, assuming that a filter having a small size exists, as shown in FIG. 9, a weighted sum and an activation function operation are performed on a portion where the filters overlap.

FIG. 9 schematically illustrates an example of a filter operation in a convolutional neural network.

One filter has weights corresponding to the number of filters, and learning of weights can be performed so that a specific feature on an image can be extracted as a factor and output. In FIG. 9, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 10:
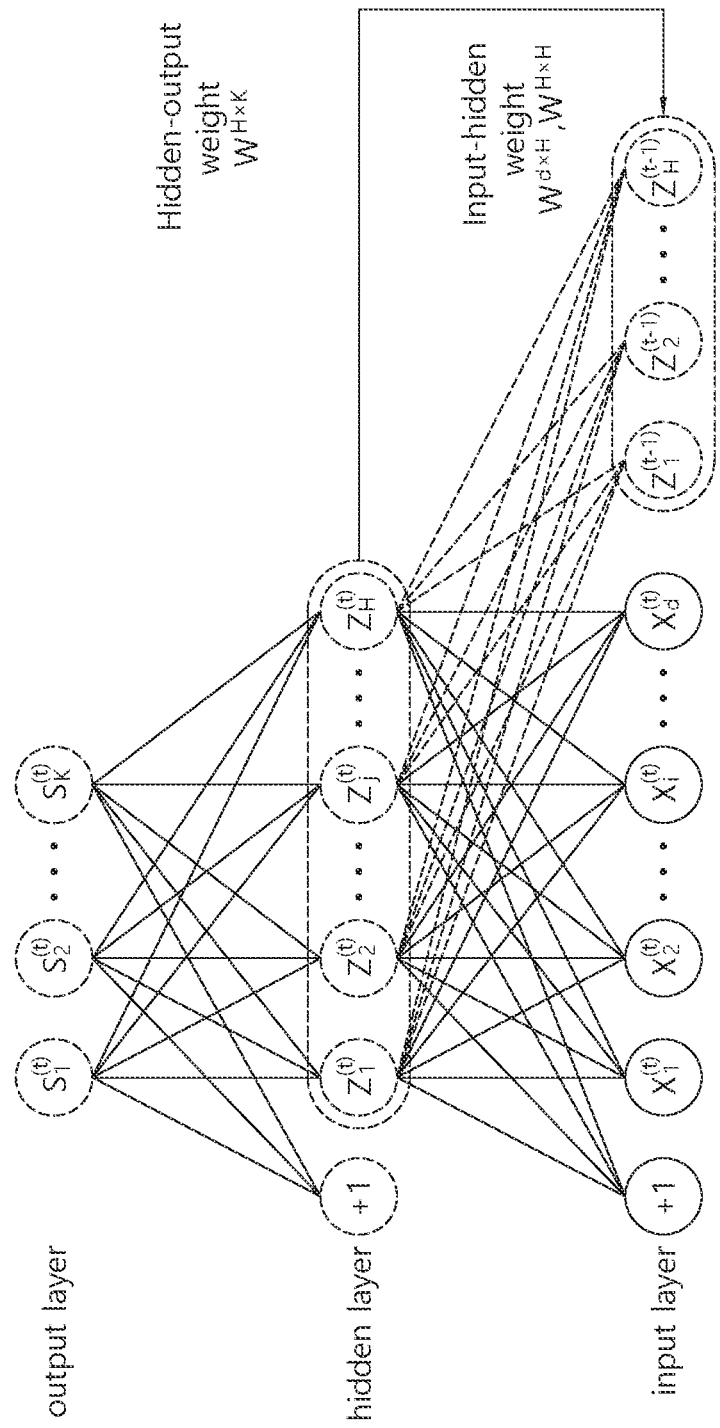
FIG. 10 schematically illustrates an example of a neural network structure in which a cyclic loop exists.

FIG. 10 schematically illustrates an example of a neural network structure in which a cyclic loop exists.

Referring to FIG. 10, a recurrent neural network (RNN) is a structure that applies a weighted sum and an activation function in the process of inputting an element (x1(t), x2(t) . . . , xd(t)) of any gaze t on the data sequence to the fully connected neural network, by entering together the hidden vector (z1(t−1), z2(t−1) . . . , zH(t−1)) of the immediately preceding time point t−1. The reason why the hidden vector is transmitted to the next time point in this way is that information in the input vector at previous time points is regarded as being accumulated in the hidden vector of the current time point.

Figure 11:
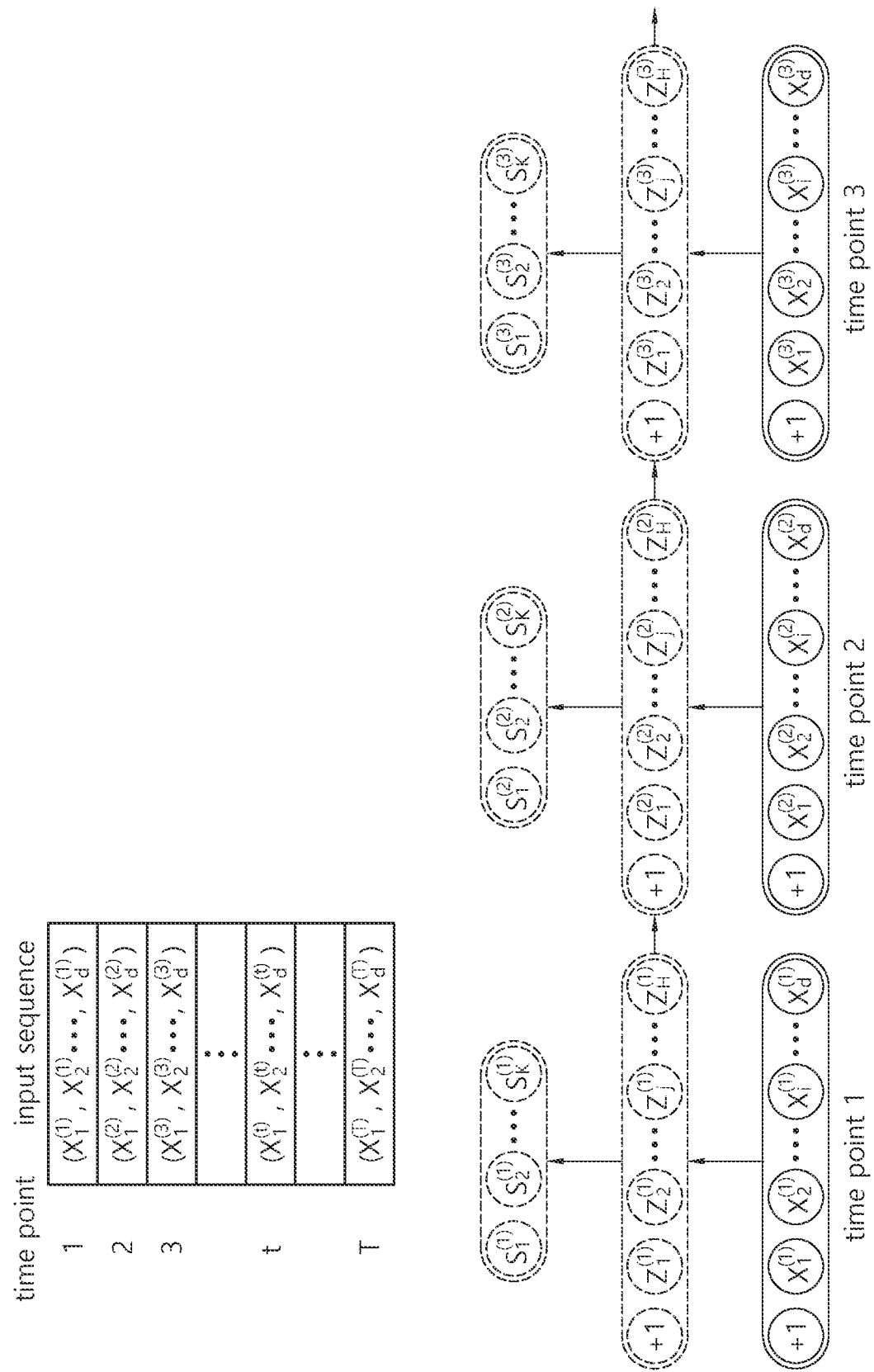
FIG. 11 schematically illustrates an example of an operating structure of a recurrent neural network.

FIG. 11 schematically illustrates an example of an operating structure of a recurrent neural network.

Referring to FIG. 11, the recurrent neural network operates in a sequence of predetermined views with respect to an input data sequence.

The hidden vectors (z1(1), z2(1) . . . , zH(1)) when the input vectors (x1(t), x2(t) . . . , xd(t)) at time point 1 are input to the recurrent neural network is input together with the input vector (x1(2), x2(2) . . . , xd(2)) of time point 2, the vector (z1(2), z2(2) . . . , zH(2)) of the hidden layer is determined through the weighted sum and activation function. This process is repeatedly performed until time point 2, time point 3 . . . , time point T.

Meanwhile, when a plurality of hidden layers is arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Recently, there have been attempts to integrate AI with wireless communication systems, but these have been focused on the application layer and network layer, especially deep learning in the field of wireless resource management and allocation. However, these studies are gradually developing into the MAC layer and the physical layer, in particular, attempts are being made to combine deep learning with wireless transmission in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based MIMO mechanism, AI-based resource scheduling and may include allocations, etc.

THz (Terahertz) Communication

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

Figure 12:
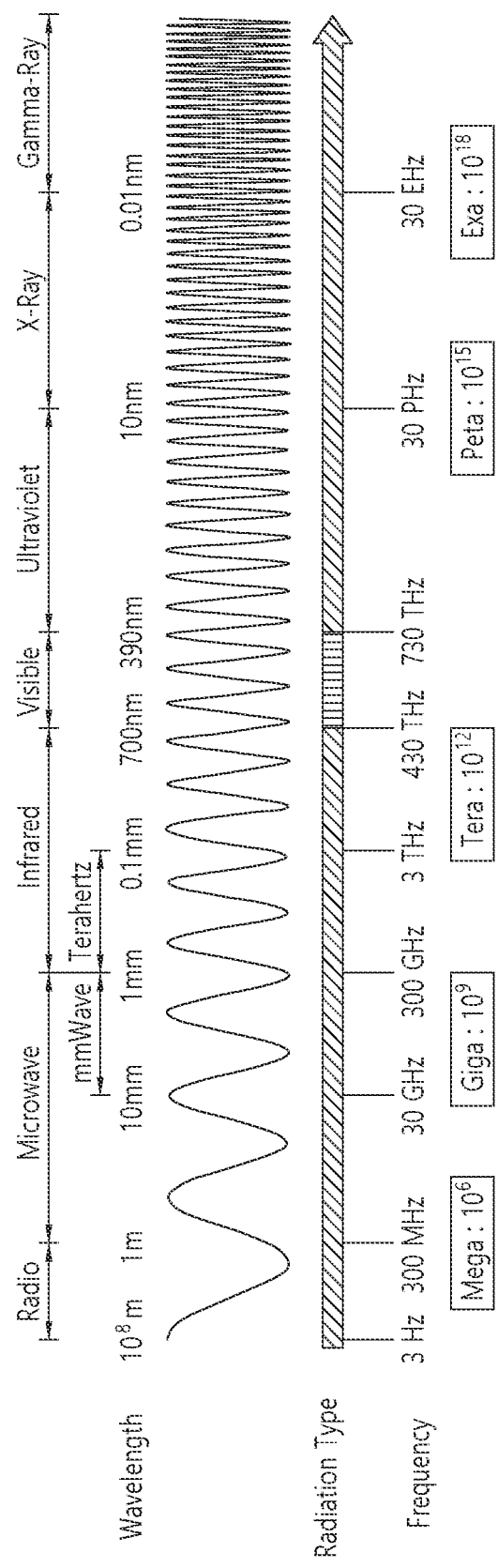
FIG. 12 shows an example of an electromagnetic spectrum.

FIG. 12 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Integration of Wireless Information and Energy Transfer

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

General Terahertz (THz) Wireless Communication

THz wireless communication uses a THz wave having a frequency of approximately 0.1 to 10 THz (1 THz=$10^{12}$ Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 13:
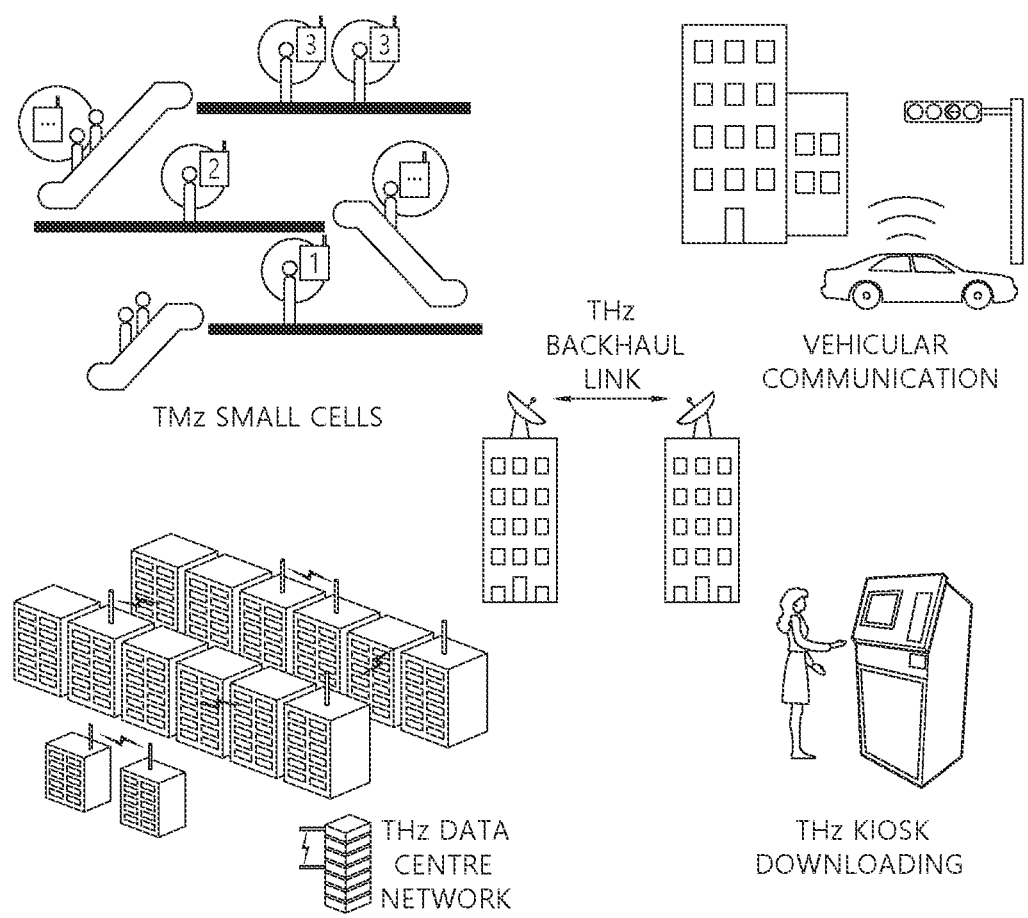
FIG. 13 is a diagram showing an example of a THz communication application.

FIG. 13 is a diagram showing an example of a THz communication application.

As shown in FIG. 13, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below is a table showing an example of a technology that can be used in a THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHZ) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on the method for generating and receiving THz. The THz generation method can be classified as an optical device or an electronic device-based technology.

Figure 14:
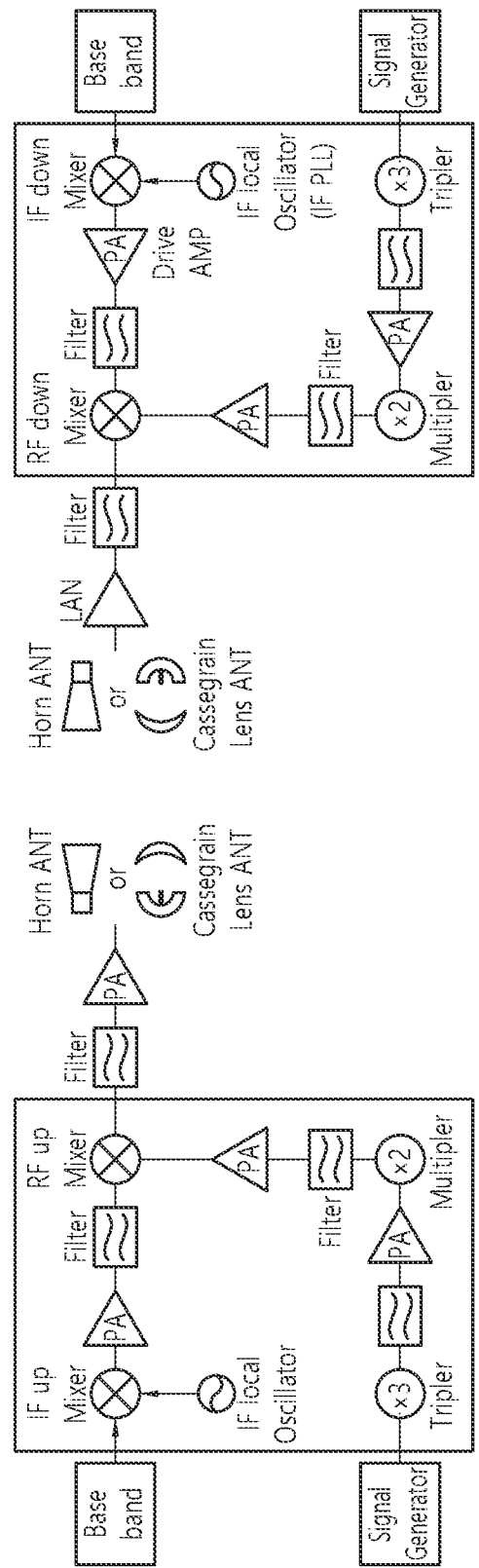
FIG. 14 is a diagram showing an example of an electronic element-based THz wireless communication transceiver.

FIG. 14 is a diagram showing an example of an electronic element-based THz wireless communication transceiver.

the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 14, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 14. In FIG. 14, IF represents an intermediate frequency, a tripler and a multiplier represents a multiplier, PA represents a power amplifier, and LNA represents a low noise amplifier, and PLL represents a phase-locked loop.

Figure 15:
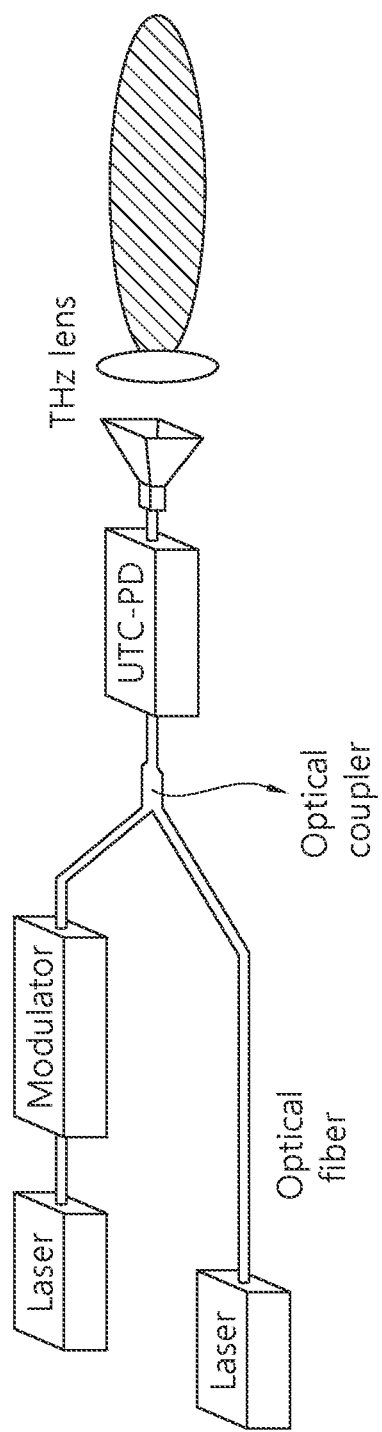
FIG. 15 is a diagram illustrating an example of a method for generating a THz signal based on an optical device.
Figure 16:
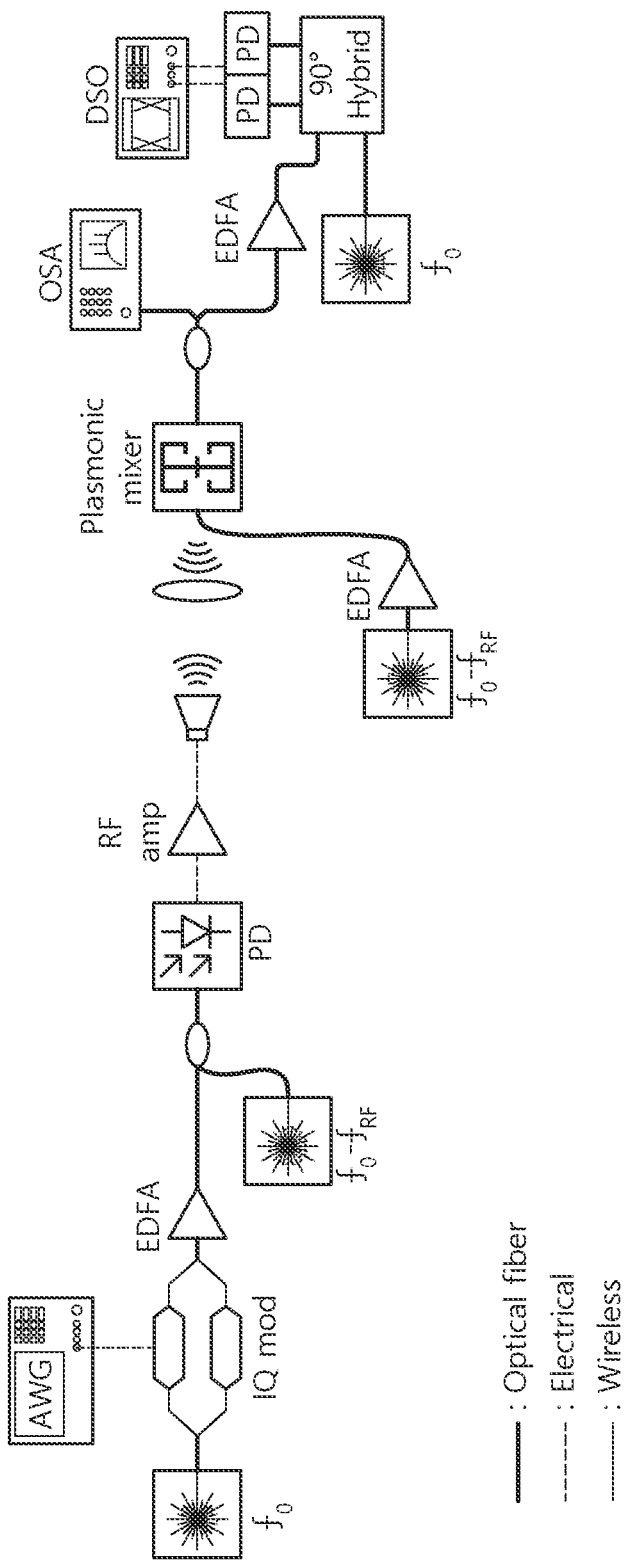
FIG. 16 is a diagram illustrating an example of a THz wireless communication transceiver based on an optical device.

FIG. 15 is a diagram illustrating an example of a method for generating a THz signal based on an optical device, and FIG. 16 is a diagram illustrating an example of a THz wireless communication transceiver based on an optical device.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 15, a laser diode, a broadband optical modulator, and an ultrahigh-speed photodetector are required. In the case of FIG. 15, the light signals of two lasers having different wavelengths are combined to generate a THz signal corresponding to a wavelength difference between the lasers. In FIG. 15, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 16, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 17:
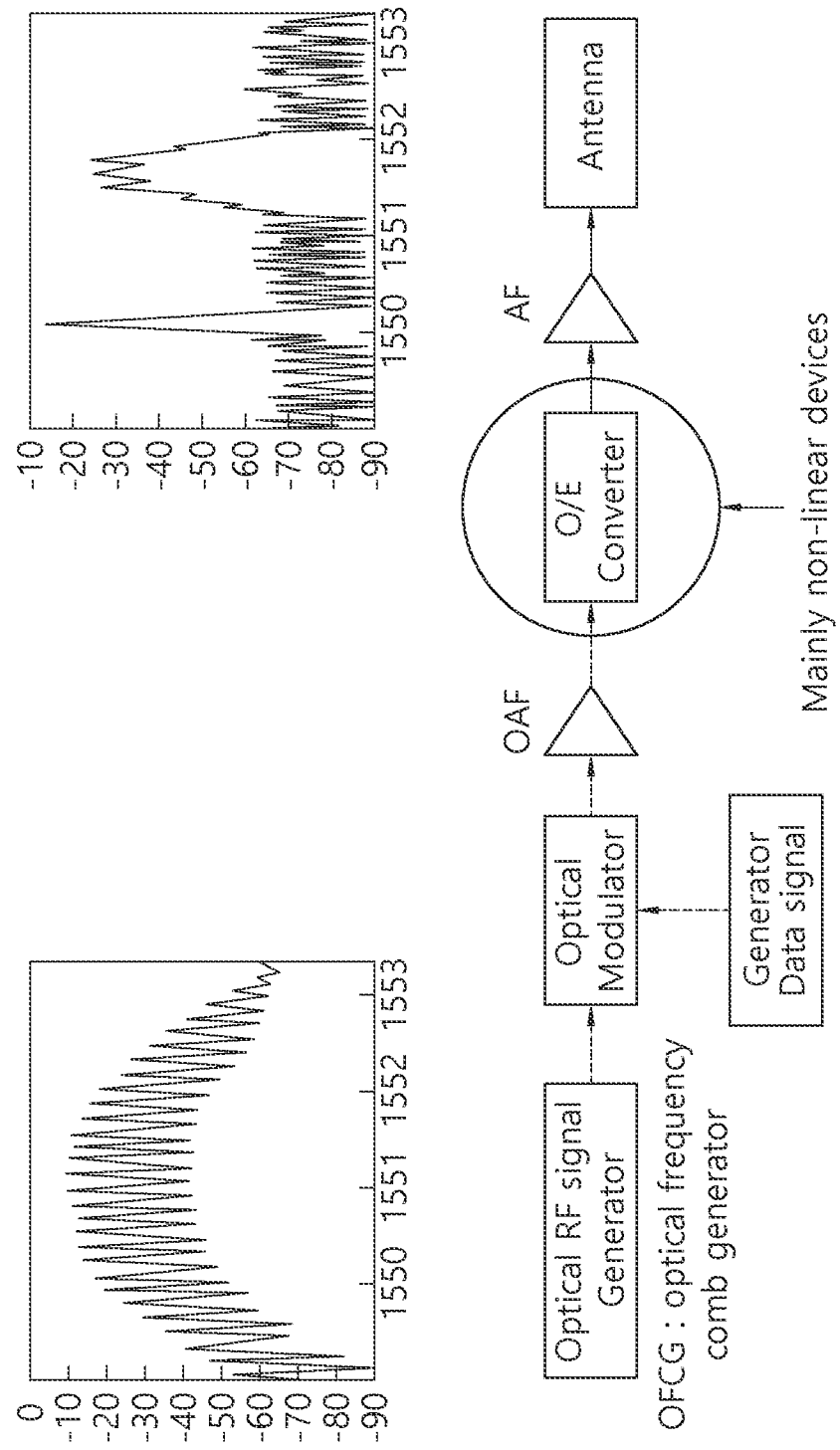
FIG. 17 illustrates a structure of a transmitter based on a photonic source.
Figure 18:
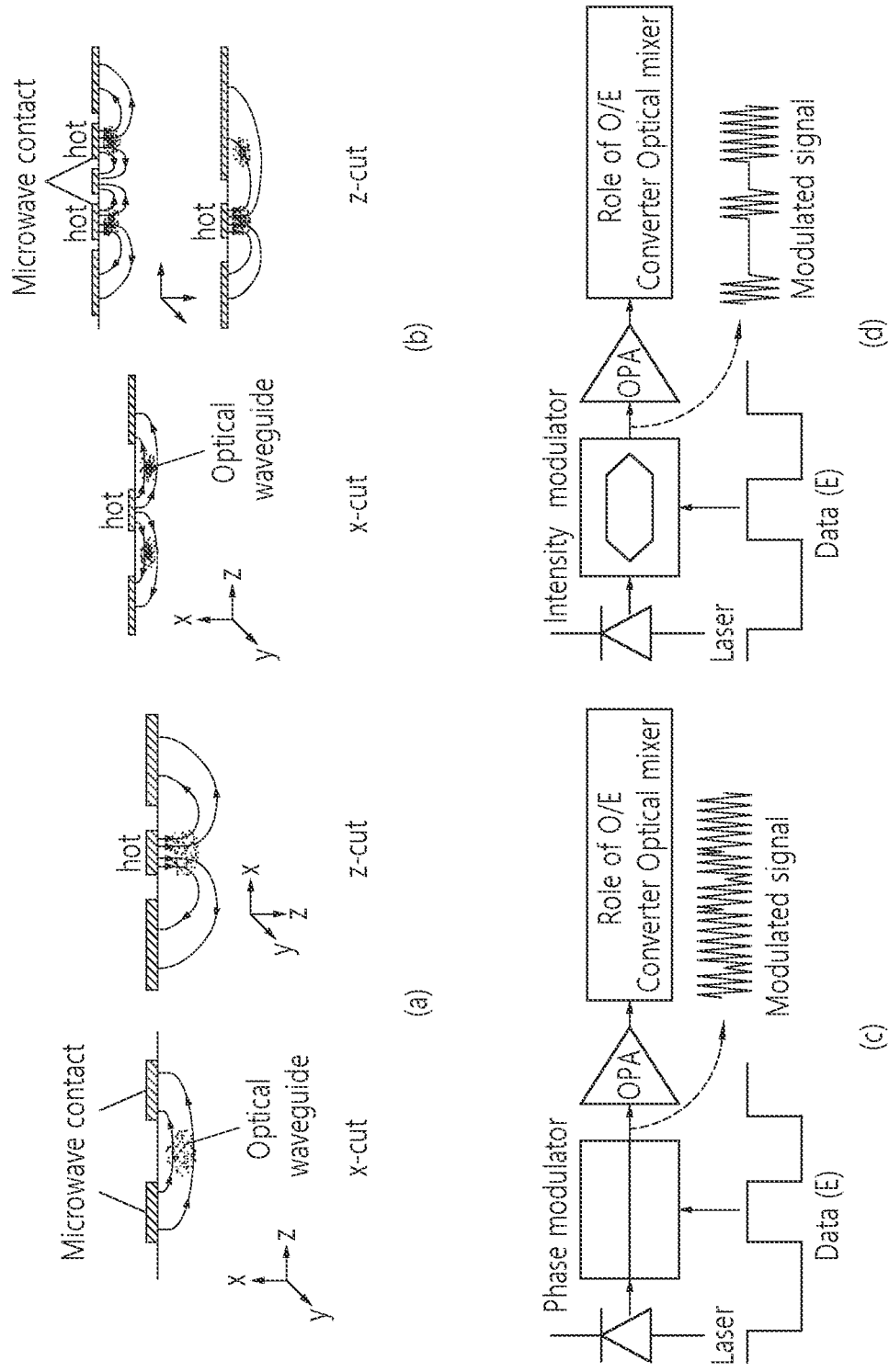
FIG. 18 illustrates a structure of an optical modulator.

The structure of the photoelectric converter (or photoelectric converter) will be described with reference to FIGS. 17 and 18. FIG. 17 illustrates a structure of a transmitter based on a photonic source, and FIG. 18 illustrates a structure of an optical modulator.

Generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Unlike conventional communication methods that communicate by wavelength or amplitude, quantum cryptographic communication systems use a single photon, the smallest unit of light, to carry signals. While conventional cryptographic systems are mostly guaranteed by the complexity of mathematical algorithms, quantum cryptographic communication is based on the unique properties of quanta, so its stability is guaranteed as long as the physical laws of quantum mechanics are not broken.

The most representative quantum key distribution protocol is the BB84 protocol, proposed by C. H. Bennett and G. Brassard in 1984. The BB84 protocol carries information in the state of photons such as polarization, phase, etc., and using the properties of quanta, it is theoretically possible to share a sift key in an absolutely safe manner. FIG. 1 shows an example of a BB84 protocol that generates a sift key by embedding information in the polarization state between Alice on the transmitter side and Bob on the receiver side, and the overall flow of the BB84 protocol is as follows.

(1). Alice randomly generates bits.

(2). She randomly selects a transmit polarizer to determine which polarization the bit information will be carried in.

(3). She generates polarization signals corresponding to the randomly generated bits in (1) and the randomly selected polarizers in (2) and transmits them in the quantum channel.

(4). Bob randomly selects a measurement polarizer to measure the polarization signal transmitted by Alice.

(5). He measures the polarization signal transmitted by Alice with the selected polarizer and store it.

(6). Alice and Bob share which polarizer they used over the classical channel.

(7). They obtain the sift key by keeping the bits with the same polarizer and removing the bits with different polarizers.

TABLE 3

| Bits generated by Alice | | | | | | | | |
|---|---|---|---|---|---|---|---|---|
| Transmit polarizer selected by Alice | + | + | x | + | x | x | x | + |
| Polarization signal transmitted by Alice | ↑ | → | ↘ | ↑ | ↘ | ↗ | ↗ | → |
| Measurement polarizer selected by Bob | + | x | x | x | + | x | + | x |
| Polarization signal measured by Bob | ↑ | ↗ | ↘ | ↗ | → | ↗ | → | → |
| Verify whether the transmitter polarizer and the measurement polarizer match | | | | Data exchange over a classical channel | | | | |
| Finally generated sift key | 0 | | | 1 | | 0 | | 1 |

Quantum Cryptographic Communication

Figure 19:
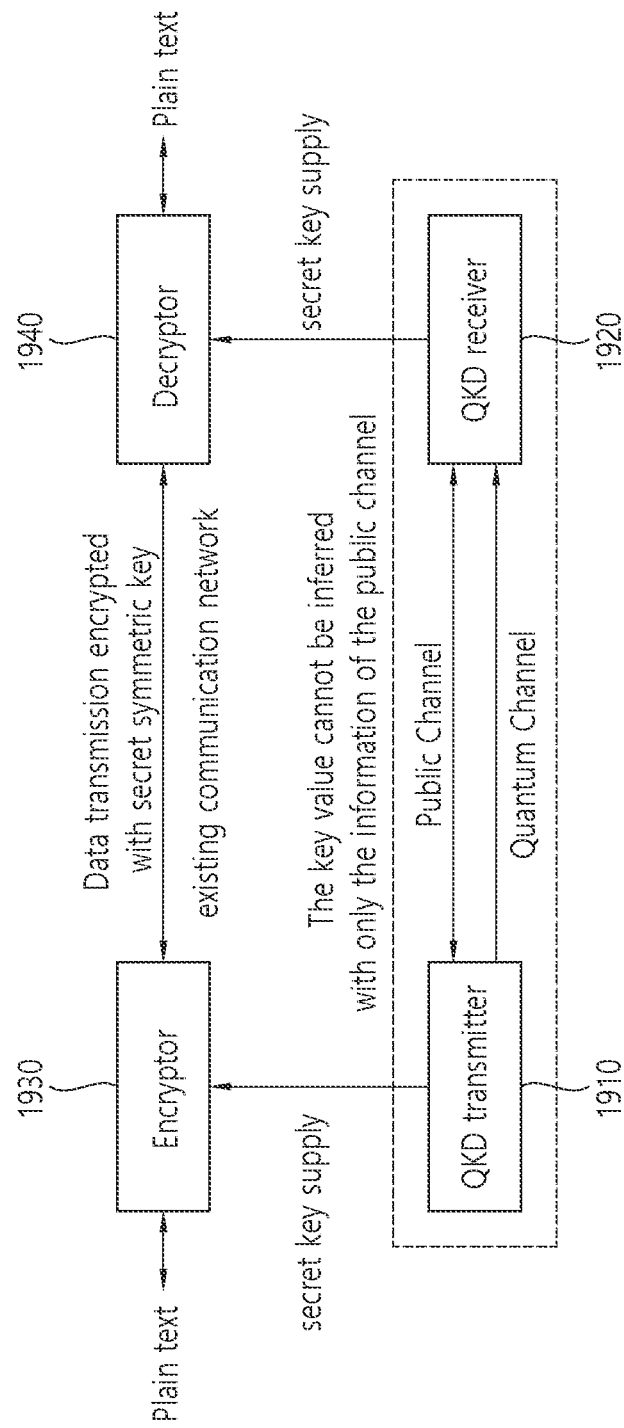
FIG. 19 schematically illustrates an example of quantum cryptographic communication.

FIG. 19 schematically illustrates an example of quantum cryptographic communication.

According to FIG. 19, a quantum key distribution (QKD) transmitter 1910 may be connected to a QKD receiver 1920 over a public channel and a quantum channel to perform communication.

The QKD transmitter 1910 may provide a secret key to an encryptor 1930, and the QKD receiver 1920 may also provide a secret key to the decryptor 1940. Here, the encryptor 1930 may have plaintext input/output, and the encryptor 1930 may transmit data encrypted with the secret symmetric key to the decryptor 1940 (over an existing communication network). In addition, plaintext may be input to and output from the decryptor 1940.

More specifically, quantum cryptographic communication is described below.

While these BB84 protocols provide absolute security in theory, there are flaws in actual hardware implementations, most notably polarization distortion due to birefringence in optical fibers. Birefringence is the phenomenon that when light passes through a non-isotropic medium, the polarization component perpendicular to the optical axis of the medium and the polarization component horizontal to it experience different time delays. This different time delay causes a phase difference between the two components, and the phase difference between the two components means that the polarization is distorted.

Figure 20:
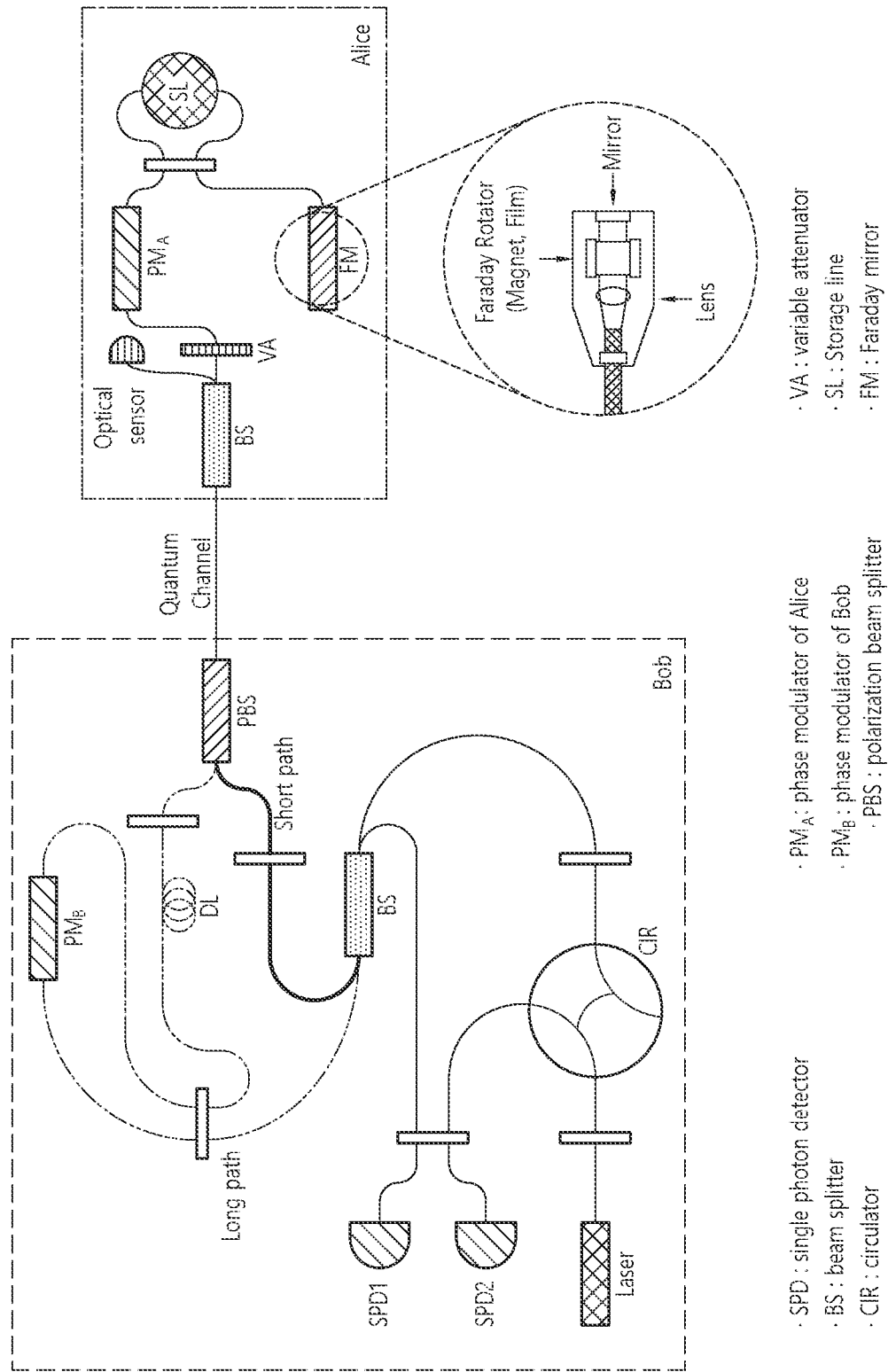
FIG. 20 schematically illustrates a basic structure of a plug-and-play quantum key distribution system.

FIG. 20 schematically illustrates a basic structure of a plug-and-play quantum key distribution system.

Plug & Play (PnP) quantum key distribution schemes have been widely used recently due to their ability to automatically compensate for polarization distortions caused by birefringence during transmission. FIG. 20 shows the basic structure of a PnP quantum key distribution system. While a typical quantum key distribution system is based on a one-way scheme in which the transmitter side (Alice) transmits information in a quantum state and the receiver side (Bob) measures it to generate a sift key, the PnP quantum key distribution system takes a two-way scheme in which Bob generates and transmits a reference pulse, Alice receives it, puts the bit information in a phase state, and sends it back to Bob. The overall flow of the BB84 protocol implemented through the PnP quantum key distribution system is as follows.

(1). Bob generates a reference pulse and transmits it to Alice in the following order.
  1) Use a laser to generate the pulse.
  2) Split the generated pulse into two pulses a and b using a beam splitter (BS).
  3) From among the split pulses, pulse a passes through a short path and its polarization is rotated by 90° by the polarization controller included herein, and pulse b passes through a long path and a time delay is applied.
  4) Since pulses a and b have polarizations orthogonal to each other, they are transmitted over the quantum channel through the same port of the polarization beam splitter (PBS).

(2). Alice embeds the bit information in the phase of the reference pulse transmitted by Bob and transmits it to Bob in the following order.
  1) The received pulses a and b are split by a beam splitter, and a part of them is incident on the optical sensor.
  2) The optical sensor analyzes the timing and intensity of the received pulses to generate a trigger signal to synchronize the clocks of Alice and Bob, and sets the variable attenuator (VA) to attenuate the pulses to a single photon level.
  3) Based on the synchronized clock, the variable attenuator attenuates the second pulse, pulse b, to a single photon level, and the phase modulator (PM) also acts on the attenuated pulse b to apply a phase shift, from among 0, $\pi/2$, $\pi$, and $3\pi/2$, corresponding to the transmission base and bit information selected by Alice in the BB84 protocol.
  4) Pulses a and b are reflected by a Faraday rotating mirror and transmitted to Bob through a quantum channel with the polarization rotated by 90°.

(3). Bob receives the pulses a and b transmitted by Alice and measures the stored bit information in the following order.
  1) Pulses a and b pass through Bob's polarization separator in opposite paths (long path for pulse a, short path for pulse b) because their polarization has been rotated by 90° by Alice's Faraday rotating mirror.
  2) Pulse a is phase shifted by the long-path phase modulator to 0 or $\pi/2$, corresponding to Bob's chosen measurement base, and pulse b has the same polarization as pulse a because its polarization is rotated by 90° by the short-path polarizer.
  3) Since pulses a and b have traveled the same length of path as a result, they meet at Bob's beam splitter at the same time and cause interference.
  4) If Bob's measurement base coincides with Alice's transmission base, the overlapping pulses will be detected deterministically by either single photon detector (SPD) 1 or 2. If not, they will be detected probabilistically by either single photon detector 1 or 2.

Figure 21:
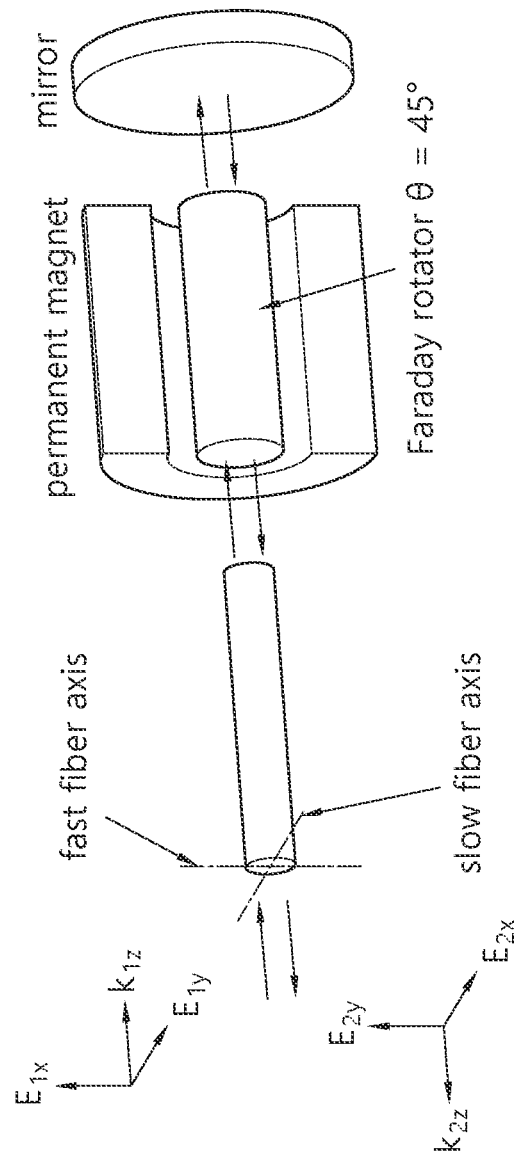
FIG. 21 schematically illustrates of an example of a Faraday rotator mirror.

FIG. 21 schematically illustrates of an example of a Faraday rotator mirror.

The effects of birefringence in the transmission path from Bob to Alice are automatically compensated for in the path back from Alice to Bob, and a Faraday rotator mirror plays a key role in this. A Faraday rotator mirror consists of a Faraday rotator and a regular mirror, as shown in FIG. 21. The Faraday rotator is based on Faraday's law, which states that light is forced to rotate in a certain direction when it passes through a magnetic field. The rotation angle $\beta$ [radian] of the polarization by the Faraday rotator is calculated by the equation below.

$$\beta = VBd \qquad \text{[Equation 1]}$$

where V is the Verdet constant [radian/(T−m)], B is the magnetic flux density [T], and d is the length of the path [m] along which the interaction of light and magnetic field occurs.

FIG. 22 schematically illustrates of an example of polarization rotation of light by a Faraday rotating mirror.

According to FIG. 22, polarization rotation may be achieved when light is reflected by a Faraday rotating mirror. Since the Faraday rotator used in the Faraday rotating mirror has a rotation angle of 45°, in an ideal case, the polarization rotation of the light is 45° when it enters the Faraday rotating mirror and 45° when it is reflected, for a total of 90°. Therefore, the polarization component perpendicular to the optical axis and the polarization component horizontal to the optical axis in the Bob→Alice path are reversed in the Alice→Bob path, which means that the two components experience the time delay due to birefringence in the Bob→Alice path and the Alice→Bob path interchangeably. As a result, both components experience the same time delay as they travel back and forth between Bob and Alice, so Bob receives a signal on the return pulse that compensates for the polarization distortion caused by birefringence (except for the 90° polarization rotation caused by the Faraday rotating mirror).

However, commercially available Faraday rotating mirrors do not guarantee an exact 45° angle of rotation due to process errors and variations with temperature and wavelength. According to a data sheet provided by General Photonics, commercially available Faraday rotating mirrors have a maximum process error of ±1° at room temperature (23° C.), and under the influence of the temperature and wavelength dependent Verdet constant V, it varies by ±0.12°/° C. and ±0.12°/nm, respectively.

For example, the specifications of a commercially available Faraday rotating mirror may be summarized as shown in the table below.

TABLE 4

| | | |
|---|---|---|
| Operating Wavelength | 1550 nm, 1310 nm | 1064 nm |
| Operating Bandwidth | ±50 nm | ±5 nm |
| Insertion Loss | 0.3 dB typical 0.5 dB max. | 3.0 dB max. |
| Faraday Rotation Angle | 90 degrees | 90 degrees |
| Rotation Angle Tolerance (Center Wavelength at 23° C.) | ±1 degree | ±6 degrees |
| Rotation Angle Wavelength Dependence | ±0.12 degree/nm | |
| Rotation Angle Temperature Dependence | ±0.12 degree/° C. | PMD: 0.05 ps |
| Reflection Polarization Dependence | 0.5% max. | PDL: 0.05 dB |
| Optical Power Handling | 300 mW min. | 150 mW |
| Operating Temperature | 0 to 70° C. | −5 to 50° C. |
| Storage Temperature | −40 to 85° C. | −40 to 85° C. |
| Fiber Type | SMF-28 | HI 1060 Fiber |
| Dimensions | Ψ 5.5 × 32 mm (pigtailed) Ψ 9.5 × 50 mm (NoTailTM) | Ψ 5.5 × 35 mm (pigtailed) |

This imperfection in the Faraday rotating mirror not only increases the qubit error rate (QBER) by dampening the compensation for birefringence, but also distorts the state space of the BB84 protocol transmitted by Alice, leaving a security hole. Using an idealized Faraday rotating mirror, the state space of the BB84 state transmitted by Alice may be represented as follows.

$$|\Phi_k\rangle = \frac{1}{\sqrt{2}}(e^{ik\delta}|a\rangle + |b\rangle), k = 0, 1, 2, 3 \quad \text{[Equation 2]}$$

where $\delta=\pi/2$. k is the index of Alice's chosen phase state among 0, $\pi/2$, $\pi$, and $3\pi/2$. |a⟩ and |b⟩ be the time-mode vectors of the reference pulses a and b transmitted by Bob, which are the basis vectors of the state space in which the state transmitted by Alice exists. In other words, in the ideal case, the state space of the BB84 state transmitted by Alice is a two-dimensional space with the two time-modes |a⟩ and |b⟩ as basis vectors.

On the other hand, if the Faraday rotating mirror is imperfect, letting the error in the rotation angle be ε, the state transmitted by Alice is reconstructed by the following equation.

$$|\Phi_k\rangle = \frac{1}{\sqrt{2}}(\sin(2\epsilon)e^{i2k\delta}|aH\rangle + \cos(2\epsilon)e^{ik\delta}|aV\rangle + \sin(2\epsilon)|bH\rangle \quad \text{[Equation 3]}$$

$$+\cos(2\epsilon)|bV\rangle), k = 0, 1, 2, 3$$

The above equation shows that the information encoded by Alice appears not only in the time modes (a and b) but also in the polarization modes (H and V). To further clarify the dimensionality of the state space represented by this equation, it may be summarized as follows.

$$|H\rangle = \cos(2\epsilon)|X\rangle + \sin(2\epsilon)|Y\rangle, |V\rangle = -\sin(2\epsilon)|X\rangle + \cos(2\epsilon)|Y\rangle \quad \text{[Equation 4]}$$

Furthermore, the previous statement may be rewritten as follows.

$$|aX\rangle = |x_1\rangle, |aY\rangle = |x_2\rangle, |bY\rangle = |x_3\rangle \quad \text{[Equation 5]}$$

And, rearranging the previous equations, it may be redefined as follows $$|\Phi_k\rangle = \frac{1}{\sqrt{2}}\left[\sin(2\epsilon)\cos(2\epsilon)(e^{i2k\delta} - e^{ik\delta})|x_1\rangle \right. \quad \text{[Equation 6]}$$

$$\left. + \{\sin^2(2\epsilon)e^{i2k\delta} + \cos^2(2\epsilon)e^{ik\delta}\}|x_2\rangle + |x_3\rangle\right], k = 0, 1, 2, 3$$

Figure 23:
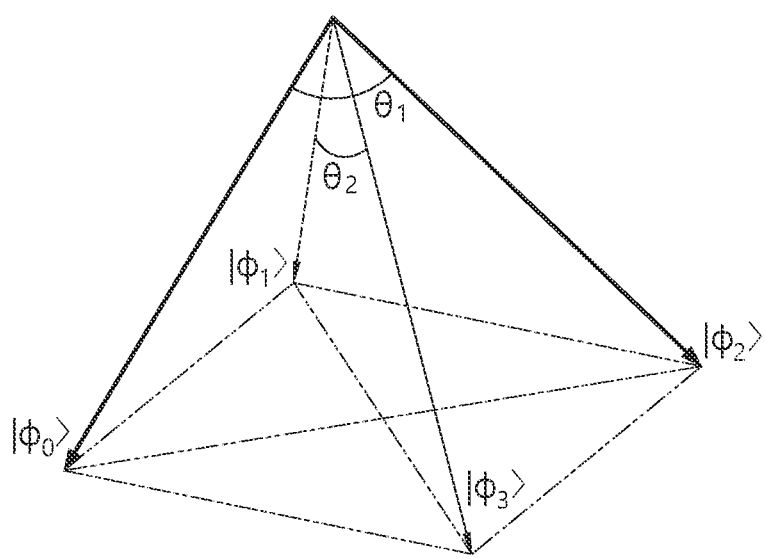
FIG. 23 schematically illustrates a state space distorted into three dimensions by the imperfections of the Faraday rotating mirror.

FIG. 23 schematically illustrates a state space distorted into three dimensions by the imperfections of the Faraday rotating mirror.

Therefore, the Hilbert space of the information transmitted by Alice is no longer two-dimensional, but three-dimensional, and plotting the four types of information that Alice can transmit on this three-dimensional space yields the result shown in FIG. 23. By finding a positive operator valued measure (POVM) operator that minimizes the qubit error rate between Alice and Bob for the four states represented by the above equation, Eve may reliably distinguish the four states, and the passive Faraday rotator mirror (PFM) attack, which is an intercept-resend eavesdropping attack based on the distinguished state information, becomes possible.

POVM is one of the measurement-based design methods for distinguishing between non-orthogonal states, which consists of n operators, M_0, M_1, . . . , M_(n−1), corresponding to each state if we want to distinguish between n states, and M_vac operator, corresponding to the case when we cannot distinguish which of the n states it is. Thus, the POVM for the PFM attack may be represented as {M_vac, M_k|k=0, 1, 2, 3}. If Eve obtains a measurement result corresponding to M_i (i=0, 1, 2, 3), she may generate a quanta with state |Φ_i⟩ and sends it to Bob, and if she obtains a result corresponding to M_vac, she sends nothing. In this case, under Eve's PFM attack, the probability that Bob gets the state information of |Φ_j⟩ when Alice sends the state information of |Φ_k⟩ is as follows.

$$P(j|k) = \sum_{i=0}^{3} P(B=j|E=i)P(E=i|A=k) = \quad \text{[Equation 7]}$$

$$\sum_{i=0}^{3} |\langle\Phi_j|\Phi_i\rangle|^2 Tr(M_i\rho_k) \quad \rho\_k = |\Phi\_k\rangle\langle\Phi\_k|$$

In general, if Eve obtains a measurement result corresponding to M_k (k=0, 1, 2, 3), it is considered that she has obtained meaningful information, and the success probability of Eve, P_succ^E, is defined as follows.

$$P_{succ}^E = \frac{1}{4}\sum_{k=0}^{3}\sum_{j=0}^{3} P(j|k) = \frac{1}{4}\sum_{i=0}^{3} Tr(M_i\rho) \quad \text{[Equation 8]}$$

Figure 24:
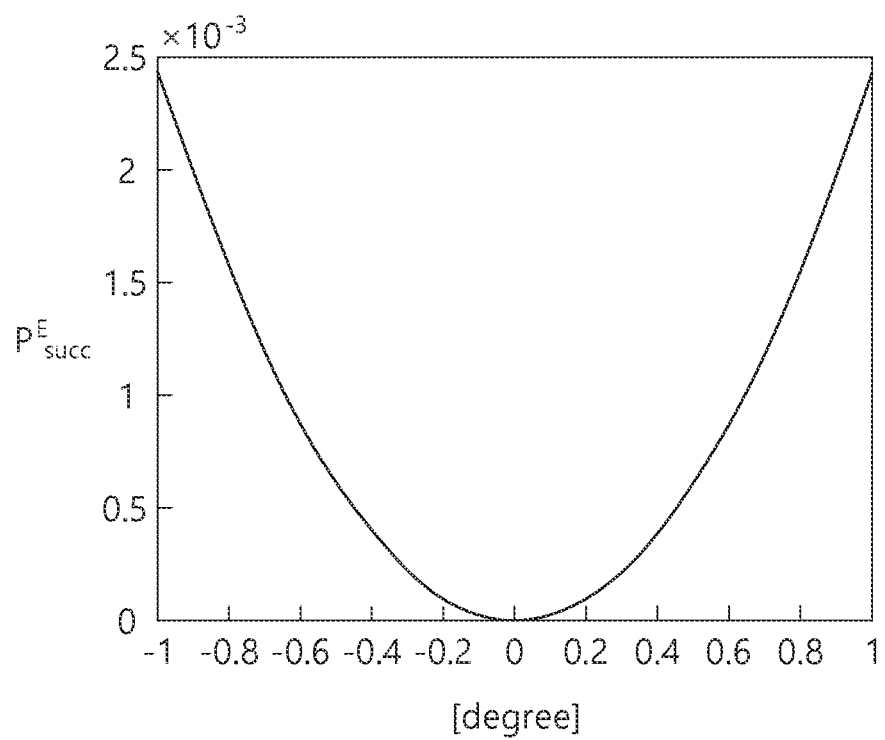
FIG. 24 schematically illustrates Eve's success probability in a PFM attack as a function of ε.

FIG. 24 schematically illustrates Eve's success probability in a PFM attack as a function of ε.

FIG. 24 shows P_succ^E as ε changes based on the above equation. Letting L_k=(½)*ρ_(k+1)+ρ_(k+2)+(½)*ρ_(k+3), Eve's POVM is M_k=x*ρ^(−½)|E_k⟩⟨E_k|*ρ^(−½), where E_k is the eigenvector for the smallest nonzero eigenvalue of ρ^(−½)L_kρ^(−½), and x is the largest real number such that $$M_{vac} = 1 - \sum_{k=0}^{3} M_k$$

is a positive semi-definite matrix. ε was varied from −1° to +1°, which is the process error range of a commercially available Faraday rotating mirror, and the corresponding P_succ^E was observed. As shown in FIG. 24, as the absolute value of ε increases, the probability of Eve's successful PFM attack increases, and if we consider the variation of the rotation angle with temperature and wavelength, the absolute value of ε may increase to a larger range than the 1° given as a fair error, so the risk of eavesdropping becomes more serious than shown in the graph.

To summarize, due to the distortion of the state space caused by the imperfection of the Faraday rotating mirror, the state of the information transmitted by Alice no longer conforms to the state of the BB84 protocol, and the three-dimensional distorted state space provides a security hole for Eve, enabling the PFM attack. Therefore, Alice and Bob need an additional solution to defend against this PFM attack and maintain the inherent security of the BB84 protocol in the PnP quantum key distribution scheme.

Meanwhile, the device described above may also be a device that includes, for example, a QKD transmitter (i.e., Alice side) and an encryptor (and/or decryptor). The another device may also be a device that includes, for example, a QKD receiver (i.e., Bob side) and a decryptor (and/or encryptor).

Examples of the device and another device may be illustrated by way of drawings.

Figure 25:
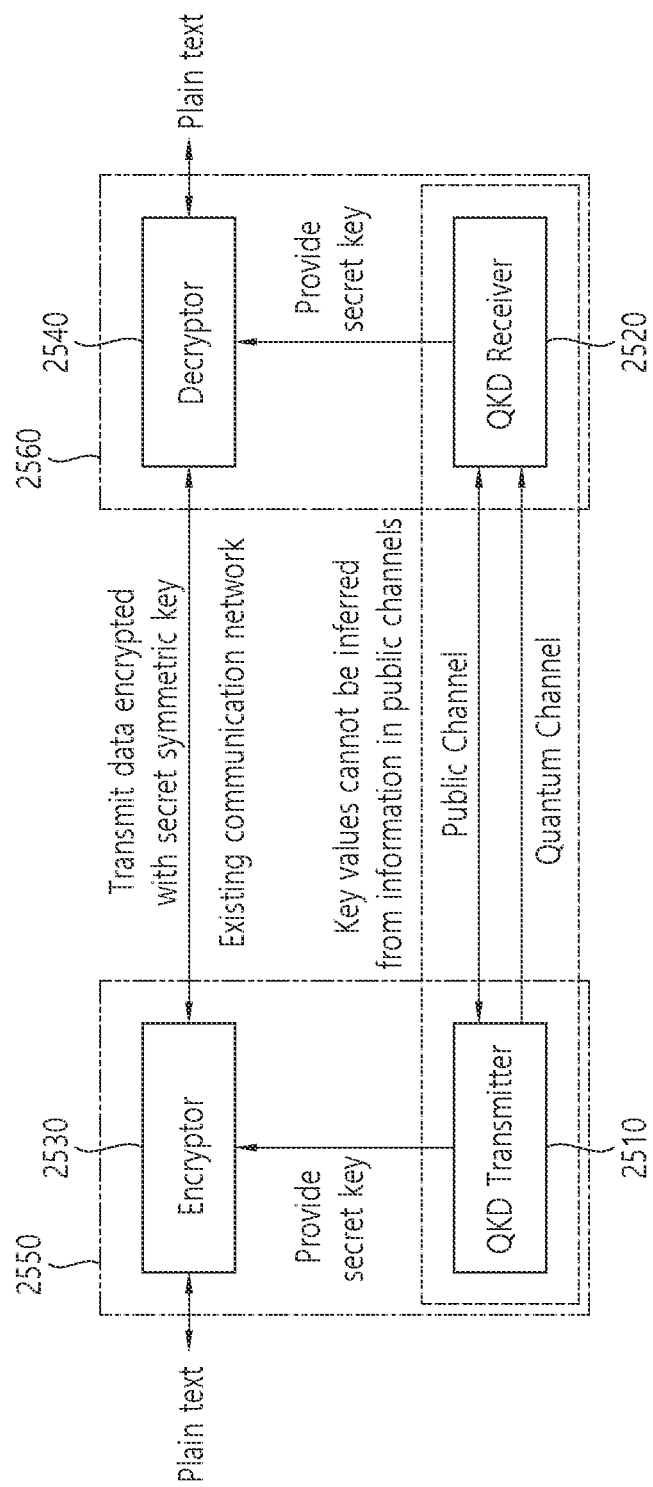
FIG. 25 schematically illustrates an example of a device according to one embodiment of the present disclosure.

FIG. 25 schematically illustrates an example of a device according to one embodiment of the present disclosure.

According to FIG. 25, a quantum key distribution (QKD) transmitter 2510 may be connected to a QKD receiver 2520 over a public channel and a quantum channel to perform communication.

The QKD transmitter 2510 may provide a secret key to an encryptor 2530, and the QKD receiver 2520 may also provide a secret key to a decryptor 2540. Here, the encryptor 2530 may have plaintext input/output, and the encryptor 2530 may transmit data encrypted with the secret symmetric key to the decryptor 2540 (over an existing communication network). Additionally, plaintext may be input to and output from the decryptor 2540.

Here, the encryptor and decryptor may transmit/receive data over a communication network as described above, where the communication network may refer to, for example, a communication network in the 3GPP family (e.g., a communication network based on LTE/LTE-A/NR), a communication network in the IEEE family, and the like.

The encryptor 2530 and the QKD transmitter 2510 may be included in a single device 2550, and the decryptor 2540 and the QKD receiver 2520 may also be included in a single device 2560.

Note that, for ease of explanation, the drawings depict a configuration in which the single device 2550 includes only the encryptor 2530 and the QKD transmitter 2510, but the single device 2550 may also include a separate decryptor in addition to the QKD transmitter 2510 and the encryptor 2530. Similarly, the single device 2560 may include a separate encryptor as well as the decryptor 2540 and the QKD receiver 2520.

The present disclosure will be described in more detail below.

The present disclosure relates to techniques for quantum key distribution (QKD) in quantum secure communication systems. More specifically, it relates to a method and device for detecting and correcting the magnitude and direction of polarization distortion caused by a Faraday rotator mirror, a key element in a plug-and-play (PnP) quantum key distribution system, using a coherent detection scheme to block a passive Faraday rotator mirror (PFM) attack.

The present disclosure proposes a method and system for measuring and correcting errors in a Faraday rotator mirror so that a commercially available Faraday rotator mirror can operate in or near an ideal state. The proposed system includes an error measurement device using a balanced photodetector and an error compensation device based on a variable Faraday rotator mirror (VFM) configuration. The measured result from the error measurement device is output as an optical current, which is converted/input into a current for forming an induced magnetic field in the variable Faraday rotator mirror so that the rotation angle error of the Faraday rotator mirror is canceled.

Hereinafter, embodiments of the present disclosure will be described with reference to the drawings. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 26:
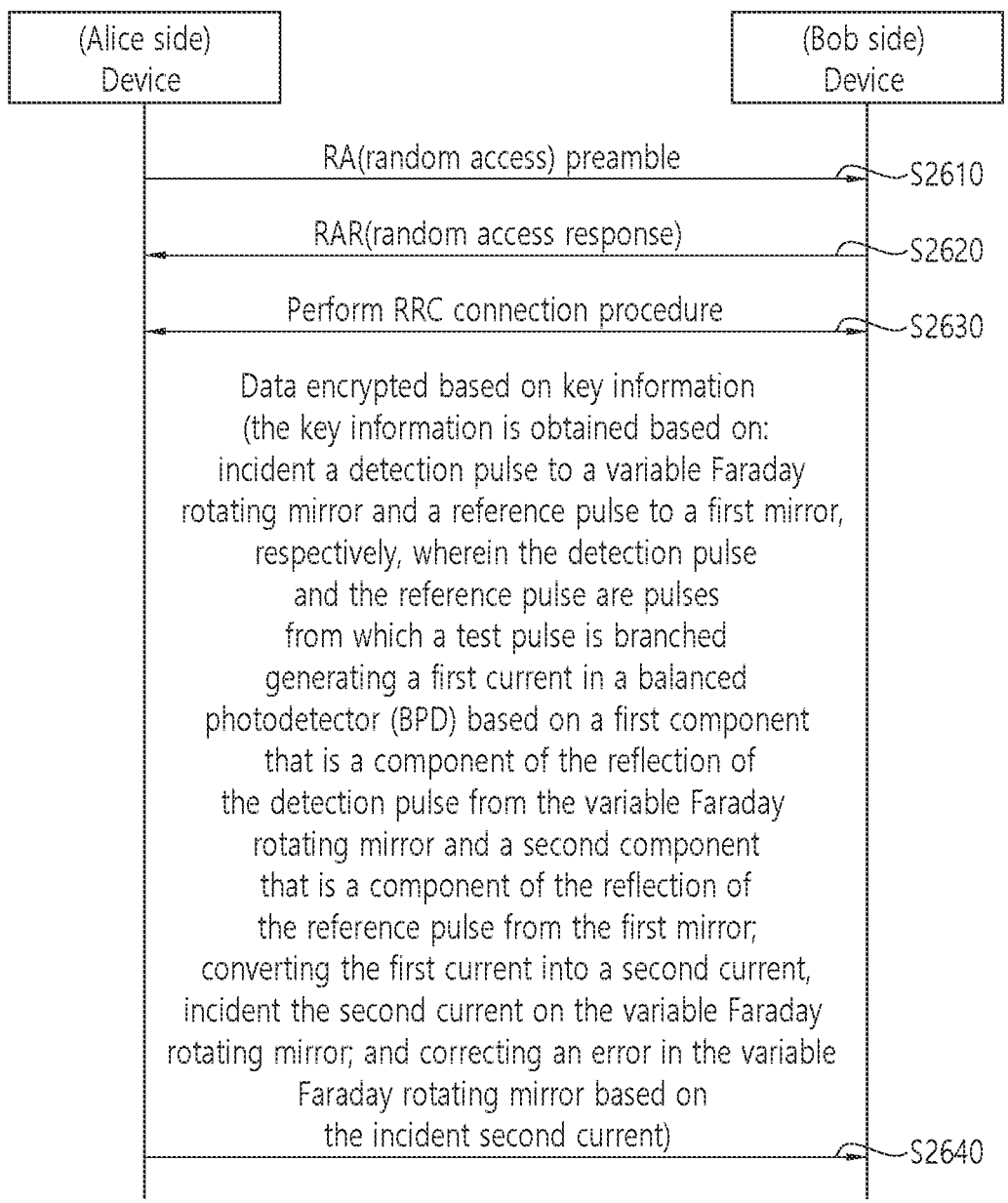
FIG. 26 is a flowchart of a method for correcting an error according to one embodiment of the present disclosure.

FIG. 26 is a flowchart of a method for correcting an error according to one embodiment of the present disclosure.

Referring to FIG. 26, a device may transmit a random access (RA) preamble to another device (S2610). Since more specific examples of this content have been described hereinbefore and/or will be described hereinafter, repetition of redundant content will be omitted.

The device may receive a random access response (RAR) from the another device in response to the RA preamble (S2620). Since more specific examples of this content have been described hereinbefore and/or will be described hereinafter, repetition of redundant content will be omitted.

The device may perform a radio resource control (RRC) connection procedure with the another device (S2630). Since more specific examples of this content have been described hereinbefore and/or will be described hereinafter, repetition of redundant content will be omitted.

The device may transmit the data encrypted based on the key information to the another device (S2640). Since more specific examples of this content have been described hereinbefore and/or will be described hereinafter, repetition of redundant content will be omitted.

Here, the key information may be obtained based on the following configuration.

A device may incident a detection pulse on a variable Faraday rotating mirror of the device, and a reference pulse on a first mirror of the device. Here, the detection pulse and the reference pulse may be pulses from which the test pulse is branched. Since more specific examples of this content have been described hereinbefore and/or will be described hereinafter, repetition of redundant content will be omitted.

The device may then generate a first current in a balanced photodetector (BPD) of the device based on a first component, which is a component of a reflection of the detection pulse from the variable Faraday rotating mirror, and a second component, which is a component of a reflection of the reference pulse from the first mirror. Since more specific examples of this content have been described hereinbefore and/or will be described hereinafter, repetition of redundant content will be omitted.

The device may then convert the first current into a second current based on i) a closed loop circuit, and/or ii) a control device (e.g., FPGA control electronics included in the Alice-side device to be described later). Since more specific examples of this content have been described hereinbefore and/or will be described hereinafter, repetition of redundant content will be omitted.

The device may incident the second current, i) derived as a result of a closed loop circuit, and/or ii) derived based on control of a control device, on the variable Faraday rotating mirror. Since more specific examples of this content have been described hereinbefore and/or will be described hereinafter, repetition of redundant content will be omitted.

The device may compensate for the error in the variable Faraday rotating mirror based on the incident second current (in other words, by adjusting the intensity/direction of the current input to the variable Faraday rotating mirror). Since more specific examples of this content have been described hereinbefore and/or will be described hereinafter, repetition of redundant content will be omitted.

For example, the device may convert the first current to the second current based on a closed loop circuit. Here, the closed loop circuit may include a loop filter and a transimpedance amplifier, the first current may be incident on the loop filter and the transimpedance, and the second current may be a current output from the loop filter and the transimpedance. Here, the absolute value of the second current may be determined based on the absolute value of the first current, the transmittance of the medium, the total number of conductors wound on the solenoid in the variable Faraday mirror, Verde constant, the sensitivity of the photodiode used in the BPD, and the magnitude of the detection pulse. Here, the absolute value of the second current is determined based on: $|I\_VFM|=1/(2*\mu*N*V)*(|I\_BPD|/(4*R*A^2)+1)$, where it may be that $|I\_VFM|$ is the absolute value of the second current, $\mu$ is the transmittance of the medium, N is the number of the total conductors, V is Verde constant, $|I\_BPD|$ is the absolute value of the first current, R is a value for the sensitivity, and A is the magnitude of the detection pulse. Since more specific examples of this content have been described hereinbefore and/or will be described hereinafter, repetition of redundant content will be omitted.

For example, a control device included in the device may convert the first current into the second current. Here, the absolute value of the second current is determined based on: $|I\_VFM|=1/(2*\mu*N*V)*\sin^(-1)(\sqrt(|I\_BPD|/(R*A^2)))$, where it may be that $|I\_VFM|$ is the absolute value of the second current, $\mu$ is the transmittance of the medium, N is the number of the total conductors, V is Verde constant, $|I\_BPD|$ is the absolute value of the first current, R is a value for the sensitivity, and A is the magnitude of the detection pulse. Since more specific examples of this content have been described hereinbefore and/or will be described hereinafter, repetition of redundant content will be omitted.

For example, the device may include the variable Faraday rotating mirror, the first mirror, and the BPD, and the variable Faraday mirror may comprise a Faraday rotor, a solenoid, and a second mirror. Since more specific examples of this content have been described hereinbefore and/or will be described hereinafter, repetition of redundant content will be omitted.

For example, the test pulse may be generated from a light source included in the device, or the test pulse may be received from the another device. Since more specific examples of this content have been described hereinbefore and/or will be described hereinafter, repetition of redundant content will be omitted.

For example, a time interval for error correction of the Faraday rotating mirror may be shared between the device and the another device. Since more specific examples of this content have been described hereinbefore and/or will be described hereinafter, repetition of redundant content will be omitted.

Hereinafter, the embodiments of the present disclosure will be described in more detail.

Figure 27:
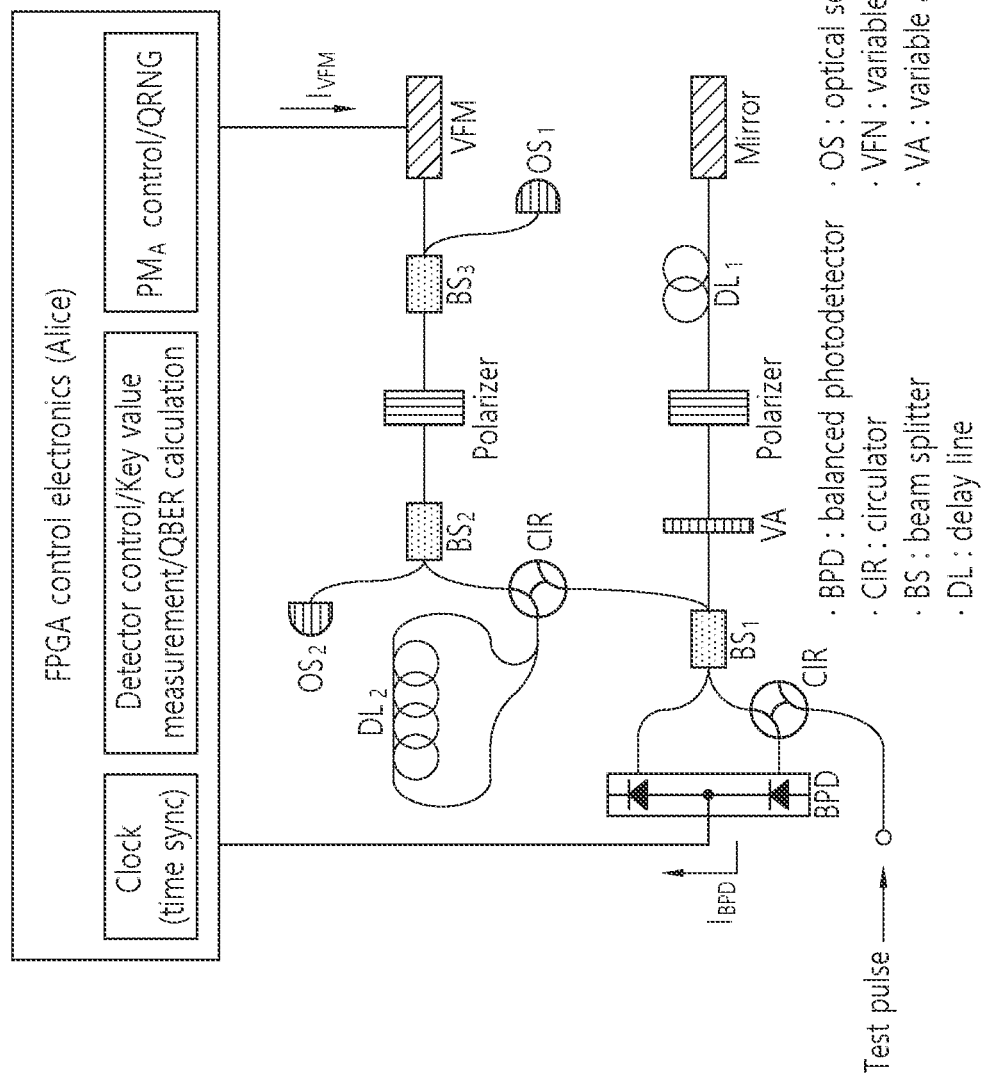
FIGS. 27 and 28 are configuration examples of an error measurement and correction device of a Faraday rotating mirror using a balanced photodetector proposed in the present disclosure.
Figure 28:
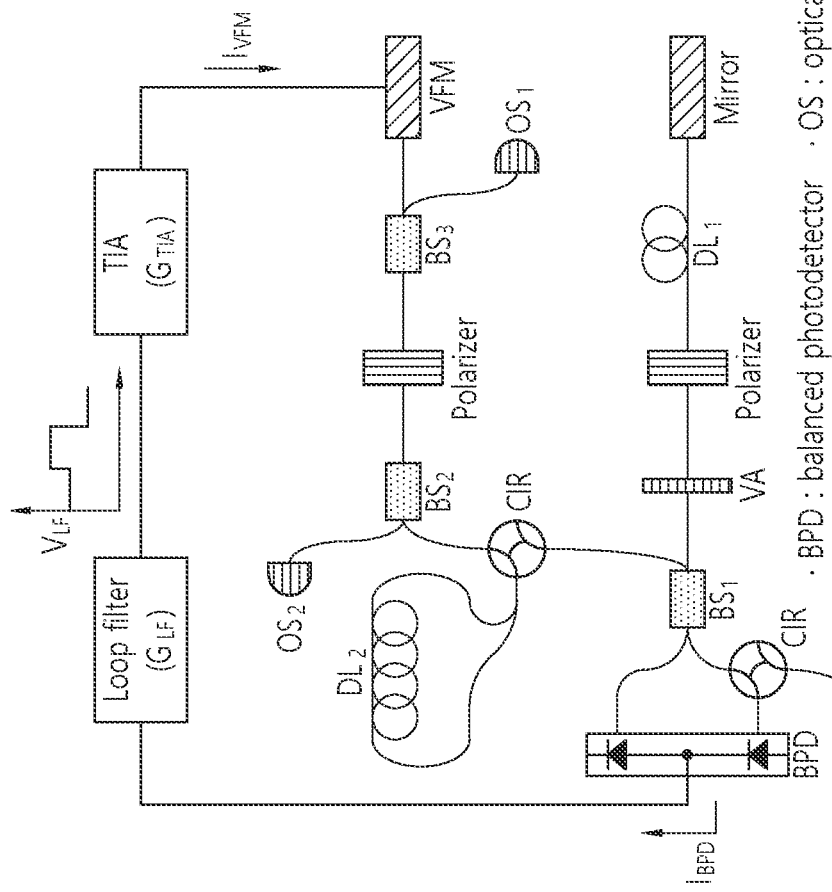

FIGS. 27 and 28 are configuration examples of an error measurement and correction device of a Faraday rotating mirror using a balanced photodetector proposed in the present disclosure.

According to the device in FIG. 27, the device may determine the magnitude and sign of $\varepsilon$, the rotation angle error of the Faraday rotating mirror, through an error detection process, and then calculate the current (I_VFM) that should be applied to the solenoid of the variable Faraday rotating mirror to compensate for it through calculation, and input it (to the Faraday rotating mirror) to provide error correction with only a single test pulse. Stated differently, the device of FIG. 27 may be referred to as a one-shot correction device.

According to the device of FIG. 28, the error detection result reflected in the output current of the balanced photodetector may be fed back to the input current (I_VFM) of the variable Faraday rotating mirror through a closed loop, and $\varepsilon$ may gradually converge to zero as the above loop is repeated with a plurality of test pulses.

In the PnP quantum key distribution system based on the proposal of the present disclosure, the test pulse may be generated by Alice by placing a light source such as a laser on the Alice side, or it may be generated by a laser arranged on the Bob side to reduce the weight of the Alice side, and then transmitted to the Alice side through a quantum channel. The test pulse should be sufficiently strong so that it may be detected by the photodetector even after most of the components are blocked by the polarizer and only the error components are filtered out. In the following, what is proposed herein will be described, divided into an error measurement method and device and an error correction method and device.

1. Method and Device for Measuring Rotation Angle Error of Faraday Rotating Mirror The error measurement method and device proposed herein are based on a synchronized light wave method utilizing a balanced photodetector.

Figure 29:
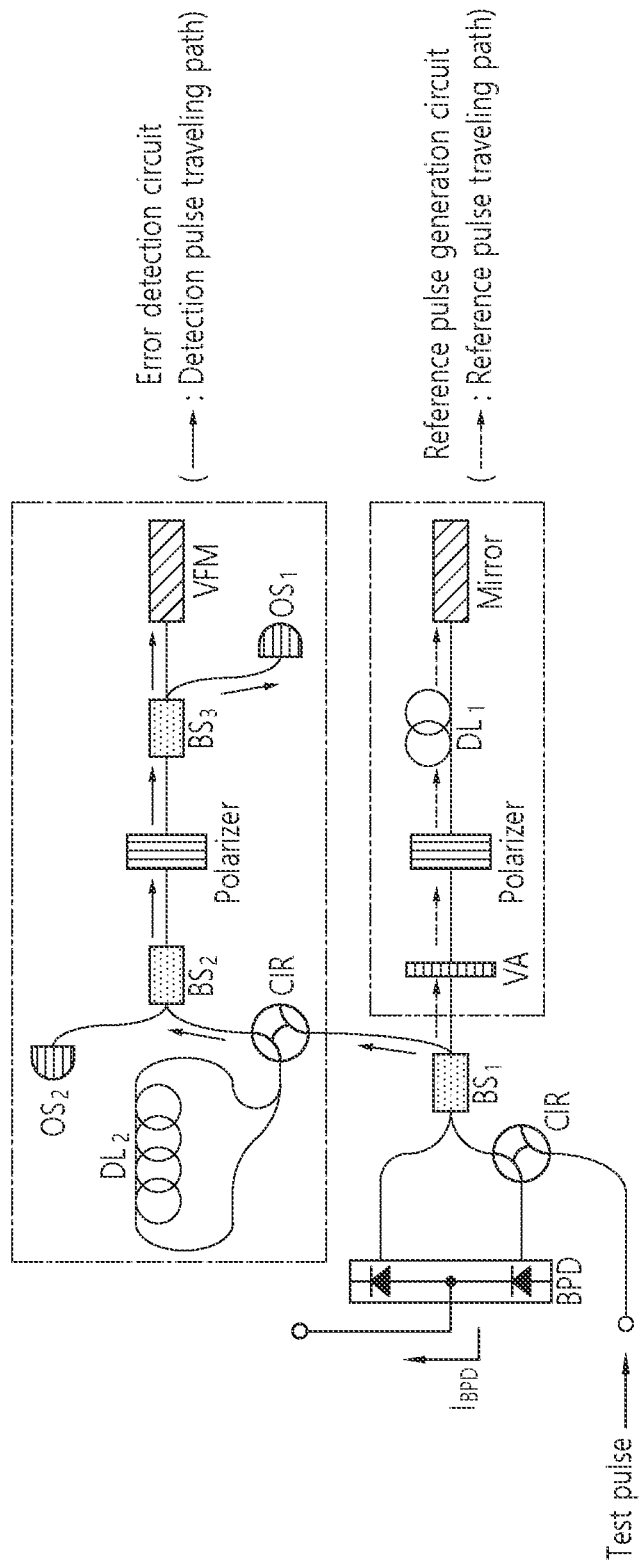
FIG. 29 schematically illustrates an example of an incident path of a detection pulse and a reflection pulse in an error measurement device based on the present disclosure.
Figure 30:
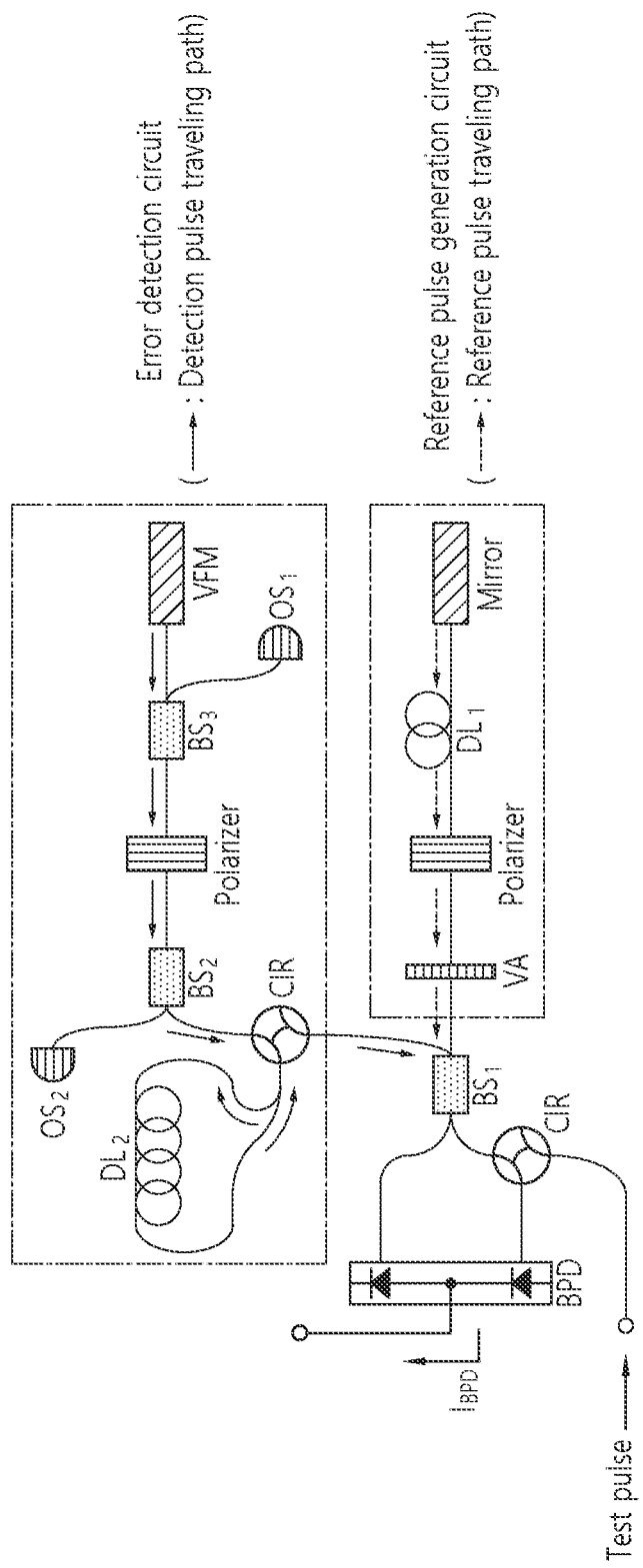
FIG. 30 schematically illustrates an example of a reflection path of a detection pulse and a reflection pulse in an error measurement device based on the present disclosure.

FIG. 29 schematically illustrates an example of an incident path of a detection pulse and a reflection pulse in an error measurement device based on the present disclosure. FIG. 30 schematically illustrates an example of a reflection path of a detection pulse and a reflection pulse in an error measurement device based on the present disclosure.

FIGS. 29 and 30 are exemplary configurations of an error measurement device based on the present disclosure, with parts common to the one-shot correction device of FIG. 27 and the closed-loop-based correction device of FIG. 28. FIG. 29 shows a traveling path when a test pulse is bifurcated into a detection pulse and a reference pulse and incident on BS1, and FIG. 30 shows a traveling path when the detection pulse and the reference pulse are reflected by a Faraday rotating mirror and an ordinary mirror, respectively.

Figure 31:
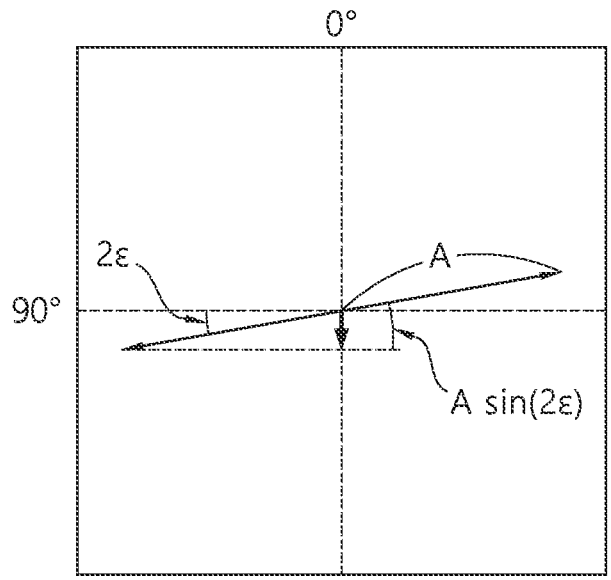
FIG. 31 schematically illustrates an example of a reflected wave polarization state of a Faraday rotating mirror with a rotation angle error of ε.

FIG. 31 schematically illustrates an example of a reflected wave polarization state of a Faraday rotating mirror with a rotation angle error of $\varepsilon$.

The detection pulse and the reference pulse arrive at the Faraday rotating mirror and the ordinary mirror, respectively, with only the specific polarization component (in this example, the vertical polarization component) set in the polarizer at the time of incident being filtered out. The reference pulse reflected by the ordinary mirror maintains the same polarization at both the incident and the reflection, so the component that passed through the polarizer at the incident is still passed through at the reflection.

On the other hand, the detection pulse reflected by the Faraday rotating mirror will ideally arrive at the polarizer with the polarization rotated by 90° compared to the incidence, so the return component will be zero because it is all blocked by the polarizer.

However, in the case of a Faraday rotating mirror with a rotation angle error of $\varepsilon$, as shown in FIG. 31, the polarization state of the reflected detection pulse becomes $90°+2\varepsilon$, and a component equal to $\sin(2\varepsilon)$ with respect to the incident component passes through the polarizer. Therefore, when the incident detection pulse has a magnitude of A, the magnitude a of the component passing through the polarizer in the reflection path becomes $a=A*\sin|2\varepsilon|$.

Figure 32:
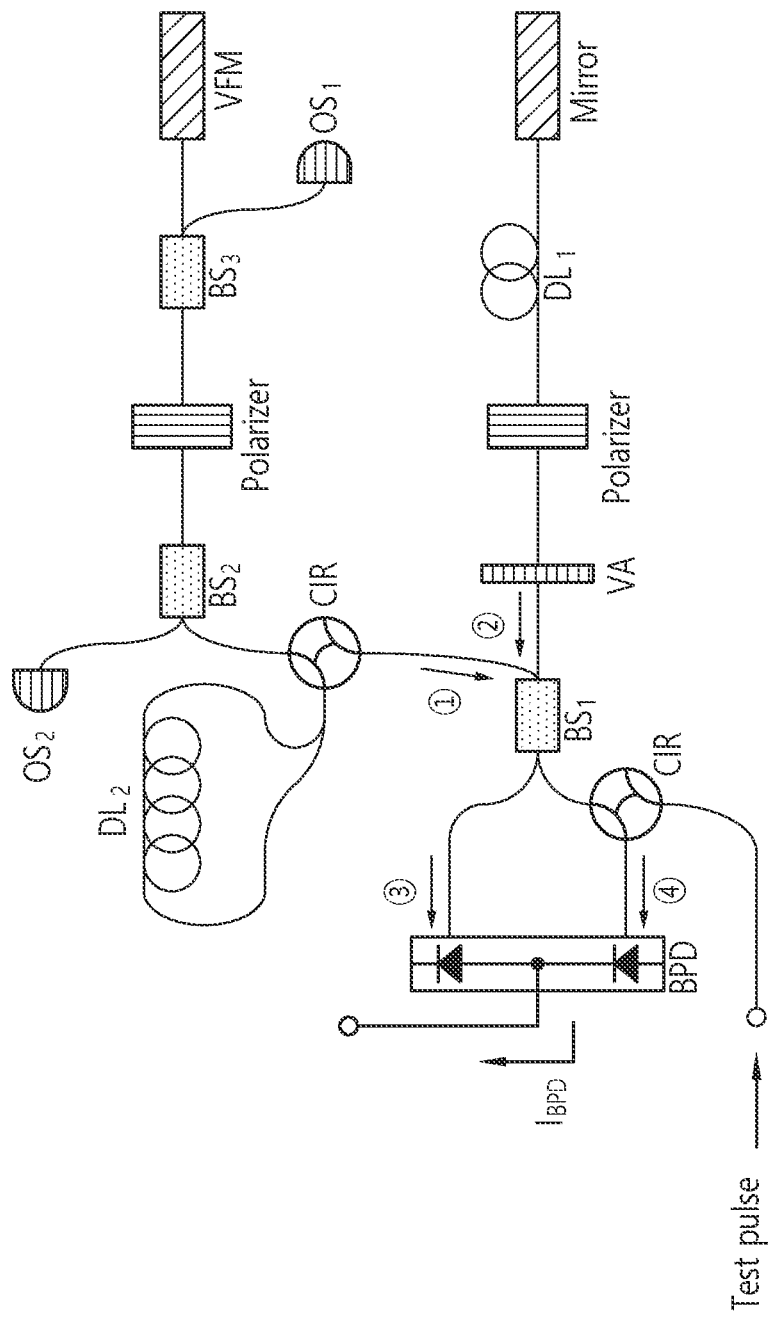
FIG. 32 schematically illustrates an example of interference of a detection pulse and a reference pulse in an error measurement device based on the present disclosure.

FIG. 32 schematically illustrates an example of interference of a detection pulse and a reference pulse in an error measurement device based on the present disclosure.

According to FIG. 32, the detection pulse (①) and the reference pulse (②), which are reflected and returned from their respective paths, meet simultaneously at BS1 and diverge again (③ and ④), causing constructive Interference or destructive Interference in their respective paths (FIG. 32). As shown in FIG. 31, when ε>0, the phase inversion occurs with respect to the vertical polarization component of the detection pulse, resulting in a phase difference of 180° from the reference pulse, and when ε<0, the vertical polarization component of the detection pulse and the reference pulse are in the same phase.

Depending on the phase state of the detection pulse, the magnitude of the detection pulse in path ① and the magnitude of the reference pulse in path ② should be equal in order for the interference results of the two pulses to be completely canceled in one of the two paths. The variable attenuator in the reference pulse generation circuit attenuates the magnitude of the reference pulse at ② so that it is equal to the magnitude a of the detection pulse at ①, and for this purpose, the attenuation rate is adjusted in advance based on the magnitude of the detection pulse measured by OS2.

As shown in FIGS. 31 and 32, the reference pulse passes through DL1 at both incident and reflection with a time delay of t_d, but the detection pulse is bypassed by the circulator and proceeds directly to the polarizer at incident, and only passes through DL2 at reflection, with a time delay of 2t_d.

This is to ensure that the time between the arrival of the reflected component of the detection pulse at OS2 and the arrival of the reflected component of the reference pulse at the variable attenuator is different, so that the variable attenuator can be adjusted based on the measurement of OS2.

Let a_1 be the state of the detection pulse that has been incident on the error detection circuit and reflected back to BS1, and let a_2 be the state of the reference pulse that has been incident on the reference pulse generation circuit and reflected back to BS1. Since both pulses a_1 and a_2 arrive at BS1 at the same time with only the vertically polarized component, the state of the two pulses may be expressed in terms of their magnitudes and phases, and the result is as follows.

$$a\_1 = a * e^{j\varphi}$$

$$a\_2 = a$$

where φ corresponds to the relative phase difference of a_1 with respect to the phase of a_2 when viewed with φ=0, and has a value of 0 or π depending on the sign of ε (i.e., φ∈{0,π}). As shown in FIG. 31, when ε>0, there is a sign reversal in the vertical polarization component of the detection pulse, and a_1 and a_2 are in opposite phases, so φ=π. When ε<0, there is no sign change in the vertical polarization component of the detection pulse due to the Faraday rotator, and a_1 and a_2 are in the same phase state, so φ=0.

BS1 splits a_1 and a_2 50:50 on the paths of ③ and ④, and the split component of a_2 directed to the path of ④ contains a phase inversion. Therefore, the interference components a_3 and a_4 of the two pulses appearing on the paths of ③ and ④ are expressed as follows.

$$a\_3 = (1/2) * (a\_1 + a\_2) = (1/2) * a * (1 + e^{j*\varphi})$$

$$a\_4 = (1/2) * (a\_1 - a\_2) = (1/2) * a * (1 - e^{j*\varphi})$$

Figure 33:
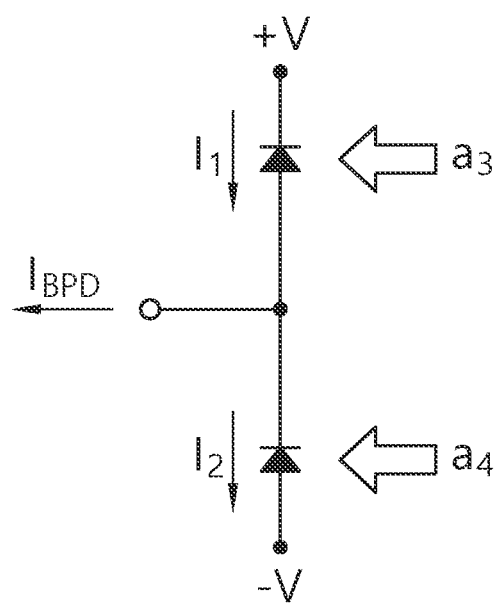
FIG. 33 schematically illustrates an example of generation and flow of an optical current for an optical input in a balanced photodetector.

FIG. 33 schematically illustrates an example of generation and flow of an optical current for an optical input in a balanced photodetector.

FIG. 33 illustrates an optical pulse input to each photodiode in a balanced photodetector used herein and the flow of optical current generated thereby. As shown in FIG. 33, the output current I_BPD of the balanced photodetector is determined by the optical current I_1 generated by a_3 and the optical current I_2 generated by a_4 as follows.

$$I\_1 = R * |a\_3|^2 = \quad \text{[Equation 9]}$$
$$(1/4) * R * |a\_1 + a\_2|^2 = (1/2) * R * a^2 * (1 + \cos\varphi)$$
$$I\_2 = R * |a\_4|^2 = (1/4) * R * |a\_1 - a\_2|^2 = (1/2) * R * a^2 * (1 - \cos\varphi)$$
$$I_{BPD} = I_1 - I_2 = \frac{1}{2} Ra^2 \times 2\cos\varphi = Ra^2 \cos\varphi = \begin{cases} Ra^2 & \text{if } \varphi = 0 \text{ (i.e. } \varepsilon < 0) \\ -Ra^2 & \text{if } \varphi = \pi \text{ (i.e. } \varepsilon > 0) \end{cases}$$

where R is the responsivity of the photodiode used in the balanced photodetector, which represents the current output per intensity of light input. As can be seen from the above equation, if ε>0 (i.e., φ=π), perfect destructive interference occurs in the path of ③, resulting in a_3=0, I_1=0, so I_BPD=−I_2=−R*a^2, and if ε<0 (i.e., φ=0), perfect destructive interference occurs in the path of ④, resulting in a_4=0, I_2=0, so I_BPD=I_1=R*a^2. Therefore, the magnitude of ε may be calculated from the magnitude of I_BPD and the sign of ε may be calculated from the direction (sign) of I_BPD.

1. Method and Device for Correcting Rotation Angle Error of Faraday Rotating Mirror As illustrated by the examples of FIGS. 27 and 28, the present disclosure proposes a method for correcting an error of a Faraday rotating mirror based on error information detected by a balanced photodetector in two ways. In the following, each correction method will be described as a one-shot correction technique (e.g., 2.1) in which the error can be corrected with only a single test pulse, and a closed-loop-based correction technique (e.g., 2.2) in which the error gradually converges to zero as the loop is repeated with a plurality of test pulses.

Figure 34:
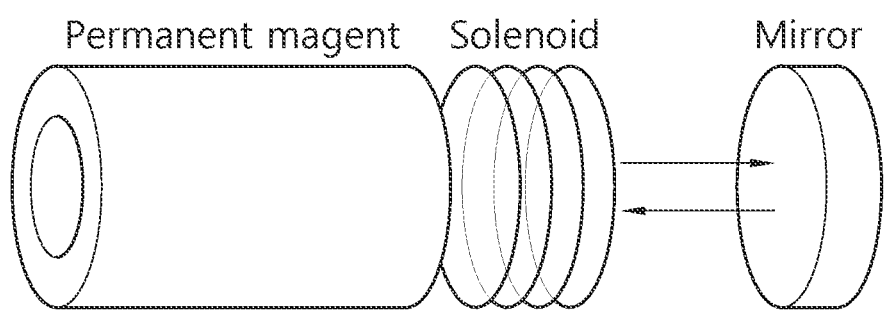
FIG. 34 schematically illustrates an example structure of a variable Faraday rotating mirror.

FIG. 34 schematically illustrates an example structure of a variable Faraday rotating mirror.

Both correction methods include the configuration of a variable Faraday rotator mirror (VFM) as shown in FIG. 34. A variable Faraday rotator mirror is a conventional Faraday rotating mirror structure consisting of a Faraday rotator and a mirror, with the addition of a solenoid for induced magnetic field formation.

By adjusting the orientation, the magnitude and direction of the induced magnetic field may be adjusted. At this time, if the strength of the current flowing in the solenoid is called I_VFM [A], the induced magnetic field B_i [T] formed is determined by the following equation.

$$B\_i = \mu * I\_VFM * n \quad \text{[Equation 10]}$$

where μ [H/m] is the permeability of the medium and n is the number of wires wound per unit length. If the length of the solenoid is L and the total number of conductors wound on the solenoid is N, then n=N/L.

Using Faraday's law, from the error ε obtained by the above error detection device, the magnitude of the induced magnetic field B_i required by the variable Faraday rotating mirror is $B\_i=\varepsilon/(V*L)$, and the current strength of the solenoid required to form the induced magnetic field is calculated as follows.

$$I\_VFM=B\_i/(\mu*n)=(\varepsilon/(V*L))-(1/(\mu*n))=\varepsilon/(\mu*N*V) \quad \text{[Equation 11]}$$

Depending on the sign of ε, the direction of the current may be clockwise or counterclockwise to cancel it out.

2.1. One-Shot Correction Technique

Figure 35:
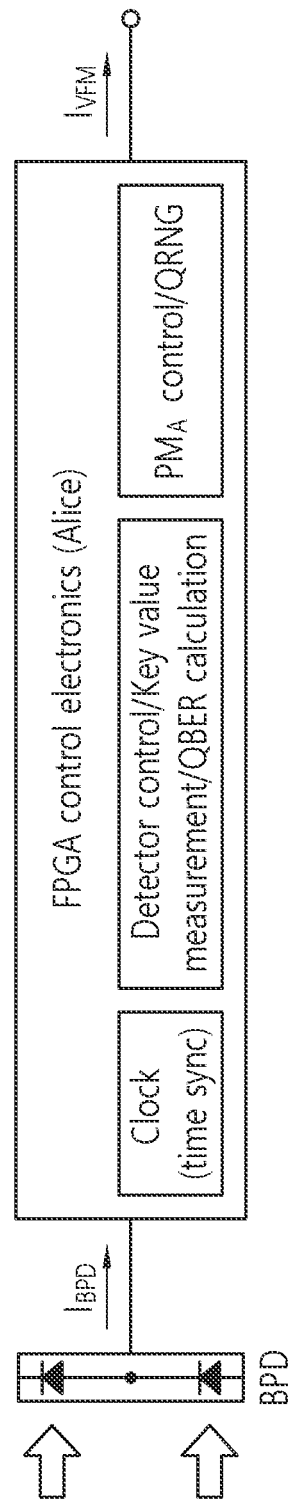
FIG. 35 schematically illustrates an example of a one-shot correction device configuration.

FIG. 35 schematically illustrates an example of a one-shot correction device configuration.

FIG. 35 is an example of a one-shot correction device configuration in which an input current I_VFM for the formation of an induced magnetic field of a variable Faraday rotating mirror is derived through calculation from an output current I_BPD of a balanced photodetector in an error measurement device, and is the same as in FIG. 27, minus the error measurement device.

In the previous description of the error measurement method and device, it was confirmed that $|I\_BPD|=R*a^2$. Using $a=A*\sin|2\varepsilon|$, it may be summarized as $|I\_BPD|=R*A^2*(\sin|2\varepsilon|)^2$. This may be summarized as an equation in terms of ε.

$$|\epsilon| = \frac{1}{2}\sin^{-1}\sqrt{\frac{|I_{BPD}|}{RA^2}} \quad \text{[Equation 12]}$$

Substituting the above equation into $I\_VFM=\varepsilon/(\mu*N*V)$, the relationship between I_BPD and I_VFM may be obtained as follows.

$$|I_{VFM}| = \frac{1}{2\mu NV}\sin^{-1}\sqrt{\frac{|I_{BPD}|}{RA^2}} \quad \text{[Equation 13]}$$

In a one-shot correction device, the magnitude of I_VFM is obtained through the above equation, and the direction of I_VFM to offset the error is derived from the sign of I_BPD. Therefore, the error can be corrected through a single error measurement process using a single test pulse.

2.2. Closed-Loop Correction Technique

Figure 36:
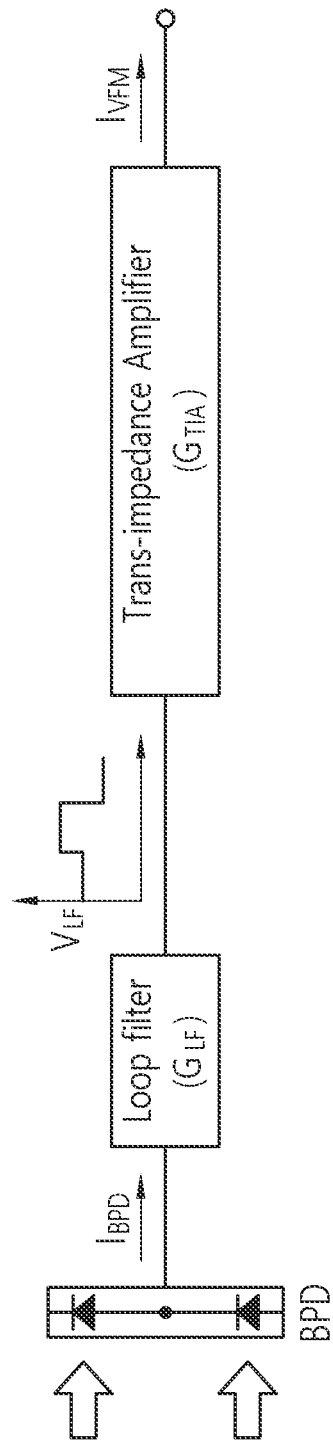
FIG. 36 schematically illustrates an example of a closed-loop-based correction device.

FIG. 36 schematically illustrates an example of a closed-loop-based correction device.

FIG. 36 is an example of a device configuration that uses the output current, I_BPD, of a balanced photodetector to approximate the input current, I_VFM, of a variable Faraday circulator through a closed loop so that the error gradually converges to zero as the loop is repeated. This is the same as in FIG. 28, minus the error measurement device.

Assuming $|2\varepsilon|\ll 1$, the previously derived result of $|I\_BPD|=R*A^2*(\sin|2\varepsilon|)^2$ may be approximated using a Taylor series as follows.

$$|I_{BPD}| = RA^2(\sin|2\epsilon|)^2 \approx RA^2|2\epsilon|^2 \quad \text{[Equation 14]}$$

$$|\epsilon| \approx \sqrt{\frac{|I_{BPD}|}{4RA^2}} = \sqrt{1+\left(\frac{|I_{BPD}|}{4RA^2}-1\right)} \approx 1+\frac{1}{2}\left(\frac{|I_{BPD}|}{4RA^2}-1\right) = \frac{1}{2}\left(\frac{|I_{BPD}|}{4RA^2}+1\right)$$

Substituting the above equation into $I\_VFM=\varepsilon/(\mu*N*V)$, the relationship between I_BPD and I_VFM may be obtained as follows.

$$|I_{VFM}| = \frac{1}{2\mu NV}\left(\frac{|I_{BPD}|}{4RA^2}+1\right) \quad \text{[Equation 15]}$$

It can be seen that the relationship between I_BPD and I_VFM is approximated by a linear relationship and is expressed in a much simpler form compared to the equations used in the one-shot correction technique. In the closed-loop circuit of FIG. 17, the gain G_LF of the loop filter and the gain G_TIA of the trans-impedance amplifier (TIA) may be designed so that the transfer function of the closed loop satisfies the above equations.

In the closed-loop-based error correction technique, the approximation assuming $|2\varepsilon|\ll 1$ is an important factor in the design, so if $|2\varepsilon|\ll 1$ is not satisfied, the derived I_VFM may differ from the I_VFM actually required for error correction. This may reduce the accuracy of the error correction during the initial correction phase (when the number of iterations of the loop is small), but the error during this initial correction phase will not affect the eventual convergence to ε=0 because the absolute value of ε will approach zero as the loop iterates, and the accuracy of the approximation will increase as well.

The present proposes a one-shot correction technique for detecting the magnitude and direction of the rotation angle error in a commercially available Faraday rotating mirror using a synchronized light wave method, and for correcting using a single test pulse based on this, and a closed-loop-based correction technique for converging the error to zero using multiple test pulses. Based on the proposed method and device, an imperfect Faraday rotating mirror can be corrected to behave as an ideal Faraday rotating mirror, thereby eliminating the security loophole caused by the imperfection of the Faraday rotating mirror to defend against PFM attacks and ensure that the PnP quantum key distribution system can still guarantee the ideal security of the BB84 protocol.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Meanwhile, the aforementioned embodiments may be described from another perspective.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 37:
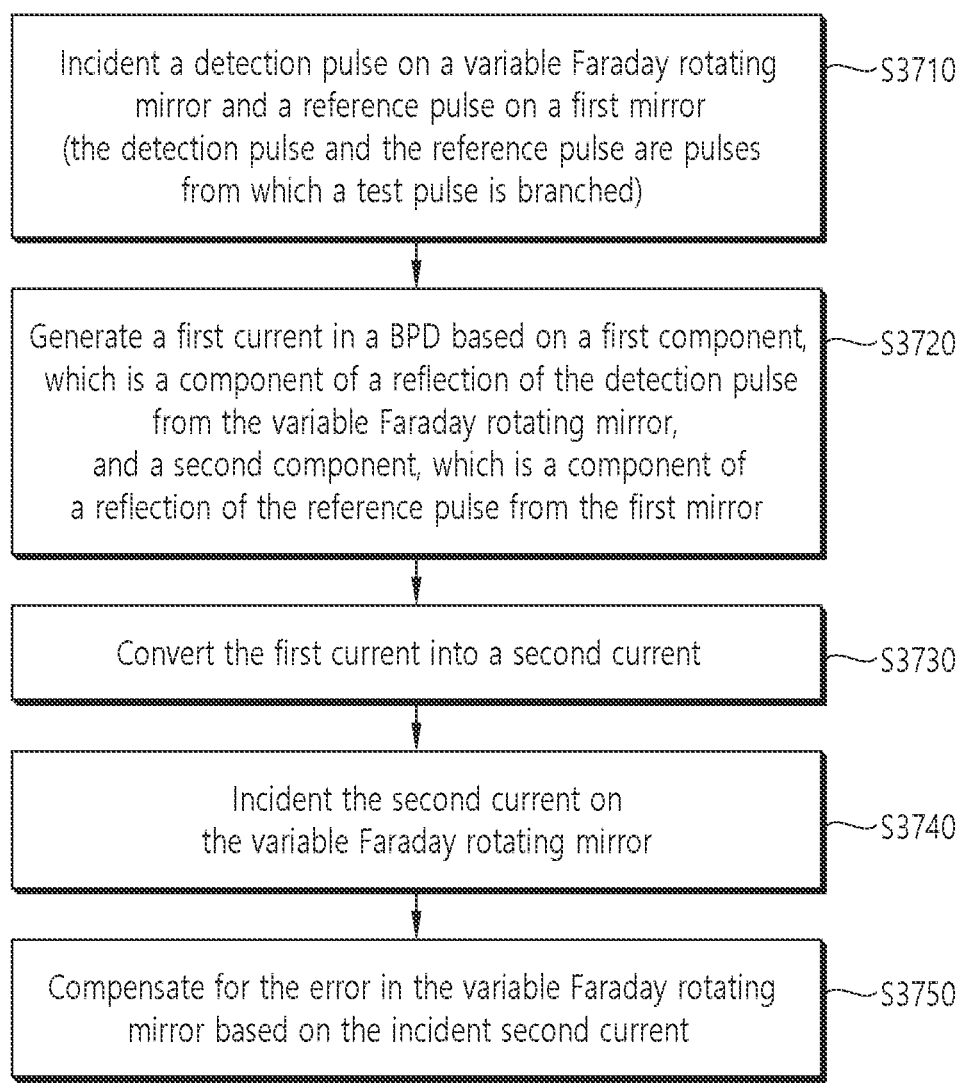
FIG. 37 is a flowchart of a method for correcting an error, from a device perspective (from Alice side), according to one embodiment of the present disclosure.

FIG. 37 is a flowchart of a method for correcting an error, from a device perspective (from Alice side), according to one embodiment of the present disclosure.

According to FIG. 37, the device may obtain key information based on the following configuration.

The device may incident a detection pulse on a variable Faraday rotating mirror of the device, and a reference pulse on a first mirror of the device (S3710). Here, the detection pulse and the reference pulse may be pulses from which a test pulse is branched (at BS1 of the device). Since more specific examples of this content have been described hereinbefore and/or will be described hereinafter, repetition of redundant content will be omitted.

The device may then generate a first current in a balanced photodetector (BPD) of the device (S3720) based on a first component, which is a component of a reflection of the detection pulse from the variable Faraday rotating mirror, and a second component, which is a component of a reflection of the reference pulse from the first mirror. Since more specific examples of this content have been described hereinbefore and/or will be described hereinafter, repetition of redundant content will be omitted.

The device may then convert the first current into a second current (S3730) based on i) a closed loop circuit, and/or ii) a control device (e.g., FPGA control electronics included in the device on the Alice side, to be described later). Since more specific examples of this content have been described hereinbefore and/or will be described hereinafter, repetition of redundant content will be omitted.

The device may incident the second current on the variable Faraday rotating mirror (S3740), which may be i) derived as a result of a closed loop circuit, and/or ii) derived based on control of the control device. Since more specific examples of this content have been described hereinbefore and/or will be described hereinafter, repetition of redundant content will be omitted.

The device may compensate for the error in the variable Faraday rotating mirror based on the incident second current (in other words, by adjusting the strength/direction of the current input to the variable Faraday rotating mirror) (S3750). Since more specific examples of this content have been described hereinbefore and/or will be described hereinafter, repetition of redundant content will be omitted.

Figure 38:
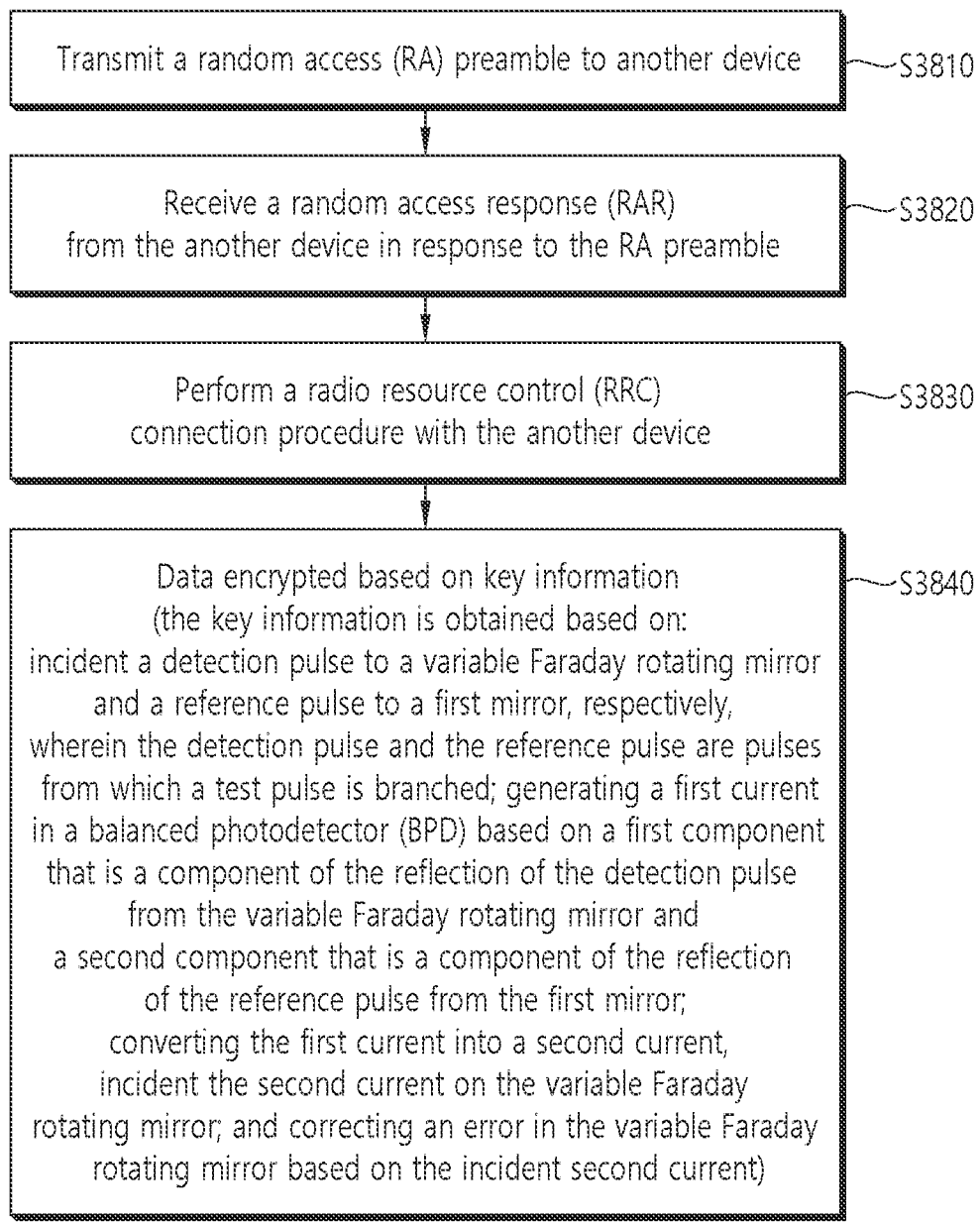
FIG. 38 is a flowchart of a method for correcting an error, from a device perspective (from Alice side), according to another embodiment of the present disclosure.

FIG. 38 is a flowchart of a method for correcting an error, from a device perspective (from Alice side), according to another embodiment of the present disclosure.

According to FIG. 38, a device may transmit a random access (RA) preamble to another device (S3810). Since more specific examples of this content have been described hereinbefore and/or will be described hereinafter, repetition of redundant content will be omitted.

The device may receive a random access response (RAR) from the another device in response to the RA preamble (S3820). Since more specific examples of this content have been described hereinbefore and/or will be described hereinafter, repetition of redundant content will be omitted.

The device may perform a radio resource control (RRC) connection procedure with the another device (S3830). Since more specific examples of this content have been described hereinbefore and/or will be described hereinafter, repetition of redundant content will be omitted.

The device may transmit data encrypted based on the key information to the another device (S3840).

Here, the key information may be obtained based on: incident a detection pulse on the variable Faraday rotating mirror and a reference pulse to the first mirror, respectively, wherein the detection pulse and the reference pulse are pulses from which the test pulse is branched, generating a first current in the BPD based on a first component that is a component of the reflection of the detection pulse from the variable Faraday rotating mirror and a second component that is a component of the reflection of the reference pulse from the first mirror, converting the first current into a second current, incident the second current on the variable Faraday rotating mirror, and correcting an error in the variable Faraday rotating mirror based on the incident second current. Since more specific examples of this content have been described hereinbefore and/or will be described hereinafter, repetition of redundant content will be omitted.

Figure 39:
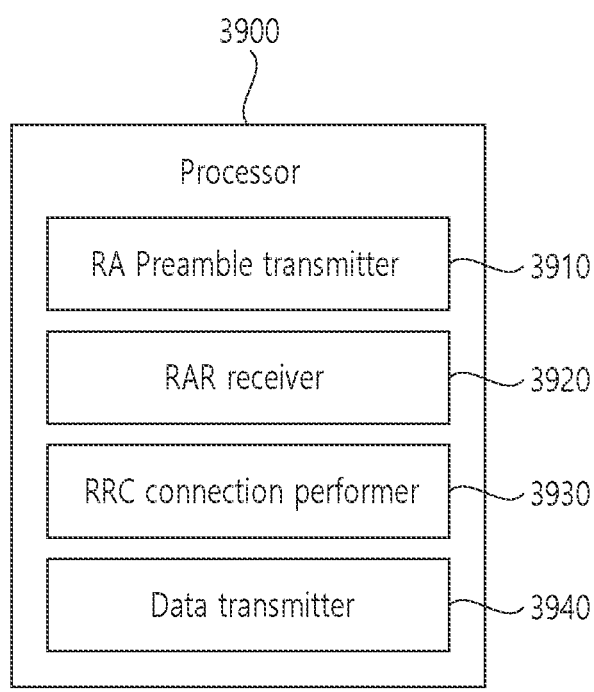
FIG. 39 is a block diagram of an example of an error correction device, from a device perspective (from Alice side), according to one embodiment of the present disclosure.

FIG. 39 is a block diagram of an example of an error correction device, from a device perspective (from Alice side), according to one embodiment of the present disclosure.

Referring to FIG. 39, a processor 3900 may include a RA preamble transmitter 3910, a RAR receiver 3920, an RRC connection performer 3930, and a data transmitter 3940. Here, the processor 3900 may correspond to a processor described later (or earlier).

The RA preamble transmitter 3910 may be configured to control a transceiver to transmit a random access (RA) preamble to another device. Since more specific examples of this content have been described hereinbefore and/or will be described hereinafter, repetition of redundant content will be omitted.

The RAR receiver 3920 may be configured to control the transceiver to receive a random access response (RAR) from the another device in response to the RA preamble. Since more specific examples of this content have been described hereinbefore and/or will be described hereinafter, repetition of redundant content will be omitted.

The RRC connection performer 3930 may be configured to perform a radio resource control (RRC) connection procedure with the another device. Since more specific examples of this content have been described hereinbefore and/or will be described hereinafter, repetition of redundant content will be omitted.

The data transmitter 3940 may be configured to control the transceiver to transmit encoded data based on the key information to the another device.

Here, the key information may be obtained based on: incident a detection pulse on the variable Faraday rotating mirror and a reference pulse to the first mirror, respectively, wherein the detection pulse and the reference pulse are pulses from which the test pulse is branched, generating a first current in the BPD based on a first component that is a component of the reflection of the detection pulse from the variable Faraday rotating mirror and a second component that is a component of the reflection of the reference pulse from the first mirror, converting the first current into a second current, incident the second current on the variable Faraday rotating mirror, and correcting an error in the variable Faraday rotating mirror based on the incident second current. Since more specific examples of this content have been described hereinbefore and/or will be described hereinafter, repetition of redundant content will be omitted.

Figure 40:
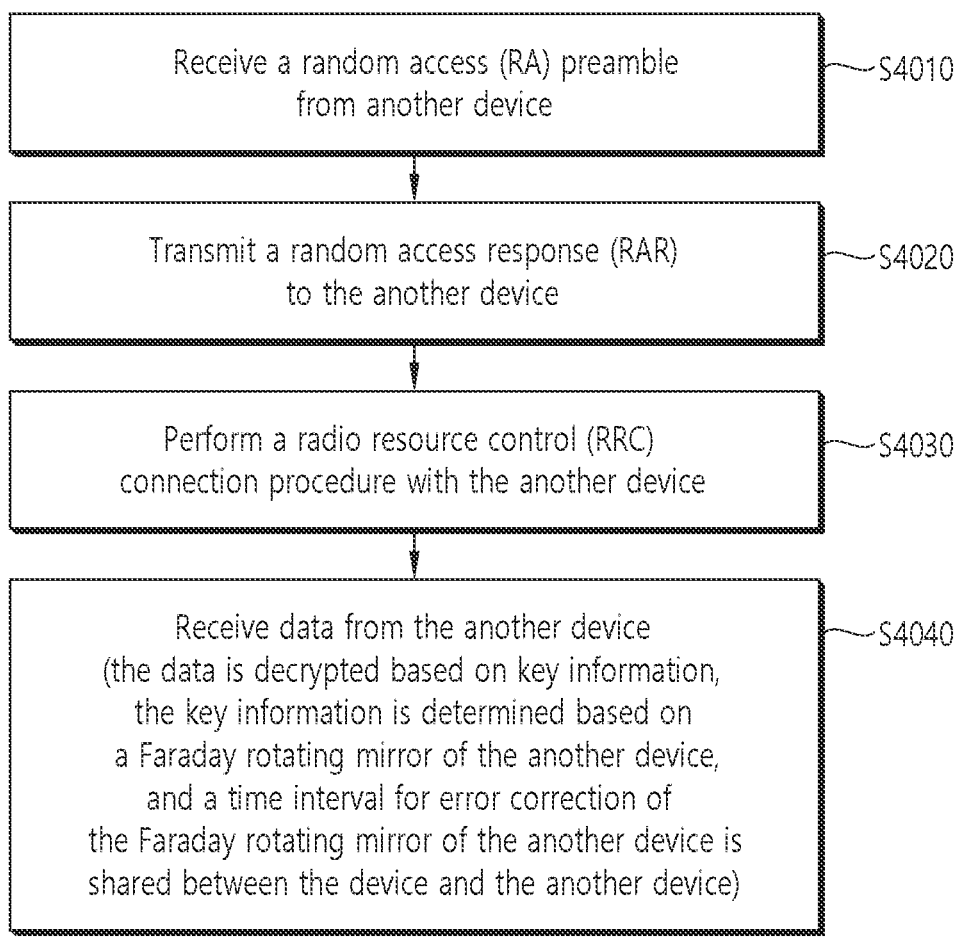
FIG. 40 is a flowchart of a method for sharing a time interval, from a device perspective (from Bob side), according to one embodiment of the present disclosure.

FIG. 40 is a flowchart of a method for sharing a time interval, from a device perspective (from Bob side), according to one embodiment of the present disclosure.

According to FIG. 40, a device may receive a random access (RA) preamble from another device (S4010). Since more specific examples of this content have been described hereinbefore and/or will be described hereinafter, repetition of redundant content will be omitted.

The device may transmit a random access response (RAR) to the another device (S4020). Since more specific examples of this content have been described hereinbefore and/or will be described hereinafter, repetition of redundant content will be omitted.

The device may perform a radio resource control (RRC) connection procedure with the another device (S4030). Since more specific examples of this content have been described hereinbefore and/or will be described hereinafter, repetition of redundant content will be omitted.

The device may receive data from the another device (S4040). Here, the data may be decrypted based on key information, the key information may be determined based on a Faraday rotating mirror of the another device, and a time interval for error correction of the Faraday rotating mirror of the another device may be shared between the device and the another device. Since more specific examples of this content have been described hereinbefore and/or will be described hereinafter, repetition of redundant content will be omitted.

Figure 41:
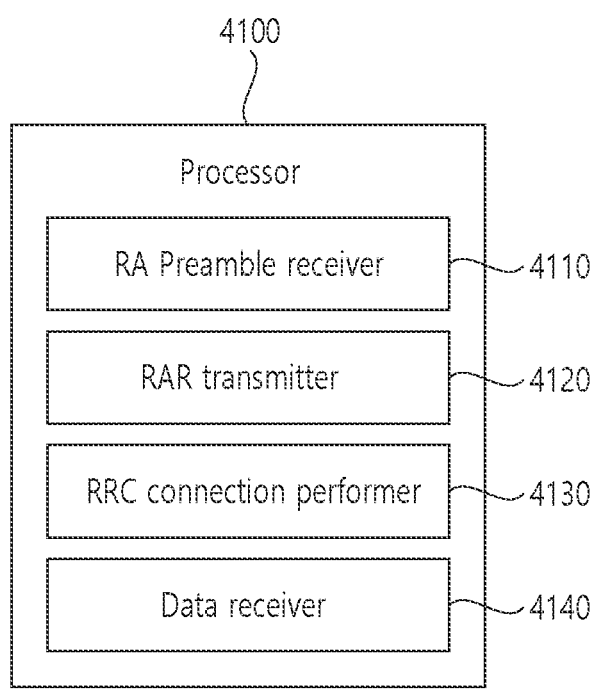
FIG. 41 is a block diagram of an example of a device in which a time interval is shared, from a device perspective (from Bob side), according to one embodiment of the present disclosure.

FIG. 41 is a block diagram of an example of a device in which a time interval is shared, from a device perspective (from Bob side), according to one embodiment of the present disclosure.

According to FIG. 41, a processor 4100 may include a RA preamble receiver 4110, a RAR transmitter 4120, an RRC connection performer 4130, and a data receiver 4140. Here, the processor 4100 may correspond to a processor described later (or earlier).

The RA preamble receiver 4110 may be configured to control the transceiver to receive a random access (RA) preamble from the another device. Since more specific examples of this content have been described hereinbefore and/or will be described hereinafter, repetition of redundant content will be omitted.

The RAR transmitter 4120 may be configured to control the transceiver to transmit a random access response (RAR) to the another device. Since more specific examples of this content have been described hereinbefore and/or will be described hereinafter, repetition of redundant content will be omitted.

The RRC connection performer 4130 may be configured to perform a radio resource control (RRC) connection procedure with the another device. Since more specific examples of this content have been described hereinbefore and/or will be described hereinafter, repetition of redundant content will be omitted.

The data receiver 4140 may be configured to control the transceiver to receive data from the another device. Here, the data may be decrypted based on key information, the key information may be determined based on a Faraday rotating mirror of the another device, and a time interval for error correction of the Faraday rotating mirror of the another device may be shared between the device and the another device. Since more specific examples of this content have been described hereinbefore and/or will be described hereinafter, repetition of redundant content will be omitted.

Figure 42:
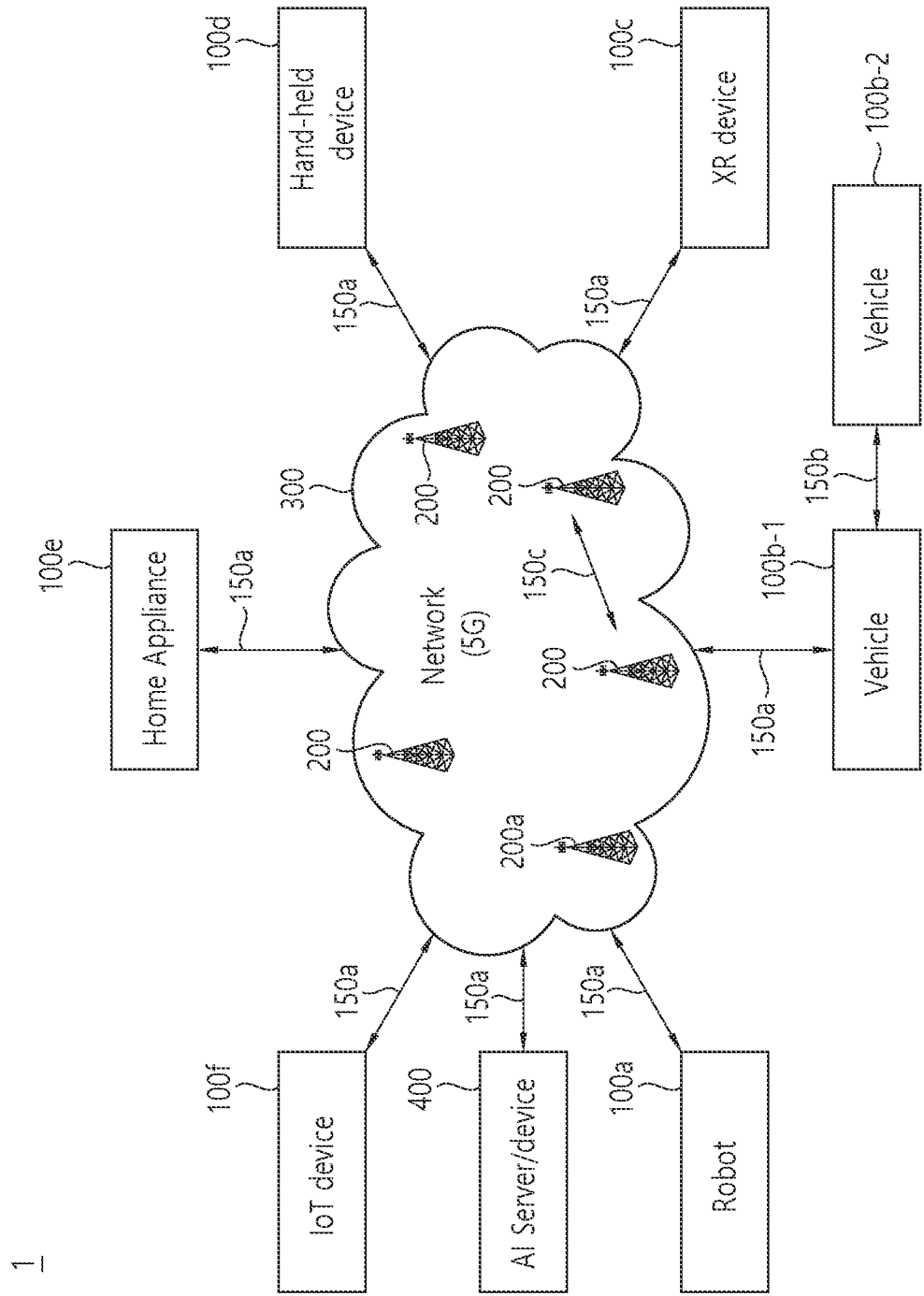
FIG. 42 illustrates a communication system 1 applied to the present disclosure.

FIG. 42 illustrates a communication system 1 applied to the present disclosure.

Referring to FIG. 42, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1, 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

The wireless devices 100a~100f may be connected to the network 300 via the BSs 200. An AI technology may be applied to the wireless devices 100a~100f and the wireless devices 100a~100f may be connected to the AI server 400 via the network 300. The network 300 may be configured using a 3G network, a 4G (e.g., LTE) network, or a 5G (e.g., NR) network. Although the wireless devices 100a~100f may communicate with each other through the BSs 200/network 300, the wireless devices 100a~100f may perform direct communication (e.g., sidelink communication) with each other without passing through the BSs/network. For example, the vehicles 100b-1, 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a~100f.

Wireless communication/connections 150a, 150b, 150c may be established between the wireless devices 100a~100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150*a*, 150*b*. For example, the wireless communication/connections 150*a*, 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports a number of numerologies (or subcarrier spacing (SCS)) to support various 5G services. For example, when the SCS is 15 kHz, it supports a wide area in traditional cellular bands, when SCS is 30 kHz/60 kHz, it supports dense-urban, lower latency and wider carrier bandwidth, for SCS of 60 kHz or higher, bandwidths greater than 24.25 GHz are supported to overcome phase noise.

The NR frequency band may be defined as a frequency range of two types (FR1 and FR2). The number of frequency ranges may be changed, and for example, the frequency ranges of the two types (FR1 and FR2) may be shown in Table 5 below. For convenience of explanation, among the frequency ranges used in the NR system, FR1 may mean "sub 6 GHz range" and FR2 may mean "above 6 GHz range" and may be called millimeter wave (mmW).

TABLE 5

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the number of frequency ranges of the NR system can be changed. For example, FR1 may include a band of 410 MHz to 7125 MHz as shown in Table 6 below. That is, FR1 may include a frequency band of 6 GHz (or 5850, 5900, 5925 MHz, etc.) or higher. For example, a frequency band of 6 GHz (or 5850, 5900, 5925 MHZ, etc.) or higher included in FR1 may include an unlicensed band. The unlicensed band may be used for various purposes, and may be used, for example, for vehicle communication (e.g., autonomous driving).

TABLE 6

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 43:
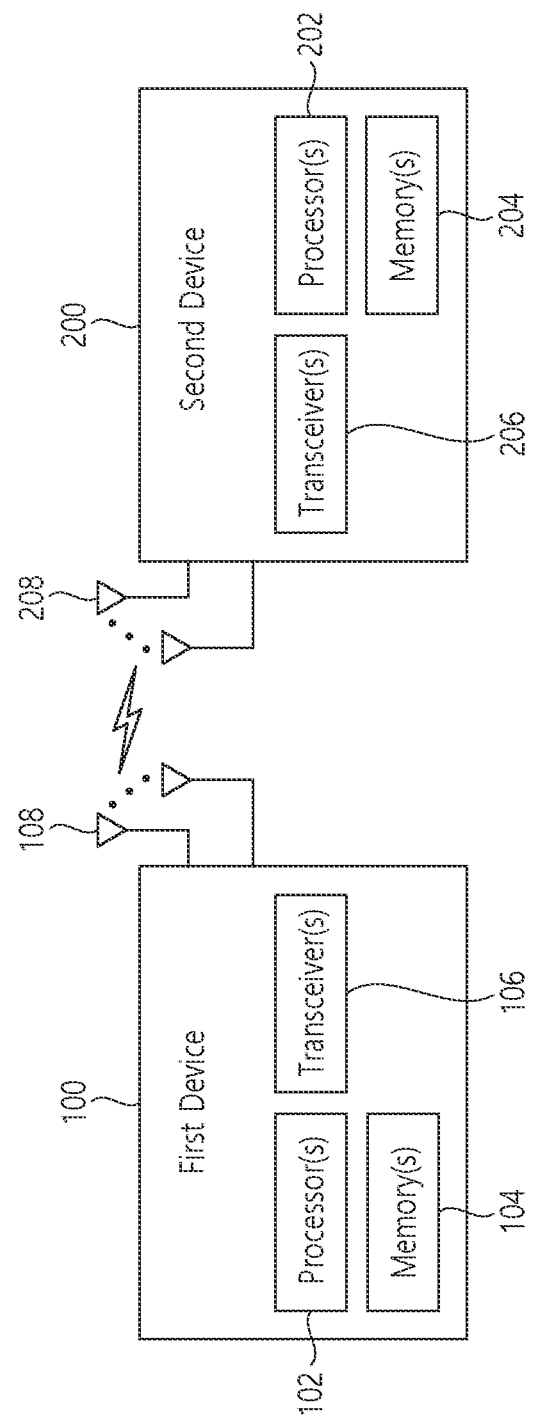
FIG. 43 illustrates an example of a wireless device that may be applicable to the present disclosure.

Hereinafter, an example of a wireless device to which the present specification is applied will be described. FIG. 43 illustrates an example of a wireless device that may be applicable to the present disclosure.

Referring to FIG. 43, a first wireless device 100 and a second wireless device 200 may transmit radio signals through a variety of RATs (e.g., LTE and NR). Herein, {the first wireless device 100 and the second wireless device 200} may correspond to {the wireless device 100*x*, the BS 200} and/or {the wireless device 100*x*, the wireless device 100*x*} of FIG. 42.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100, 200 will be described more specifically. One or more protocol layers may be implemented by, without being limited to, one or more processors 102, 202. For example, the one or more processors 102, 202 may implement one or more layers (e.g., functional layers such as PHY, MAC, RLC, PDCP, RRC, and SDAP). The one or more processors 102, 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102, 202 may generate messages, control information, data, or information according to the descriptions, functions, procedures, proposals, methods, and/or operational flowcharts disclosed in this document. The one or more processors 102, 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106, 206. The one or more processors 102, 202 may receive the signals (e.g., baseband signals) from the one or more transceivers 106, 206 and obtain the PDUs, SDUs, messages, control information, data, or information according to the descriptions, functions, procedures, proposals, methods, and/or operational flowcharts disclosed in this document.

The one or more processors 102, 202 may be referred to as controllers, microcontrollers, microprocessors, or microcomputers. The one or more processors 102, 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102, 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102, 202 or stored in the one or more memories 104, 204 so as to be driven by the one or more processors 102, 202. The descriptions, functions, procedures, proposals, methods, and/or operational flowcharts disclosed in this document may be implemented using firmware or software in the form of code, commands, and/or a set of commands.

The one or more memories 104, 204 may be connected to the one or more processors 102, 202 and store various types of data, signals, messages, information, programs, code, instructions, and/or commands. The one or more memories 104, 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104, 204 may be located at the interior and/or exterior of the one or more processors 102, 202. The one or more memories 104, 204 may be connected to the one or more processors 102, 202 through various technologies such as wired or wireless connection.

The one or more transceivers 106, 206 may transmit user data, control information, and/or radio signals/channels, mentioned in the methods and/or operational flowcharts of this document, to one or more other devices. The one or more transceivers 106, 206 may receive user data, control information, and/or radio signals/channels, mentioned in the descriptions, functions, procedures, proposals, methods, and/or operational flowcharts disclosed in this document, from one or more other devices. For example, the one or more transceivers 106, 206 may be connected to the one or more processors 102, 202 and transmit and receive radio signals. For example, the one or more processors 102, 202 may perform control so that the one or more transceivers 106, 206 may transmit user data, control information, or radio signals to one or more other devices. The one or more processors 102, 202 may perform control so that the one or more transceivers 106, 206 may receive user data, control information, or radio signals from one or more other devices. The one or more transceivers 106, 206 may be connected to the one or more antennas 108, 208 and the one or more transceivers 106, 206 may be configured to transmit and receive user data, control information, and/or radio signals/channels, mentioned in the descriptions, functions, procedures, proposals, methods, and/or operational flowcharts disclosed in this document, through the one or more antennas 108, 208. In this document, the one or more antennas may be a plurality of physical antennas or a plurality of logical antennas (e.g., antenna ports). The one or more transceivers 106, 206 may convert received radio signals/channels, and so on, from RF band signals into baseband signals in order to process received user data, control information, radio signals/channels, and so on, using the one or more processors 102, 202. The one or more transceivers 106, 206 may convert the user data, control information, radio signals/channels, and so on, processed using the one or more processors 102, 202 from the base band signals into the RF band signals. To this end, the one or more transceivers 106, 206 may include (analog) oscillators and/or filters.

Figure 44:
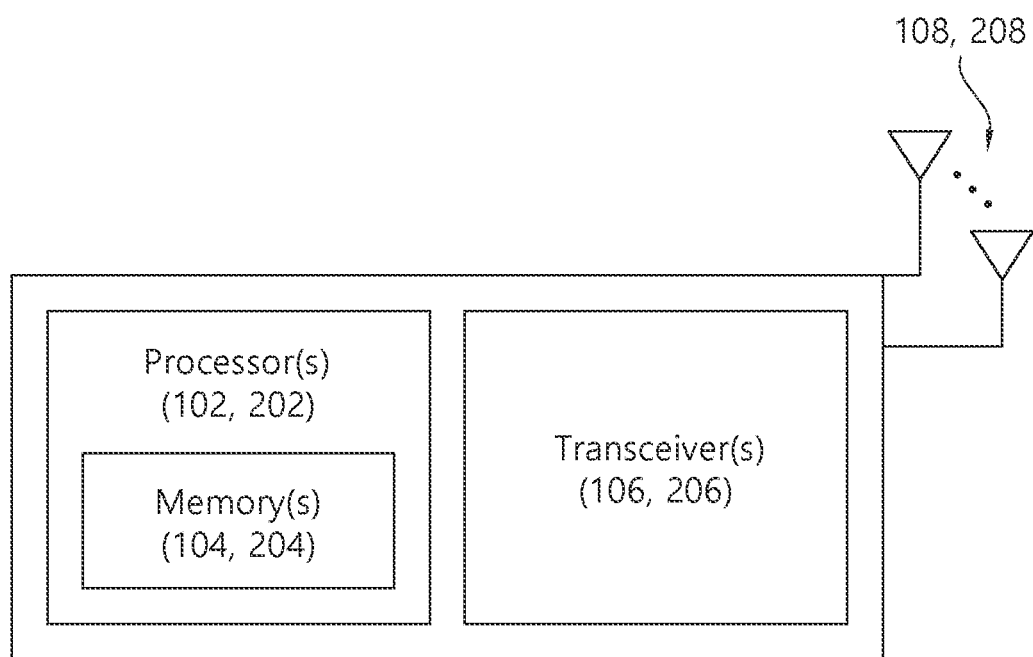
FIG. 44 illustrates another example of a wireless device that may be applicable to the present disclosure.

FIG. 44 illustrates another example of a wireless device that may be applicable to the present disclosure.

According to FIG. 44, a wireless device may include at least one processor 102, 202, at least one memory 104, 204, at least one transceiver 106, 206, and one or more antennas 108, 208.

As a difference between the example of the wireless device described above in FIG. 43 and the example of the wireless device in FIG. 44, in FIG. 43, the processors 102 and 202 and the memories 104 and 204 are separated, but in the example of FIG. 44, the memory 104, 204 is included in the processor 102, 202.

Here, the detailed description of the processors 102 and 202, the memories 104 and 204, the transceivers 106 and 206, and one or more antennas 108 and 208 is as described above, in order to avoid unnecessary repetition of description, description of repeated description is omitted.

Hereinafter, an example of a signal processing circuit to which the present specification is applied will be described.

Figure 45:
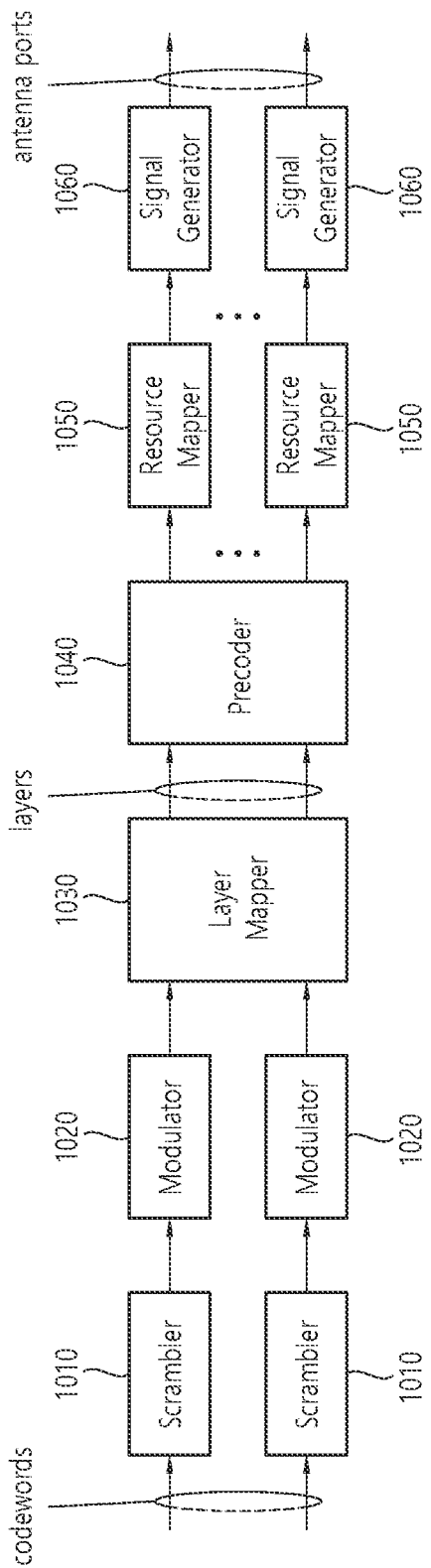
FIG. 45 illustrates an example of a signal processing circuit for a transmission signal.

FIG. 45 illustrates an example of a signal processing circuit for a transmission signal.

Referring to FIG. 45, a signal processing circuit 1000 may include scramblers 1010, modulators 1020, a layer mapper 1030, a precoder 1040, resource mappers 1050, and signal generators 1060. An operation/function of FIG. 45 may be performed, without being limited to, the processors 102, 202 and/or the transceivers 106, 206 of FIG. 43. Hardware elements of FIG. 45 may be implemented by the processors 102, 202 and/or the transceivers 106, 206 of FIG. 43. For example, blocks 1010~1060 may be implemented by the processors 102, 202 of FIG. 43. Alternatively, the blocks 1010~1050 may be implemented by the processors 102, 202 of FIG. 43 and the block 1060 may be implemented by the transceivers 106, 206 of FIG. 43.

Codewords may be converted into radio signals via the signal processing circuit 1000 of FIG. 45. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010~1060 of FIG. 45. For example, the wireless devices (e.g., 100, 200 of FIG. 43) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Hereinafter, an example of using a wireless device to which the present disclosure is applied will be described.

Figure 46:
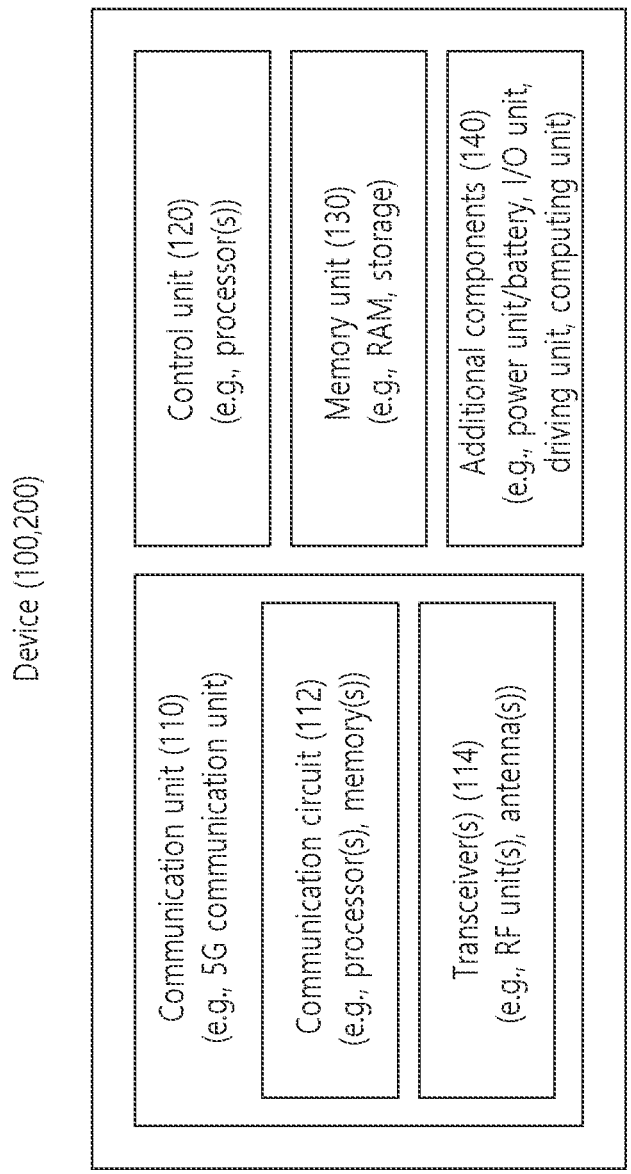
FIG. 46 illustrates another example of a wireless device applied to the present disclosure.

FIG. 46 illustrates another example of a wireless device applied to the present disclosure. The wireless device may be implemented in various forms according to a use-case/service (refer to FIG. 42).

Referring to FIG. 46, wireless devices 100, 200 may correspond to the wireless devices 100, 200 of FIG. 43 and may be configured by various elements, components, units/portions, and/or modules. For example, each of the wireless devices 100, 200 may include a communication unit 110, a control unit 120, a memory unit 130, and additional components 140. The communication unit may include a communication circuit 112 and transceiver(s) 114. For example, the communication circuit 112 may include the one or more processors 102, 202 and/or the one or more memories 104, 204 of FIG. 43. For example, the transceiver(s) 114 may include the one or more transceivers 106, 206 and/or the one or more antennas 108, 208 of FIG. 43. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 42), the vehicles (100b-1, 100b-2 of FIG. 42), the XR device (100c of FIG. 42), the hand-held device (100d of FIG. 42), the home appliance (100e of FIG. 42), the IoT device (100f of FIG. 42), a digital broadcast terminal, a hologram device, a public safety device, an MTC device, a medicine device, a fintech device (or a finance device), a security device, a climate/environment device, the AI server/device (400 of FIG. 42), the BSs (200 of FIG. 42), a network node, and so on. The wireless device may be used in a mobile or fixed place according to a use-example/service.

In FIG. 46, the entirety of the various elements, components, units/portions, and/or modules in the wireless devices 100, 200 may be connected to each other through a wired interface or at least a part thereof may be wirelessly connected through the communication unit 110. For example, in each of the wireless devices 100, 200, the control unit 120 and the communication unit 110 may be connected by wire and the control unit 120 and first units (e.g., 130, 140) may be wirelessly connected through the communication unit 110. Each element, component, unit/portion, and/or module within the wireless devices 100, 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 46 will be described in detail with reference to the drawings.

Figure 47:
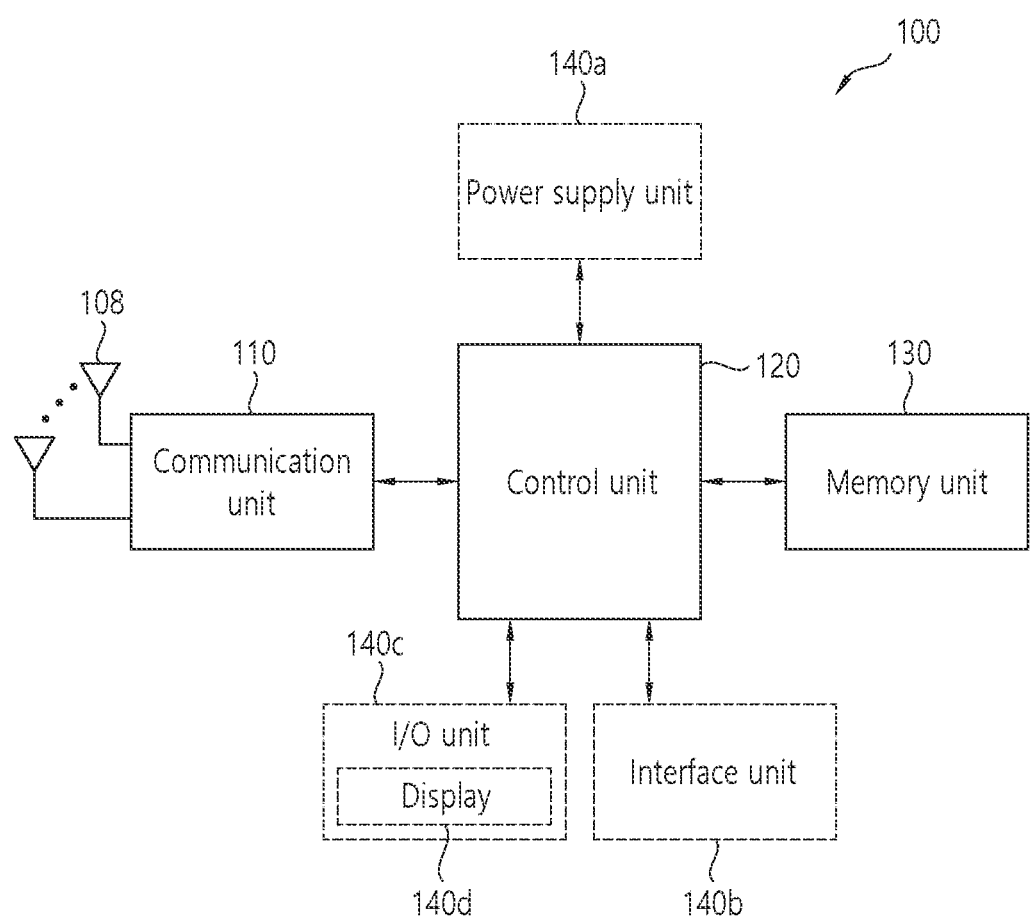
FIG. 47 illustrates an example of a hand-held device applied to the present disclosure.

FIG. 47 illustrates an example of a hand-held device applied to the present disclosure. The hand-held device may include smartphones, smartpads, wearable devices (e.g., smartwatches, smartglasses), and portable computers (e.g., laptops). A hand-held device may be referred to as a Mobile Station (MS), User Terminal (UT), Mobile Subscriber Station (MSS), Subscriber Station (SS), Advanced Mobile Station (AMS), or Wireless Terminal (WT).

Referring to FIG. 47, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110~130/140a~140c correspond to the blocks 110~130/140 of FIG. 46, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, and so on. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 48:
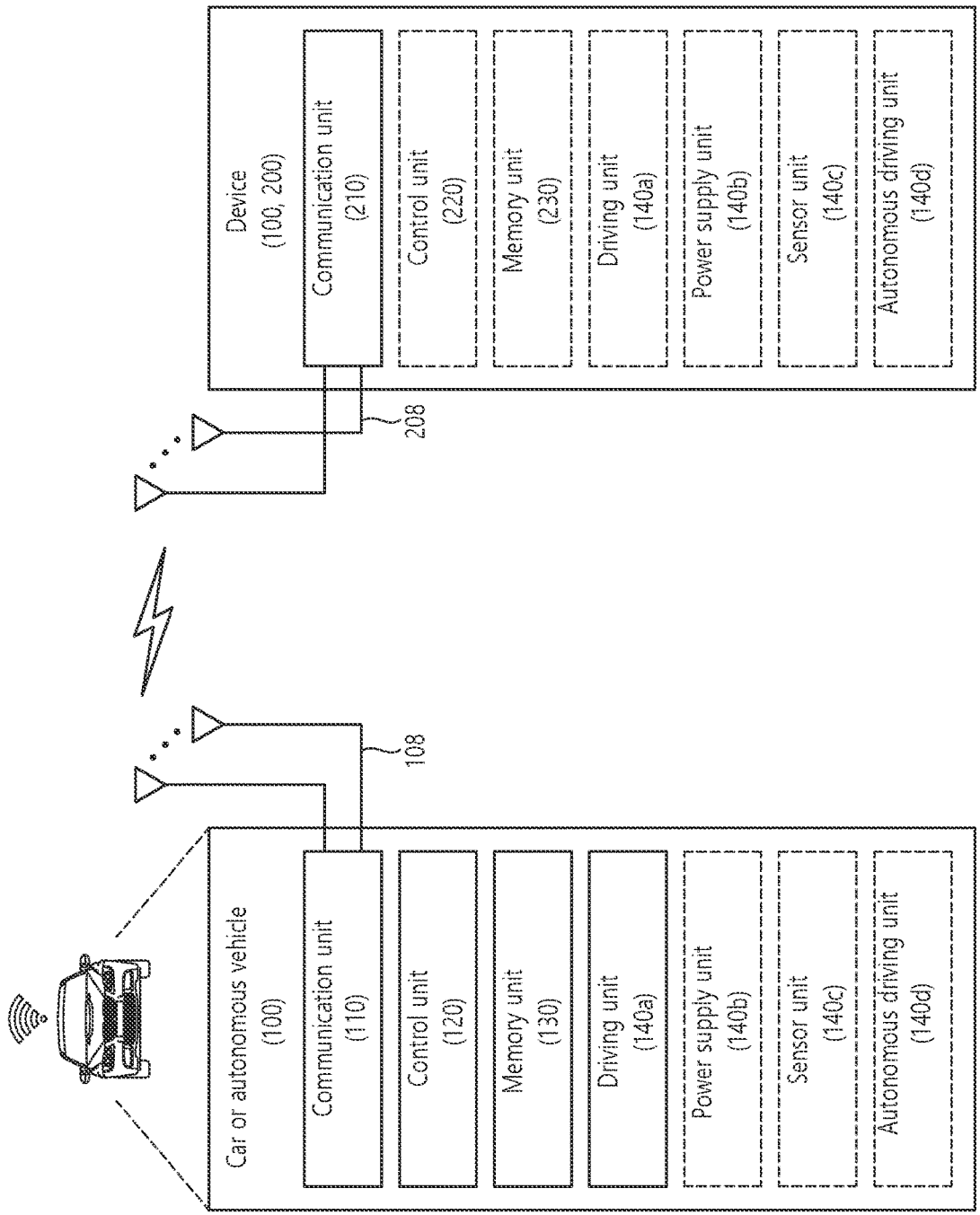
FIG. 48 illustrates an example of a vehicle or autonomous vehicle applied to the present disclosure.

FIG. 48 illustrates an example of a vehicle or autonomous vehicle applied to the present disclosure.

The vehicle or autonomous vehicle may be implemented by a mobile robot, a car, a train, a manned/unmanned Aerial Vehicle (AV), a ship, and so on.

Referring to FIG. 48, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a~140d correspond to the blocks 110/130/140 of FIG. 46, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, and so on. The power supply unit 140b may supply power to the vehicle or the autonomous vehicle 100 and include a wired/wireless charging circuit, a battery, and so on. The sensor unit 140c may obtain a vehicle state, ambient environment information, user information, and so on. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on, from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 49:
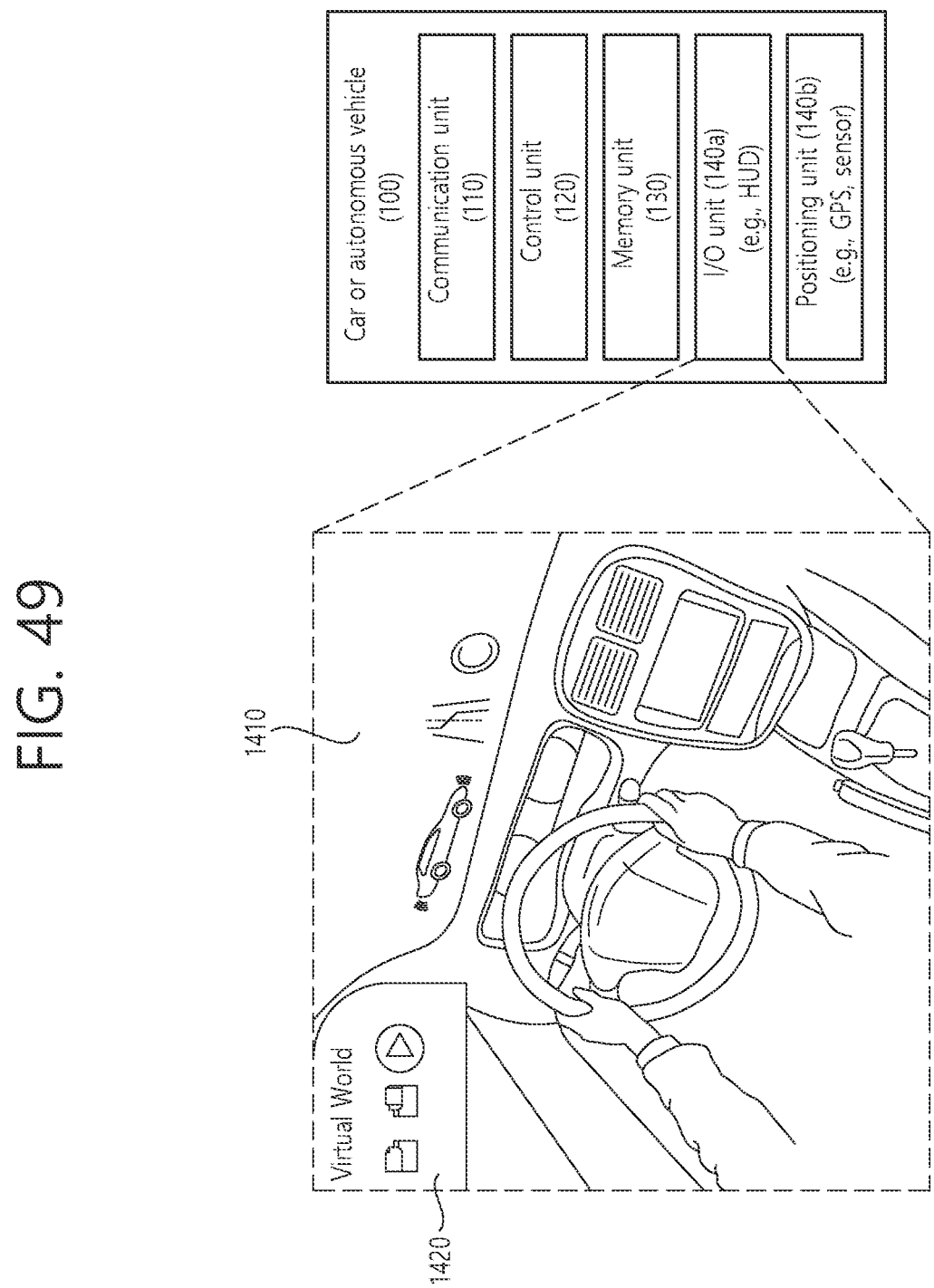

FIG. 49 illustrates an example of a vehicle applied to the present disclosure. The vehicle may be implemented as a transport means, an aerial vehicle, a ship, and so on.

Referring to FIG. 49, a vehicle 100 may include a communication unit 110, a control unit 120, a memory unit 130, an I/O unit 140a, and a positioning unit 140b. Herein, the blocks 110~130/140a~140b correspond to blocks 110~130/140 of FIG. 46.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may obtain information on the position of the vehicle 100. The position information may include information on an absolute position of the vehicle 100, information on the position of the vehicle 100 within a traveling lane, acceleration information, and information on the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle 1410, 1420. The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information on driving/vehicle abnormality to related organizations.

Figure 50:
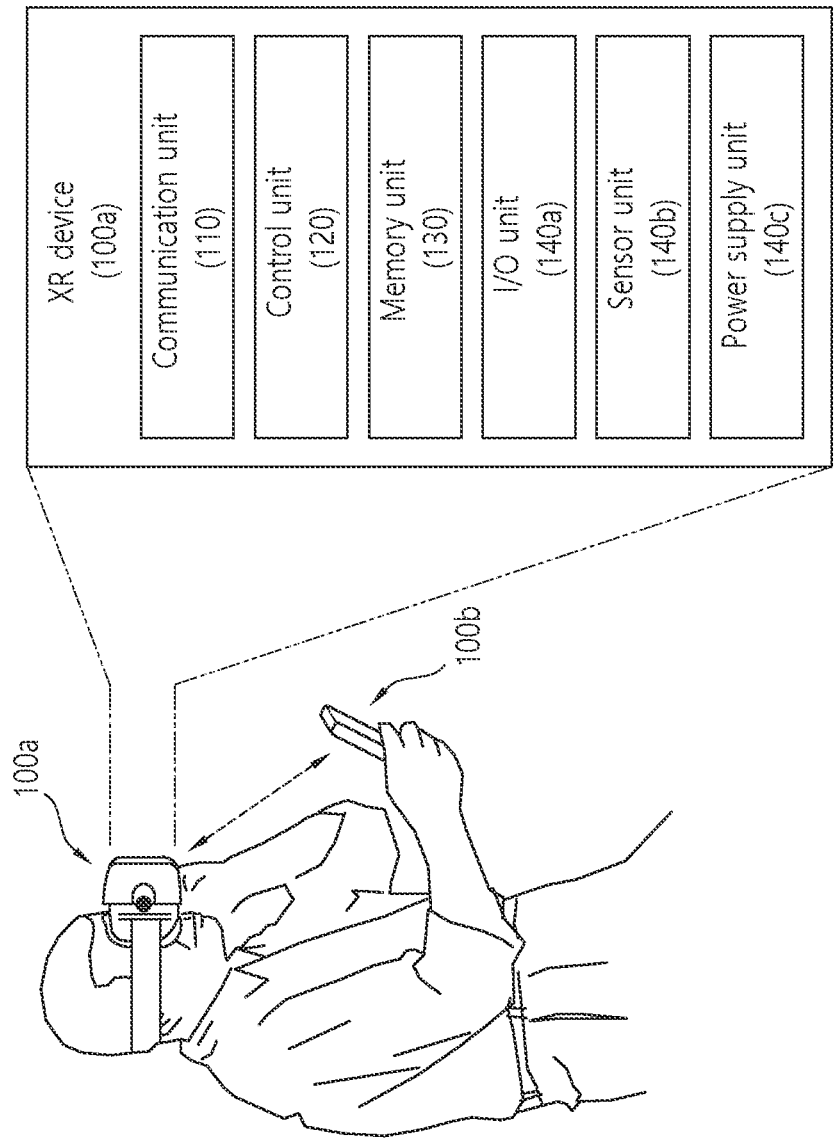
FIG. 50 illustrates an example of an XR device applied to the present disclosure.

FIG. 50 illustrates an example of an XR device applied to the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 50, an XR device 100a may include a communication unit 110, a control unit 120, a memory unit 130, an I/O unit 140a, a sensor unit 140b, and a power supply unit 140c. Herein, the blocks 110~130/140a~140c correspond to the blocks 110~130/140 of FIG. 46, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, and so on. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, and so on.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information on a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information on a 3D position of the hand-held device 100b and generate and output an XR object corresponding to the hand-held device 100b.

Figure 51:
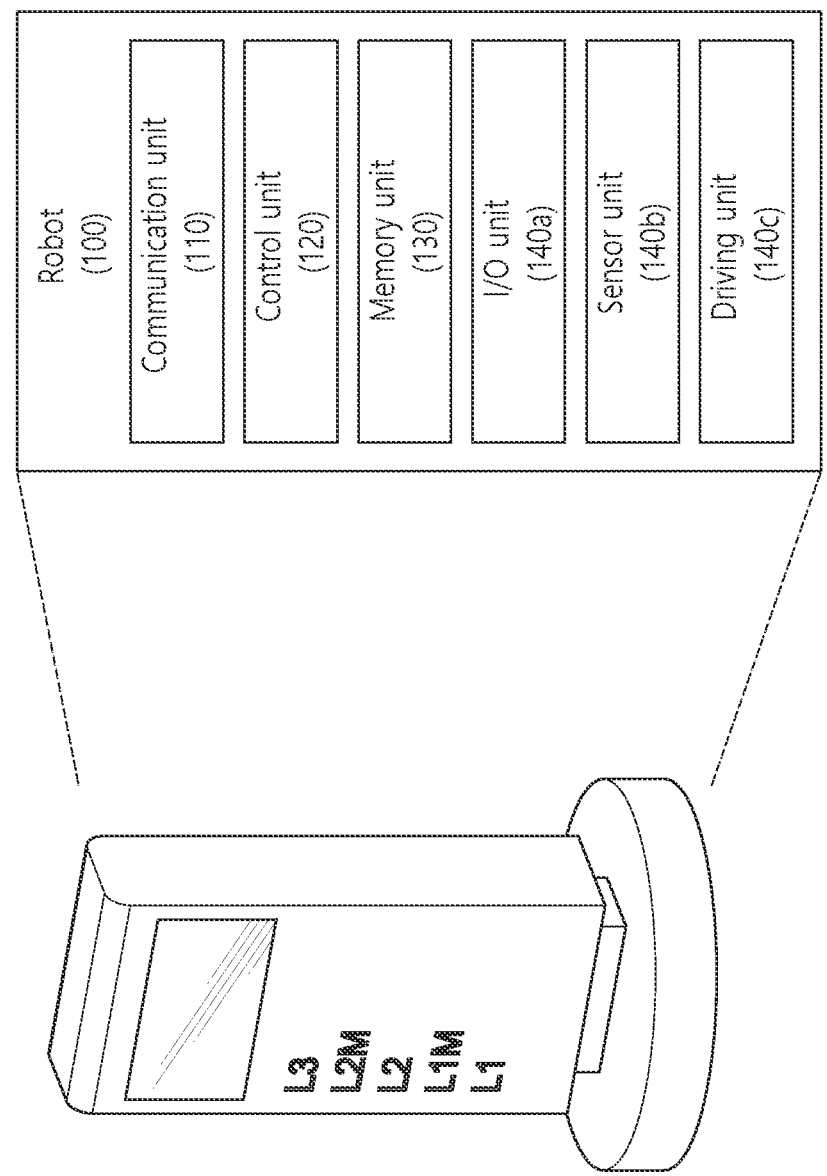
FIG. 51 illustrates an example of a robot applied to the present disclosure.

FIG. 51 illustrates an example of a robot applied to the present disclosure. The robot may be categorized into an industrial robot, a medical robot, a household robot, a military robot, and so on, according to a used purpose or field.

Referring to FIG. 51, a robot 100 may include a communication unit 110, a control unit 120, a memory unit 130, an I/O unit 140a, a sensor unit 140b, and a driving unit 140c. Herein, the blocks 110~130/140a~140c correspond to the blocks 110~130/140 of FIG. 46, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, and so on. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, and so on.

Figure 52:
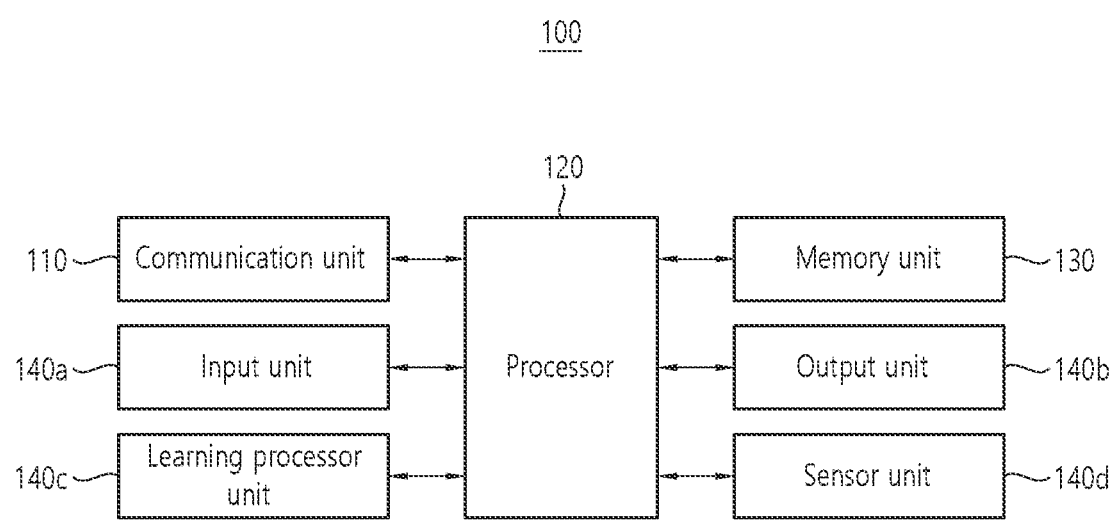
FIG. 52 illustrates an example of an AI device applied to the present disclosure.

FIG. 52 illustrates an example of an AI device applied to the present disclosure.

The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 52, an AI device 100 may include a communication unit 110, a control unit 120, a memory unit 130, an I/O unit 140a/140b, a learning processor unit 140c, and a sensor unit 140d. The blocks 110~130/140a~140d correspond to blocks 110~130/140 of FIG. 46, respectively.

The communication unit 110 may transmit and receive wired/radio signals (e.g., sensor information, user input, learning models, or control signals) to and from external devices such as other AI devices (e.g., 100x, 200, 400 of FIG. 42) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 42). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may obtain various types of data from the exterior of the AI device 100. For example, the input unit 140a may obtain learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 42). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method performed by a device and comprising:
transmitting a random access preamble to another device;
receiving a random access response from the another device in response to the random access preamble;
performing a radio resource control connection establishment procedure with the another device;
transmitting data encrypted based on key information to the another device,
wherein the key information is obtained based on:
incident a detection pulse on a variable Faraday rotating mirror and a reference pulse on a first mirror, respectively,
the detection pulse and the reference pulse being pulses from which a test pulse is branched;
generating a first current in a balanced photodetector (BPD) based on a first component that is a component of reflection of the detection pulse from the variable Faraday rotating mirror and a second component that is a component of reflection of the reference pulse from the first mirror;
converting the first current into a second current;
incident the second current on the variable Faraday rotating mirror; and
correcting an error in the variable Faraday rotating mirror based on the incident second current.

2. The method of claim 1, wherein the device converts the first current into the second current based on a closed loop circuit.

3. The method of claim 2, wherein the closed loop circuit includes a loop filter and a transimpedance amplifier,
wherein the first current is incident on the loop filter and the transimpedance amplifier,
wherein the second current is an output current from the loop filter and the transimpedance amplifier.

4. The method of claim 3, wherein an absolute value of the second current is determined based on an absolute value of the first current, a transmittance of a medium, a number of total conductors wound on a solenoid in the variable Faraday rotating mirror, Verde constant, a sensitivity of a photodiode used in the BPD, and a magnitude of the detection pulse.

5. The method of claim 4, wherein the absolute value of the second current is determined based on, $$|I\_VFM|=1/(2*\mu*N*V)*(|I\_BPD|/(4*R*A^2)+1)$$

where |I_VFM| is the absolute value of the second current,
where $\mu$ is the transmittance of the medium,
where N is the number of total conductors,
where V is Verde constant,
where |I_BPD| is the absolute value of the first current,
where R is a value for the sensitivity, and
where A is the magnitude of the detection pulse.

6. The method of claim 1, wherein a control device included in the device converts the first current into the second current.

7. The method of claim 6, wherein an absolute value of the second current is determined based on, $$|I\_VFM| = 1/(2*\mu*N*V) * \sin^{-1}(\sqrt{(|I\_BPD|/(R*A^2))})$$

where $|I\_VFM|$ is the absolute value of the second current, where $\mu$ is a transmittance of a medium, where N is a number of total conductors, where V is Verde constant, where $|I\_BPD|$ is the absolute value of the first current, where R is a value for a sensitivity, and where A is a magnitude of the detection pulse.

8. The method of claim 1, wherein the device includes the variable Faraday rotating mirror, the first mirror, and the BPD, wherein the variable Faraday rotating mirror comprises a Faraday rotator, a solenoid, and a second mirror.

9. The method of claim 1, wherein the test pulse is generated from a light source included in the device; or wherein the test pulse is received from the another device.

10. The method of claim 1, wherein a time interval for error correction of the variable Faraday rotating mirror is shared between the device and the another device.

11. A device comprising:
a transceiver;
at least one memory; and
at least one processor operably coupled to the at least one memory and the transceiver,
wherein the at least one memory stores instructions that, based on being executed by the at least one processor, perform operations comprising:
transmitting, via the transceiver, a random access preamble to another device;
receiving, via the transceiver, a random access response (RAR) from the another device in response to the random access preamble;
performing a radio resource control connection establishment procedure with the another device;
transmitting, via the transceiver, data encrypted based on key information to the another device,
wherein the key information is obtained based on:
incident a detection pulse on a variable Faraday rotating mirror and a reference pulse on a first mirror, respectively,
the detection pulse and the reference pulse being pulses from which a test pulse is branched;
generating a first current in a balanced photodetector (BPD) based on a first component that is a component of reflection of the detection pulse from the variable Faraday rotating mirror and a second component that is a component of reflection of the reference pulse from the first mirror;
converting the first current into a second current;
incident the second current on the variable Faraday rotating mirror; and
correcting an error in the variable Faraday rotating mirror based on the incident second current.

\* \* \* \* \*